(12) United States Patent
Yang et al.

(10) Patent No.: US 11,452,151 B2
(45) Date of Patent: Sep. 20, 2022

(54) APPLICATION FUNCTION IMPLEMENTATION METHOD AND ELECTRONIC DEVICE

(71) Applicant: Huawei Technologies Co., Ltd., Guangdong (CN)

(72) Inventors: Jun Yang, Shenzhen (CN); Kai Li, Shenzhen (CN); Ge Qiu, Shanghai (CN); Yaoying Zhou, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/250,096

(22) PCT Filed: May 31, 2018

(86) PCT No.: PCT/CN2018/089407
§ 371 (c)(1),
(2) Date: Nov. 24, 2020

(87) PCT Pub. No.: WO2019/227450
PCT Pub. Date: Dec. 5, 2019

(65) Prior Publication Data
US 2021/0204337 A1    Jul. 1, 2021

(51) Int. Cl.
*H04W 76/11* (2018.01)
*H04W 12/0471* (2021.01)
(Continued)

(52) U.S. Cl.
CPC ............ *H04W 76/11* (2018.02); *H04L 63/18* (2013.01); *H04L 67/1095* (2013.01);
(Continued)

(58) Field of Classification Search
CPC ... H04W 76/11; H04W 12/0471; H04W 4/80; H04W 12/50; H04W 76/10; H04L 63/18;
(Continued)

(56) References Cited

U.S. PATENT DOCUMENTS

2013/0086644 A1 * 4/2013 Bahn ..................... H04L 67/141
726/4
2013/0309971 A1  11/2013 Kiukkonen et al.
(Continued)

FOREIGN PATENT DOCUMENTS

CN             1395807 A    2/2003
CN           103166941 A    6/2013
(Continued)

*Primary Examiner* — Jung H Park
(74) *Attorney, Agent, or Firm* — Womble Bond Dickinson (US) LLP

(57) ABSTRACT

Embodiments of this application disclose an application function implementation method, so as to resolve a problem of low use efficiency of an electronic device. A first electronic device establishes a first wireless link through a first wireless communications protocol, displays a screen that includes a first control, receives an operation performed on the first control, displays a shortcut menu that includes a second control, receives an operation performed on the second control, displays a list that includes an identifier of a second electronic device, receives an operation performed on the identifier, establishes a second wireless link to the second electronic device through a second wireless communications protocol, where the first electronic device and the second electronic device are associated with each other, and sends first information that includes to-be-shared data and an identifier to the second electronic device through the second wireless link.

20 Claims, 37 Drawing Sheets

(51) Int. Cl.
*H04L 9/40* (2022.01)
*H04L 67/1095* (2022.01)
*H04L 67/146* (2022.01)
*H04L 67/75* (2022.01)

(52) U.S. Cl.
CPC ............ *H04L 67/146* (2013.01); *H04L 67/75* (2022.05); *H04W 12/0471* (2021.01)

(58) Field of Classification Search
CPC ... H04L 67/1095; H04L 67/146; H04L 67/36; H04L 69/22; H04L 67/1068
See application file for complete search history.

(56) References Cited

U.S. PATENT DOCUMENTS

| | | | |
|---|---|---|---|
| 2014/0120829 A1 | 5/2014 | Bhamidipati et al. | |
| 2014/0237561 A1 | 8/2014 | Mraz | |
| 2014/0287690 A1* | 9/2014 | Kim | H04W 4/80 455/41.3 |
| 2016/0119301 A1* | 4/2016 | Thilgen | H04W 12/37 726/1 |
| 2016/0182624 A1 | 6/2016 | Liang et al. | |
| 2016/0278006 A1 | 9/2016 | Lee et al. | |
| 2017/0134393 A1* | 5/2017 | Islam | H04W 12/06 |
| 2018/0335936 A1* | 11/2018 | Missig | G06F 3/04847 |
| 2019/0268749 A1 | 8/2019 | Jiang et al. | |
| 2020/0187095 A1* | 6/2020 | Zhao | H04W 48/16 |

FOREIGN PATENT DOCUMENTS

| | | |
|---|---|---|
| CN | 104537022 A | 4/2015 |
| CN | 104756507 A | 7/2015 |
| CN | 105120074 A | 12/2015 |
| CN | 106211033 A | 12/2016 |
| CN | 106973381 A | 7/2017 |
| CN | 107911642 A | 4/2018 |
| CN | 107969002 A | 4/2018 |
| CN | 108024223 A | 5/2018 |
| JP | 2015153351 A | 8/2015 |
| JP | 2017091261 A | 5/2017 |
| JP | 2019532567 A | 11/2019 |
| WO | 2015068988 A1 | 5/2015 |
| WO | 2018045561 A1 | 3/2018 |
| WO | 2018051633 A1 | 3/2018 |

* cited by examiner

CONT.
FROM

APPLICATION FUNCTION IMPLEMENTATION METHOD AND ELECTRONIC DEVICE

CROSS-REFERENCE TO RELATED APPLICATIONS

This application is a national stage of International Application No. PCT/CN2018/089407, filed on May 31, 2018, the disclosure of which is incorporated herein by reference in its entirety.

TECHNICAL FIELD

Embodiments of this application relate to the electronic device field, and in particular, to an application function implementation method and an electronic device.

BACKGROUND

Currently, an electronic device such as a mobile phone has become an indispensable communication tool in people's daily life and work. In addition, with rapid development of science and technology, people have increasingly fast life rhythm, and also expect to have increasingly efficient interaction with the electronic device.

However, when implementing some application functions, the electronic device still cannot implement efficient interaction with a user currently. That the electronic device is a mobile phone is used as an example. For example, the user wants to use the mobile phone to access a wireless local area network. The user may open a settings screen of the mobile phone and tap a wireless local area network option on the settings screen. In response to the tap, as shown in FIG. 1A, the mobile phone displays a settings screen 101 of a wireless local area network function. The settings screen 101 includes information about wireless local area networks found by the mobile phone, for example, service set identifiers (SSID) of the wireless local area networks. If the user wants to use the mobile phone to access a wireless local area network whose SSID is "Angel's Wings", as shown in FIG. 1A, the user may tap, on the settings screen 101, an option 102 associated with the SSID "Angel's Wings". In response to the tap, as shown in FIG. 1B, the mobile phone displays a password verification window 103, so that the user enters a password of the wireless local area network. After entering the password, the user may tap an OK button 104 in the password verification window 103. In response to the tap, the mobile phone may transmit the password entered by the user to a corresponding wireless access point, so that the wireless access point verifies the password entered by the user. After the verification on the password succeeds, as shown in FIG. 2, the mobile phone refreshes the settings screen 101. A refreshed settings screen 101 includes an option 201, to prompt the user that the mobile phone has successfully accessed the wireless local area network whose SSID is "Angel's Wings".

It can be learned that the user needs to perform a series of operations on the electronic device before the wireless local area network is successfully accessed. The series of operations greatly reduce use efficiency of the electronic device.

SUMMARY

This application provides an application function implementation method and an electronic device, so as to resolve a problem that use efficiency of an electronic device is low because an application function can be implemented only after a user performs a series of operations on the electronic device.

To achieve the foregoing objective, the following technical solutions are used in the embodiments of this application.

According to a first aspect, a technical solution of this application provides an application function implementation method. The method may include: establishing, by a first electronic device, a wireless link to a second electronic device, where the first electronic device and the second electronic device are associated with each other; sending, by the first electronic device, first information to the second electronic device by using the wireless link, where the first information includes to-be-shared data and an identifier, and the identifier is used to indicate an application module; receiving and parsing, by the second electronic device, the first information to obtain the to-be-shared data and the identifier that are included in the first information; and providing, by the second electronic device, an on share service for the application module indicated by the identifier, and automatically implementing a corresponding application function based on the to-be-shared data.

According to the application function implementation method provided in this application, after the first electronic device establishes the wireless link to the second electronic device, the first electronic device sends, to the second electronic device through the established wireless link, the information that includes the to-be-shared data and the identifier used to indicate the application module, so that after receiving the information, the second electronic device can provide the on share service for the application module indicated by the identifier, and automatically implement the corresponding application function based on the to-be-shared data. In this way, complexity of user operations is reduced, use efficiency of an electronic device is improved, and efficient interaction between the electronic device and a user is implemented.

In an embodiment, the to-be-shared data may include an SSID and a password of a wireless local area network; and the providing, by the second electronic device, an on share service for the application module indicated by the identifier, and automatically implementing a corresponding application function based on the to-be-shared data may specifically include: providing, by the second electronic device, an on share service for a Wi-Fi module in Settings (Settings) that is indicated by the identifier, and automatically accessing the wireless local area network by using the SSID and the password. In this way, the second electronic device automatically accesses the wireless local area network based on related parameters such as the SSID and the password of the wireless local area network that are shared by the first electronic device, and the identifier used to indicate the Wi-Fi module in Settings, so as to reduce complexity of accessing the wireless local area network by a user by using an electronic device, and improve use efficiency of the electronic device, implement efficient interaction between the electronic device and the user, and improve user experience.

In an embodiment, before the establishing, by a first electronic device, a wireless link to a second electronic device, the method may further include: establishing, by the first electronic device, a first wireless link by using a first wireless communications protocol (for example, a Wi-Fi protocol); displaying, by the first electronic device, a first screen, where the first screen may include a first control associated with data that a user of the first electronic device wants to share; receiving, by the first electronic device, a first operation performed on the first control; in response to the first operation, displaying, by the first electronic device, a shortcut menu that includes a second control; receiving, by the first electronic device, a second operation performed on the second control; and displaying, by the first electronic device, a discovery device list in response to the second operation, where the discovery device list may include an identifier of the second electronic device; the establishing, by a first electronic device, a wireless link to a second electronic device may specifically include: receiving, by the first electronic device, a third operation performed on the identifier of the second electronic device; and in response to the third operation, establishing, by the first electronic device, a second wireless link to the second electronic device by using a second wireless communications protocol (for example, a Bluetooth protocol); and the sending, by the first electronic device, first information to the second electronic device by using the wireless link may include: sending, by the first electronic device, the first information to the second electronic device through the second wireless link. In this way, when the first electronic device has accessed a Wi-Fi network, and the user of the first electronic device wants to share data, the first electronic device may establish a Bluetooth link to the second electronic device by using the Bluetooth protocol for a subsequent data sharing process.

In an embodiment, the method may further include: displaying, by the second electronic device, a second screen, where the second screen may include a third control; and the providing, by the second electronic device, an on share service for the application module indicated by the identifier, and automatically implementing a corresponding application function based on the to-be-shared data may specifically include: receiving, by the second electronic device, a fourth operation performed on the third control; and in response to the fourth operation, providing, by the second electronic device, the on share service for the application module indicated by the identifier, and automatically implementing the corresponding application function based on the to-be-shared data. In this way, after receiving the data shared by the first electronic device, the second electronic device displays the second screen, to prompt a user that the device shares the data with the second electronic device. The second screen may further include a control used by the user to accept, reject, or store the data shared by the first electronic device, so that the user can perform, based on a requirement of the user, a corresponding operation such as accepting or rejecting on the data shared by the first electronic device, thereby improving user experience.

In an embodiment, the to-be-shared data may include the SSID and the password of the wireless local area network; or the application module indicated by the identifier is the Wi-Fi module in Settings (Settings), and the first screen may be a settings screen of a wireless local area network function in Settings (Settings); or the first information may further include an operation code, and the operation code is used to indicate to automatically access the wireless local area network by using the SSID and the password that are shared by the first electronic device; or the to-be-shared data is provided with attribute information, and the attribute information may include at least one of the following: whether storing is allowed, whether printing is allowed, whether re-sharing is allowed, and whether burning is performed immediately after reading; or the to-be-shared data may include a parameter of a Do Not Disturb mode in the first electronic device; or the application module indicated by the identifier is a Do Not Disturb mode module in Settings (Settings), and the first screen may be a settings screen of a Do Not Disturb mode in Settings (Settings); or the to-be-shared data includes a configuration parameter of a virtual private network VPN in the first electronic device; or the application module indicated by the identifier is a VPN module in Settings, and the first screen may be a configuration screen of a VPN in Settings; or the wireless link may be established by using any one of the following protocols: a Wi-Fi protocol, a Bluetooth protocol, a ZigBee protocol, a near field communication NFC protocol, a protocol used in a 4G technology, and a protocol used in a 5G technology; or that the first electronic device and the second electronic device are associated with each other may specifically include: the first electronic device and the second electronic device are logged in to with a same account, or an account with which the second electronic device is logged in to is a contact of the first electronic device.

According to a second aspect, a technical solution of this application provides an application function implementation method. The method may include: displaying, by a first electronic device, a first screen, where the first screen may include a first control associated with an SSID of a wireless local area network; receiving, by the first electronic device, a first operation performed on the first control; displaying, by the first electronic device, a shortcut menu in response to the first operation, where the shortcut menu may include a second control, and the second control is configured to share the SSID and a password of the wireless local area network; receiving, by the first electronic device, a second operation performed on the second control; displaying, by the first electronic device, a discovery device list in response to the second operation, where the discovery device list may include an identifier of a second electronic device; receiving, by the first electronic device, a third operation performed on the identifier of the second electronic device; in response to the third operation, establishing, by the first electronic device, a Bluetooth link to the second electronic device by using a Bluetooth protocol; sending, by the first electronic device, first information to the second electronic device by using the Bluetooth link, where the first information may include the SSID, the password, and an identifier, and the identifier is used to indicate a Wi-Fi module in Settings (Settings); receiving and parsing, by the second electronic device, the first information to obtain the SSID, the password, and the identifier; and providing, by the second electronic device, an on share service for the Wi-Fi module in Settings that is indicated by the identifier, and automatically accessing the wireless local area network by using the SSID and the password.

According to the application function implementation method provided in this application, after a user of the first electronic device performs an operation on a control related to network sharing, the first electronic device can send, to the second electronic device by using the wireless link established by the first electronic device to the second electronic device, the information that includes the SSID and the password corresponding to the SSID of the wireless local area network, and the identifier used to indicate the Wi-Fi module in Settings, so that after receiving the information, the second electronic device can provide the on share service for the Wi-Fi module in Settings that is indicated by the identifier, and automatically access the wireless local area network by using the SSID and the password. In this way, the user can successfully access the wireless local area network without performing a series of operations on an electronic device, so as to reduce complexity of user operations, improve use efficiency of the electronic device, and implement efficient interaction between the electronic device and the user.

According to a third aspect, a technical solution of this application provides an application function implementation method. The method may include:

establishing, by a first electronic device, a wireless link to a second electronic device; receiving, by the first electronic device, a sharing operation; generating, by an application layer of the first electronic device, to-be-shared data in response to the sharing operation; generating, by an application framework layer of the first electronic device, first information based on the to-be-shared data and an identifier, where the identifier is used to indicate an application module included in the application layer; sending, by the first electronic device, the first information to the second electronic device by using the wireless link; receiving, by the second electronic device, the first information by using the wireless link; parsing, by an application framework layer of the second electronic device, the first information to obtain the to-be-shared data and the identifier; and automatically implementing, by an application layer of the second electronic device, a corresponding application function based on the to-be-shared data by using the application module indicated by the identifier.

In an embodiment, the to-be-shared data may include an SSID and a password of a wireless local area network; or the application module indicated by the identifier is a Wi-Fi module in Settings; or the first information may further include an operation code, and the operation code is used to indicate to automatically access the wireless local area network by using the SSID and the password that are shared by the first electronic device; or the to-be-shared data is provided with attribute information, and the attribute information may include at least one of the following: whether storing is allowed, whether printing is allowed, whether re-sharing is allowed, and whether burning is performed immediately after reading; or the to-be-shared data may include a parameter of a Do Not Disturb mode in the first electronic device; or the application module indicated by the identifier is a Do Not Disturb mode module in Settings; or the to-be-shared data includes a configuration parameter of a virtual private network (VPN) in the first electronic device; or the application module indicated by the identifier is a VPN module in Settings.

According to a fourth aspect, a technical solution of this application provides an application function implementation system. The system may include a first electronic device and a second electronic device.

The first electronic device establishes a first wireless link by using a first wireless communications protocol; the first electronic device displays a first screen, where the first screen may include a first control associated with data that a user of the first electronic device wants to share; the first electronic device receives a first operation performed on the first control; the first electronic device displays a shortcut menu in response to the first operation, where the shortcut menu may include a second control; the first electronic device receives a second operation performed on the second control; the first electronic device displays a discovery device list in response to the second operation, where the discovery device list may include an identifier of the second electronic device; the first electronic device receives a third operation performed on the identifier of the second electronic device; in response to the third operation, the first electronic device establishes a second wireless link to the second electronic device by using a second wireless communications protocol, where the first electronic device and the second electronic device are associated with each other; the first electronic device sends first information to the second electronic device through the second wireless link, where the first information includes to-be-shared data and an identifier, and the identifier is used to indicate an application module; the second electronic device receives and parses the first information to obtain the to-be-shared data and the identifier; and the second electronic device provides an on share service for the application module indicated by the identifier, and automatically implements a corresponding application function based on the to-be-shared data.

In an embodiment, the to-be-shared data includes an SSID and a password of a wireless local area network; and that the second electronic device provides an on share service for the application module indicated by the identifier, and automatically implements a corresponding application function based on the to-be-shared data may specifically include: the second electronic device provides an on share service for a wireless fidelity Wi-Fi module in Settings that is indicated by the identifier, and automatically accesses the wireless local area network by using the SSID and the password.

In another possible implementation, the second electronic device displays a second screen, where the second screen may include a third control; and that the second electronic device provides an on share service for the application module indicated by the identifier, and automatically implements a corresponding application function based on the to-be-shared data may include: the second electronic device receives a fourth operation performed on the third control; and in response to the fourth operation, the second electronic device provides the on share service for the application module indicated by the identifier, and automatically implements the corresponding application function based on the to-be-shared data.

In an embodiment, the to-be-shared data may include the SSID and the password of the wireless local area network; or the application module indicated by the identifier is the Wi-Fi module in Settings, and the first screen is a settings screen of a wireless local area network function in Settings; or the first information may further include an operation code, and the operation code is used to indicate to automatically access the wireless local area network by using the SSID and the password; or the to-be-shared data is provided with attribute information, and the attribute information may include at least one of the following: whether storing is allowed, whether printing is allowed, whether re-sharing is allowed, and whether burning is performed immediately after reading; or the to-be-shared data includes a parameter of a Do Not Disturb mode in the first electronic device; or the application module indicated by the identifier is a Do Not Disturb mode module in Settings, and the first screen is a settings screen of a Do Not Disturb mode in Settings; or the to-be-shared data may include a configuration parameter of a VPN in the first electronic device; or the application module indicated by the identifier is a VPN module in Settings, and the first screen is a configuration screen of a VPN in Settings; or the first wireless communications protocol includes any one of the following: a Wi-Fi protocol, a Bluetooth protocol, a ZigBee protocol, a near field communication NFC protocol, a protocol used in a 4G technology, and a protocol used in a 5G technology; or the second wireless communications protocol includes any one of the following: a Wi-Fi protocol, a Bluetooth protocol, a ZigBee protocol, an NFC protocol, a protocol used in a 4G technology, and a protocol used in a 5G technology; or that the first electronic device and the second electronic device are associated with each other may include: the first electronic device and the second electronic device are logged in to with a same account, or an account with which the second electronic device is logged in to is a contact of the first electronic device.

According to a fifth aspect, a technical solution of this application provides an application function implementation system. The system may include a first electronic device and a second electronic device.

The first electronic device displays a first screen, where the first screen may include a first control associated with an SSID of a wireless local area network; the first electronic device receives a first operation performed on the first control; the first electronic device displays a shortcut menu in response to the first operation, where the shortcut menu may include a second control, and the second control is configured to share the SSID and a password of the wireless local area network; the first electronic device receives a second operation performed on the second control; the first electronic device displays a discovery device list in response to the second operation, where the discovery device list includes an identifier of the second electronic device; the first electronic device receives a third operation performed on the identifier of the second electronic device; in response to the third operation, the first electronic device establishes a Bluetooth link to the second electronic device by using a Bluetooth protocol; the first electronic device sends first information to the second electronic device by using the Bluetooth link, where the first information includes the SSID, the password, and an identifier, and the identifier is used to indicate a wireless fidelity Wi-Fi module in Settings; the second electronic device receives and parses the first information to obtain the SSID, the password, and the identifier; and the second electronic device provides an on share service for the Wi-Fi module in Settings that is indicated by the identifier, and automatically accesses the wireless local area network by using the SSID and the password.

According to a sixth aspect, a technical solution of this application provides a first electronic device. The first electronic device may include one or more processors, a memory, a touchscreen, and one or more computer programs. The foregoing components may be connected by using one or more communications buses. The touchscreen may include a touch-sensitive surface and a screen. The one or more computer programs are stored in the memory, and are executed by the one or more processors. The one or more computer programs include an instruction. When the one or more processors execute the instruction, the processor is configured to: establish a wireless link to a second electronic device, where the first electronic device and the second electronic device are associated with each other; and send first information to the second electronic device by using the wireless link, where the first information includes to-be-shared data and an identifier, and the identifier is used to indicate an application module.

In an embodiment, the processor is further configured to establish a first wireless link by using a first wireless communications protocol (for example, a Wi-Fi protocol). The touchscreen is configured to: display a first screen, where the first screen may include a first control associated with data that a user of the first electronic device wants to share; receive a first operation performed on the first control; in response to the first operation, display a shortcut menu that includes a second control; receive a second operation performed on the second control; and display a discovery device list in response to the second operation, where the discovery device list may include an identifier of the second electronic device.

In an embodiment, the to-be-shared data may include an SSID and a password of a wireless local area network; or the application module indicated by the identifier is a Wi-Fi module in Settings, and the first screen may be a settings screen of a wireless local area network function in Settings; or the first information may further include an operation code, and the operation code is used to indicate to automatically access the wireless local area network by using the SSID and the password that are shared by the first electronic device; or the to-be-shared data is provided with attribute information, and the attribute information may include at least one of the following: whether storing is allowed, whether printing is allowed, whether re-sharing is allowed, and whether burning is performed immediately after reading; or the to-be-shared data may include a parameter of a Do Not Disturb mode in the first electronic device; or the application module indicated by the identifier is a Do Not Disturb mode module in Settings (Settings), and the first screen may be a settings screen of a Do Not Disturb mode in Settings (Settings); or the to-be-shared data includes a configuration parameter of a VPN in the first electronic device; or the application module indicated by the identifier is a VPN module in Settings, and the first screen may be a configuration screen of a VPN in Settings; or that the first electronic device and the second electronic device are associated with each other may specifically include: the first electronic device and the second electronic device are logged in to with a same account, or an account with which the second electronic device is logged in to is a contact of the first electronic device.

According to a seventh aspect, a technical solution of this application provides a second electronic device. The second electronic device may include one or more processors, a memory, a touchscreen, and one or more computer programs. The foregoing components may be connected by using one or more communications buses. The touchscreen may include a touch-sensitive surface and a screen. The one or more computer programs are stored in the memory, and are executed by the one or more processors. The one or more computer programs include an instruction. When the one or more processors execute the instruction, the processor is configured to: establish a wireless link to a first electronic device, where the first electronic device and the second electronic device are associated with each other; receive and parse, by using the wireless link, first information sent by the second electronic device, to obtain to-be-shared data and an identifier that are included in the first information, where the identifier is used to indicate an application module; and provide an on share service for the application module indicated by the identifier, and automatically implement a corresponding application function based on the to-be-shared data.

In an embodiment, the to-be-shared data may include an SSID and a password of a wireless local area network. The processor may be configured to: provide an on share service for a Wi-Fi module in Settings that is indicated by the identifier, and automatically access the wireless local area network by using the SSID and the password.

In an embodiment, the touchscreen is configured to: display a second screen, where the second screen may include a third control, and receive a fourth operation performed on the third control. The processor may be configured to: in response to the fourth operation, provide the on share service for the application module indicated by the identifier, and automatically implement the corresponding application function based on the to-be-shared data.

According to an eighth aspect, a technical solution of this application provides a computer-readable storage medium, including an instruction. When the instruction is run on an electronic device, the electronic device is enabled to perform the foregoing application function implementation method.

According to a ninth aspect, a technical solution of this application provides a computer program product including an instruction. When the computer program product is run on an electronic device, the electronic device is enabled to perform the foregoing application function implementation method.

According to a tenth aspect, a technical solution of this application provides an application function implementation apparatus. The apparatus has functions of implementing behavior of the first electronic device or the second electronic device in the foregoing method. The functions may be implemented by hardware, or may be implemented by hardware by executing corresponding software. The hardware or the software includes one or more modules corresponding to the foregoing functions.

It should be understood that descriptions of technical features, technical solutions, beneficial effects, or similar terms in this application do not imply that all features and advantages can be implemented in any individual embodiment. On the contrary, it may be understood that descriptions of the features or the beneficial effects mean that at least one embodiment includes a specific technical feature, technical solution, or beneficial effect. Therefore, the descriptions of the technical features, the technical solutions, or the beneficial effects in this specification may not necessarily belong to one embodiment. Further, the technical features, the technical solutions, and the beneficial effects described in the embodiments may be combined in any proper manner. A person skilled in the art understands that an embodiment may be implemented without one or more specific technical features, technical solutions, or beneficial effects in a specific embodiment. In other embodiments, additional technical features and beneficial effects may further be identified in a specific embodiment that does not reflect all the embodiments.

DESCRIPTION OF EMBODIMENTS

Figure 1A:
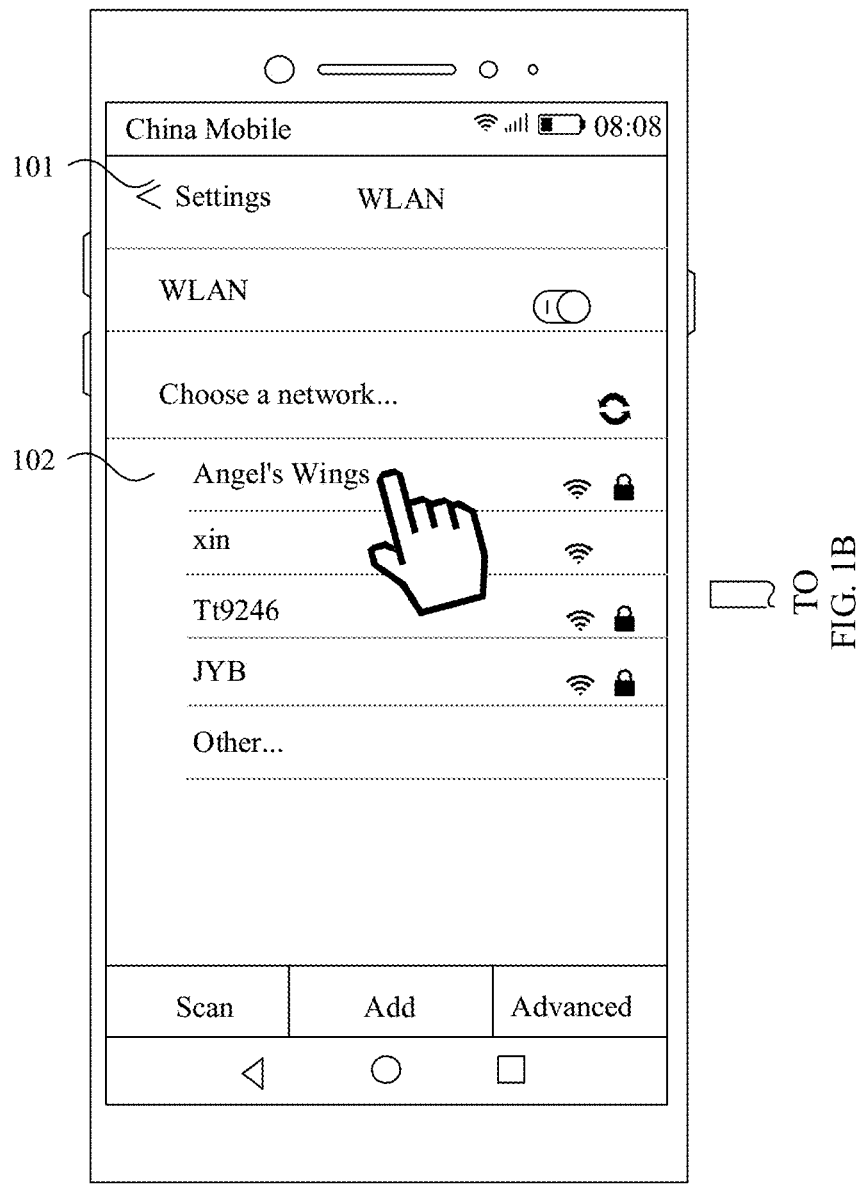
FIG. 1A and FIG. 1B are schematic diagrams of some graphical user interfaces displayed on a mobile phone according to some embodiments.
Figure 1B:
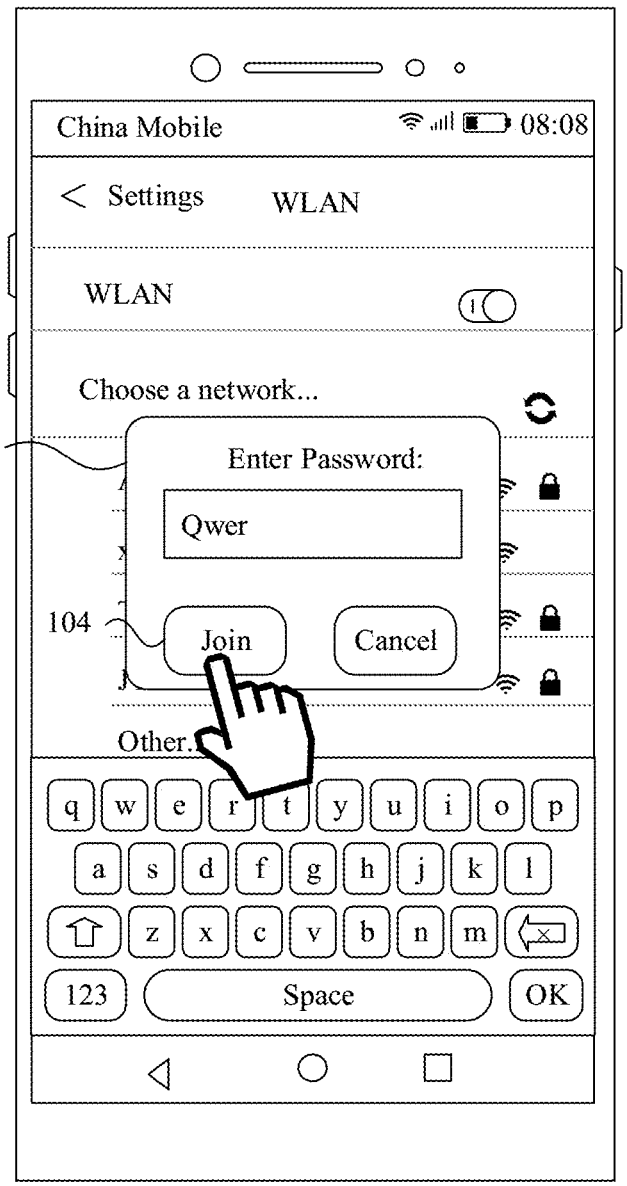
Figure 2:
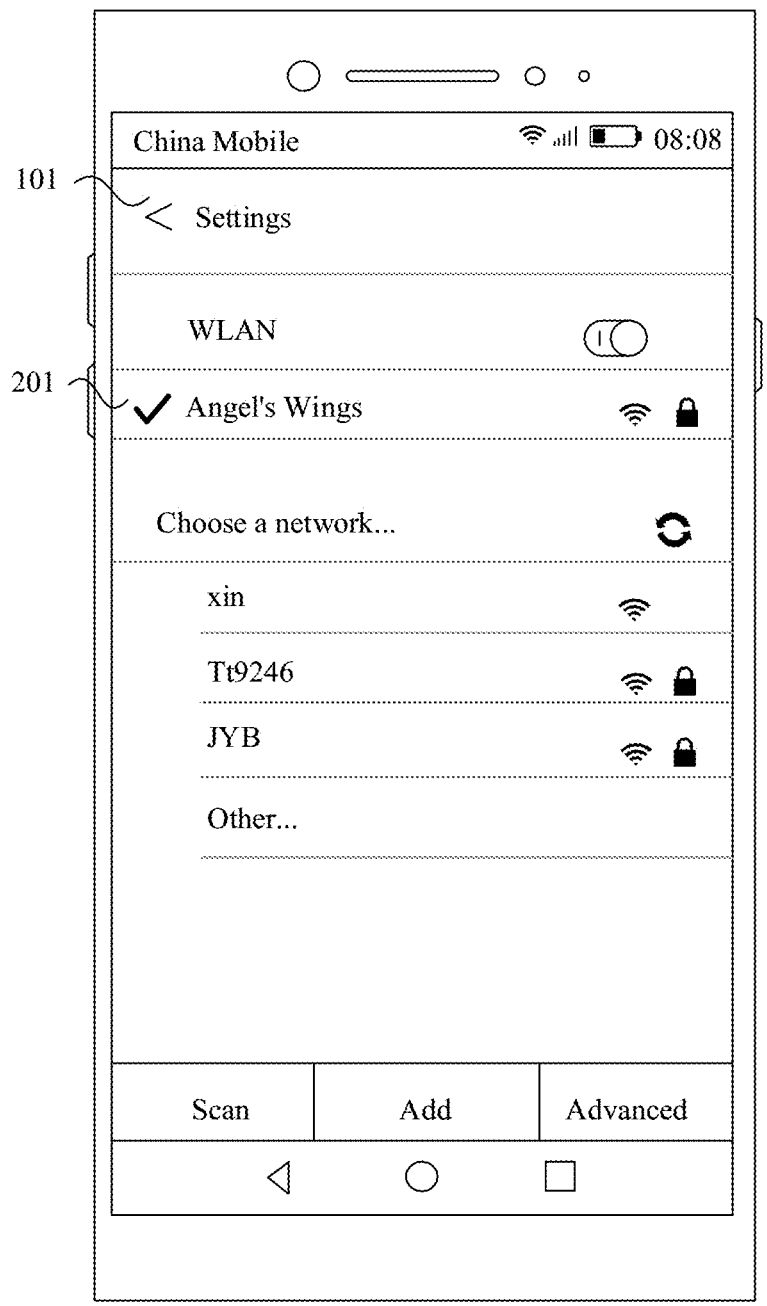
FIG. 2 is a schematic diagram of some graphical user interfaces displayed on a mobile phone according to some other embodiments.

It should be understood that, although terms such as first and second may be used in the embodiments of this application to describe the electronic device for data sharing, the electronic device should not be limited to these terms. These terms are merely used to distinguish between electronic devices. For example, without departing from the scope of the embodiments of this application, a first network device may also be referred to as a second network device. Similarly, a second network device may also be referred to as a first network device.

The embodiments of this application provide an application function implementation method. The method may be applied to an electronic device. According to the application function implementation method, an application function of the electronic device can be implemented, for example, a wireless local area network can be successfully accessed, without requiring a series of operations performed by a user. In this way, use efficiency of the electronic device is improved, complexity of user operations is reduced, and efficient interaction between the electronic device and the user is implemented.

The embodiments of this application provide a system architecture to which the foregoing application function implementation method can be applied. The system architecture may include at least two electronic devices, for example, a first electronic device and a second electronic device.

A wireless link may be established between the first electronic device and the second electronic device by using a wireless communications protocol.

The wireless communications protocol may be a short-range communications protocol such as a wireless fidelity (Wi-Fi) protocol, a Bluetooth protocol, a ZigBee protocol, or a near field communication (NFC) protocol. The wireless communications protocol may alternatively be a protocol used in a 4G technology, a 5G technology, or a next-generation communications technology.

The first electronic device and the second electronic device may exchange data based on the established wireless link. For example, the first electronic device and the second electronic device may share various types of data such as an SSID and a password of a wireless local area network, a video, a picture, a web page, a contact, and an applet.

In some embodiments of this application, during data sharing, the first electronic device may be used as a transmitter for data sharing, and the second electronic device may be used as a receiver for data sharing. In some other embodiments of this application, the second electronic device may be used as a transmitter for data sharing, and the first electronic device may be used as a receiver for data sharing. This is not specifically limited in the embodiments of this application. For ease of description, in the following embodiments of this application, that the first electronic device is a transmitter for data sharing and the second electronic device is a receiver for data sharing is used as an example for specific description.

In the embodiments of this application, the first electronic device and the second electronic device may be electronic devices of a same type. For example, both the first electronic device and the second electronic device are mobile phones. Alternatively, the first electronic device and the second electronic device may be electronic devices of different types. For example, the first electronic device is a mobile phone, and the second electronic device is a tablet computer. A specific structure of the mobile phone is shown in FIG. 3, and is specifically described in the following embodiment.

The following describes an electronic device (for example, a first electronic device or a second electronic device), a graphical user interface (which may be referred to as a GUI for short below) used for the electronic device, and embodiments of using the electronic device. In some embodiments of this application, the electronic device may be a portable electronic device that further includes other functions such as a personal digital assistant function and/or a music player function, for example, a mobile phone, a tablet computer, or a wearable electronic device (for example, a smartwatch) having a wireless communication function. An example embodiment of a portable electronic device includes but is not limited to a portable electronic device using iOS, Android, Microsoft, or another operating system. The portable electronic device may alternatively be another portable electronic device, for example, a laptop (Laptop) computer having a touch-sensitive surface (for example, a touch panel). It should be further understood that, in some other embodiments of this application, the electronic device may alternatively not be a portable electronic device, but a desktop computer having a touch-sensitive surface (for example, a touch panel).

Figure 3:
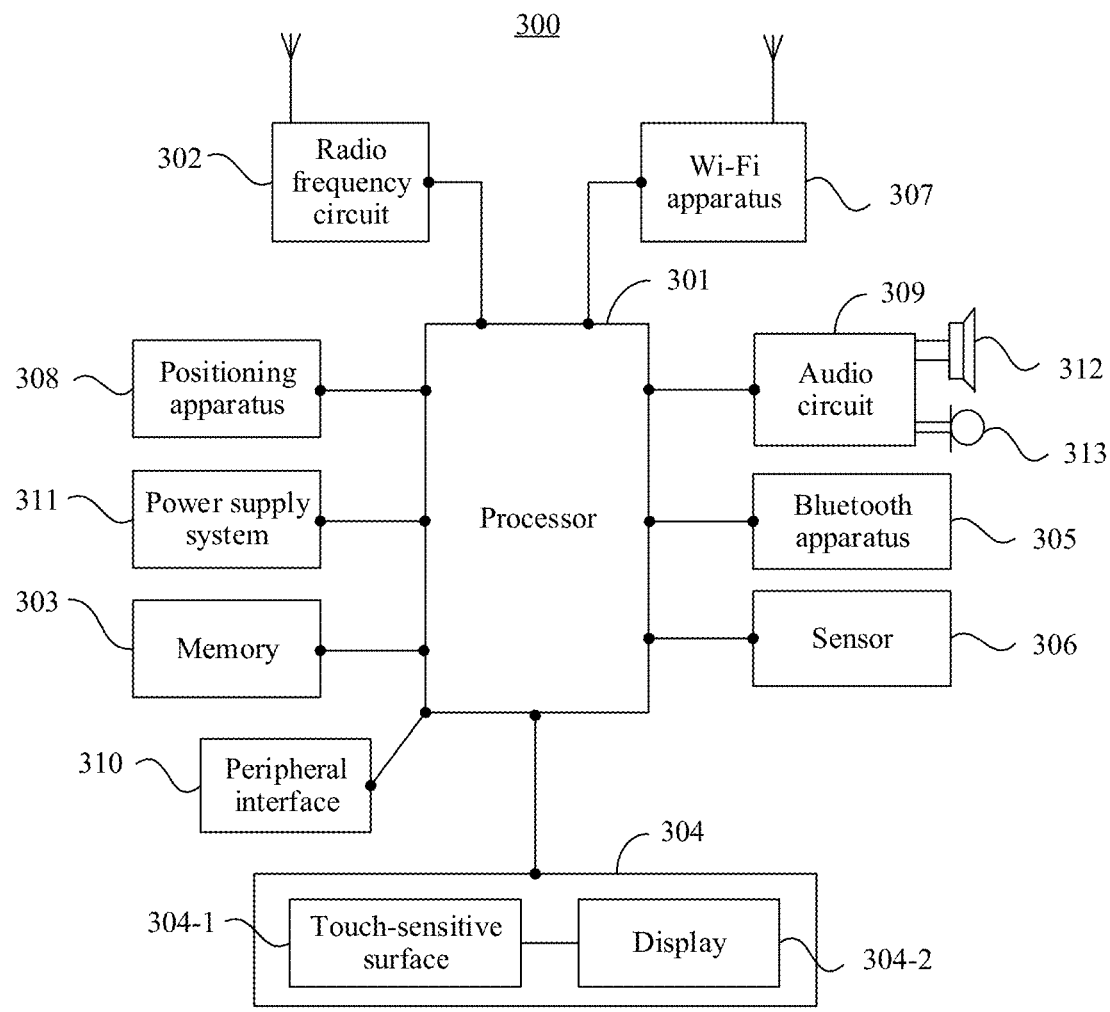
FIG. 3 is a schematic diagram of a hardware structure of a mobile phone 300 according to an embodiment of this application.

Referring to FIG. 3, in the embodiments of this application, that the electronic device is a mobile phone 300 is used as an example to describe the electronic device provided in the embodiments of this application. A person skilled in the art may understand that the mobile phone 300 shown in FIG. 3 is merely an example, and does not constitute a limitation on the mobile phone 300. In addition, the mobile phone 300 may have more or fewer components than those shown in the figure, or may combine two or more components, or may have different component configurations. Various components shown in FIG. 3 may be implemented in hardware that includes one or more signal processors and/or application-specific integrated circuits (ASIC), in software, or in a combination of hardware and software.

As shown in FIG. 3, the mobile phone may include components such as a processor 301, a radio frequency (RF) circuit 302, a memory 303, a touchscreen 304, a Bluetooth apparatus 305, one or more sensors 306, a Wi-Fi apparatus 307, a positioning apparatus 308, an audio circuit 309, a peripheral interface 310, and a power supply system 311. These components may communicate with each other by using one or more communications buses or signal lines (not shown in FIG. 3).

The following describes the components of the mobile phone 300 with reference to FIG. 3.

The processor 301 is a control center of the mobile phone 300. The processor 301 is connected to various parts of the mobile phone 300 by using various interfaces and cables, and performs various functions of the mobile phone 300 and processes data by running or executing an application (App) stored in the memory 303, and by invoking data and an instruction that are stored in the memory 303. In some embodiments, the processor 301 may include one or more processing units. The processor 301 may further integrate an application processor and a modem processor. The application processor mainly processes an operating system, a user interface, an application, and the like. The modem processor mainly processes wireless communication. It may be understood that the modem processor may alternatively not be integrated into the processor 301. For example, the processor 301 may be a chip Kirin 970 manufactured by Huawei.

The radio frequency circuit 302 may be configured to receive and send a radio signal in an information receiving and sending process or a conversation process. Specifically, after receiving downlink data from a base station, the radio frequency circuit 302 may send the downlink data to the processor 301 for processing, and sends related uplink data to the base station. The radio frequency circuit 302 usually includes but is not limited to an antenna, at least one amplifier, a transceiver, a coupler, a low noise amplifier, a duplexer, and the like. In addition, the radio frequency circuit 302 may further communicate with another device through wireless communication. Any communications standard or protocol may be used for the wireless communication, and includes but is not limited to a global system for mobile communications, a general packet radio service, code division multiple access, wideband code division multiple access, long term evolution, an email, an SMS messaging service, and the like.

The memory 303 is configured to store an application program and data. The processor 301 performs various functions of the mobile phone 300 and processes data by running the application and the data that are stored in the memory 303. The memory 303 mainly includes a program storage area and a data storage area. The program storage area may store an operating system, and an application required by at least one function (for example, a sound playback function or an image playback function). The data storage area may store data (for example, audio data or a phone book) created when the mobile phone 300 is used. In addition, the memory 303 may include a high-speed random access memory, and may further include a non-volatile memory such as a magnetic disk storage device, a flash memory, or another volatile solid-state storage device. The memory 303 may store various operating systems such as an iOS® operating system developed by Apple and an Android® operating system developed by Google.

The touchscreen 304 may include a touch-sensitive surface 304-1 and a display 304-2. The touch-sensitive surface 304-1 (for example, a touch panel) may collect a touch event performed by a user on or near the mobile phone 300 (for example, an operation performed by the user on the touch-sensitive surface 304-1 or near the touch-sensitive surface 304-1 by using any proper object such as a finger or a stylus), and send collected touch information to another device such as the processor 301. The touch event performed by the user near the touch-sensitive surface 304-1 may be referred to as floating touch control. The floating touch control may mean that the user does not need to directly touch the touch panel to select, move, or drag a target (for example, an icon), and the user only needs to be located near an electronic device to implement a desired function. In an application scenario of the floating touch control, terms such as "touch" and "contact" do not implicitly refer to directly touching the touchscreen, but refer to being near or close to the touchscreen. The touch-sensitive surface 304-1 on which the floating touch control can be performed may be implemented in a capacitive manner, an infrared light sensing manner, an ultrasonic wave manner, or the like. The touch-sensitive surface 304-1 may include two parts: a touch detection apparatus and a touch controller. The touch detection apparatus detects a touch orientation of the user, detects a signal generated by a touch operation, and transmits the signal to the touch controller. The touch controller receives touch information from the touch detection apparatus, converts the touch information into touch point coordinates, and sends the touch point coordinates to the processor 301. The touch controller may further receive an instruction sent by the processor 301, and execute the instruction. In addition, the touch-sensitive surface 304-1 may be implemented in a plurality of manners such as a resistive manner, a capacitive manner, an infrared manner, or a surface acoustic wave manner. The display (also referred to as a display) 304-2 may be configured to display information entered by the user or information provided for the user, and various menus of the mobile phone 300. The display 304-2 may be configured in a form such as a liquid crystal display or an organic light emitting diode. The touch-sensitive surface 304-1 may cover the display 304-2. After detecting a touch event on or near the touch-sensitive surface 304-1, the touch-sensitive surface 304-1 transmits the touch event to the processor 301, to determine a type of the touch event. Then, the processor 301 may provide a corresponding visual output on the display 304-2 based on the type of the touch event. Although the touch-sensitive surface 304-1 and the display 304-2 are used as two independent components to implement input and output functions of the mobile phone in FIG. 3, the touch-sensitive surface 304-1 and the display 304-2 may be integrated to implement the input and output functions of the mobile phone in some embodiments. It may be understood that the touchscreen 304 is formed by stacking a plurality of layers of materials. In this embodiment of this application, only the touch-sensitive surface (layer) and the display (layer) are displayed, and another layer is not recorded. In addition, in some other embodiments of this application, the touch-sensitive surface 304-1 may cover the display 304-2, and a size of the touch-sensitive surface 304-1 is greater than a size of the display 304-2, so that the display 304-2 is completely covered by the touch-sensitive surface 304-1. Alternatively, the touch-sensitive surface 304-1 may be disposed on the front facet of the mobile phone 300 in a full panel form, in other words, all touches performed by the user on the front facet of the mobile phone 300 can be sensed by the mobile phone 300. In this way, full touch control experience on the front facet of the mobile phone 300 can be implemented. In some other embodiments, the touch-sensitive surface 304-1 is disposed on the front facet of the mobile phone 300 in a full panel form, and the display 304-2 may also be disposed on the front facet of the mobile phone 300 in a full panel form. In this way, a bezel-less structure on the front facet of the mobile phone 300 can be implemented.

The mobile phone 300 may further include the Bluetooth apparatus 305, configured to implement data exchange between the mobile phone 300 and another short-range electronic device (for example, a mobile phone or a smartwatch). In this embodiment of this application, the Bluetooth apparatus may be an integrated circuit, a Bluetooth chip, or the like.

The mobile phone 300 may further include the at least one sensor 306 such as an optical sensor, a motion sensor, and another sensor. Specifically, the optical sensor may include an ambient light sensor and a proximity sensor. The ambient light sensor may adjust luminance of the display of the touchscreen 304 based on ambient light luminance. The proximity sensor may power off the display when the mobile phone 300 approaches ears. As one of motion sensors, an accelerometer sensor may detect a magnitude of acceleration in each direction (usually, in three axes), may detect a magnitude and a direction of gravity when the accelerometer sensor is stationary, and may be used in an application for identifying a posture of the mobile phone 300 (for example, screen switching between a landscape mode and a portrait mode, a related game, and magnetometer posture calibration), a vibration identification-related function (for example, a pedometer or a knock), and the like. Other sensors such as a gyroscope, a barometer, a hygrometer, a thermometer, and an infrared sensor that may be further disposed on the mobile phone 300 are not described herein.

In various embodiments of this application, the mobile phone 300 may further have a fingerprint recognition function. For example, a fingerprint recognizer may be disposed on the back facet of the mobile phone 300 (for example, below a rear-facing camera), or a fingerprint recognizer may be disposed on the front facet of the mobile phone 300 (for example, below the touchscreen 304). In addition, the fingerprint recognizer may be disposed on the touchscreen 304 to implement the fingerprint recognition function, in other words, the fingerprint recognizer and the touchscreen 304 may be integrated to implement the fingerprint recognition function of the mobile phone 300. In this case, the fingerprint recognizer may be disposed on the touchscreen 304 to serve as a part of the touchscreen 304, or may be disposed on the touchscreen 304 in another manner. In addition, the fingerprint recognizer may be further implemented as a full-panel fingerprint recognizer, so that the touchscreen 304 can be considered as a panel on which fingerprint collection may be performed at any location.

The fingerprint recognizer may send a collected fingerprint to the processor 301, so that the processor 301 processes the fingerprint (for example, verifies the fingerprint). A main component of the fingerprint recognizer in this embodiment of this application is a fingerprint sensor. The fingerprint sensor may use any type of sensing technology, which includes but is not limited to an optical sensing technology, a capacitive sensing technology, a piezoelectric sensing technology, an ultrasonic sensing technology, and the like.

In addition, for a specific technical solution of integrating a fingerprint sensor into the touchscreen in this embodiment of this application, refer to Patent Application No. US 2015/0036065 A1 filed with the United States Patent and Trademark Office and entitled "FINGERPRINT SENSOR IN ELECTRONIC DEVICE", which is incorporated in the embodiments of this application by reference in its entirety.

The Wi-Fi apparatus 307 is configured to provide network access complying with a Wi-Fi-related standard protocol for the mobile phone 300. The mobile phone 300 may access a Wi-Fi access point by using the Wi-Fi apparatus 307, to further help the user to receive and send an e-mail, browse a web page, access streaming media, and the like. The Wi-Fi apparatus 307 provides wireless broadband internet access for the user. In some other embodiments, the Wi-Fi apparatus 307 may also be used as a Wi-Fi wireless access point, and may provide Wi-Fi network access for another electronic device.

The positioning apparatus 308 is configured to provide a geographic location for the mobile phone 300. It may be understood that the positioning apparatus 308 may be a receiver of a positioning system such as a global positioning system (GPS) or a BeiDou navigation satellite system. After receiving the geographic location sent by the foregoing positioning system, the positioning apparatus 308 sends the information to the processor 301 for processing, or sends the information to the memory 303 for storage. In some other embodiments, the positioning apparatus 308 may be a receiver of an assisted global positioning system (AGPS). The AGPS performs GPS positioning through specific assistance, and by using a signal of a based station and a GPS satellite signal, may accelerate positioning performed by the mobile phone 300. In the AGPS system, the positioning apparatus 308 may obtain positioning assistance by communicating with an assisted positioning server (for example, a positioning server of the mobile phone). The AGPS system serving as an assisted server assists the positioning apparatus 308 in completing ranging and positioning services. In this case, the assisted positioning server communicates with the positioning apparatus 308 (that is, the receiver of the GPS) of an electronic device such as the mobile phone 300 by using a wireless communications network, to provide positioning assistance.

The audio circuit 309, a speaker 312, and a microphone 313 may provide an audio interface between the user and the mobile phone 300. The audio circuit 309 may convert received audio data into an electrical signal and transmit the electrical signal to the speaker 312, and the speaker 312 converts the electrical signal into a sound signal for output. In addition, the microphone 313 converts a collected sound signal into an electrical signal, and the audio circuit 309 receives the electrical signal, converts the electrical signal into audio data, and outputs the audio data to the RF circuit 302, to send the audio data to, for example, another mobile phone, or outputs the audio data to the memory 303 for further processing.

The peripheral interface 310 is configured to provide various interfaces for an external input/output device (for example, a keyboard, a mouse, an external display, an external memory, or a subscriber identity module card). For example, the mobile phone 300 is connected to the mouse by using a universal serial bus interface, and is connected to a subscriber identity module (SIM) card provided by a telecommunications operator, by using a metal contact on a card slot of the subscriber identity module card. The peripheral interface 310 may be configured to couple the external input/output peripheral device to the processor 301 and the memory 303.

The mobile phone 300 may further include the power supply apparatus 311 (for example, a battery or a power management chip) configured to supply power to the components. The battery may be logically connected to the processor 301 by using the power management chip, to implement functions such as charging and discharging management and power consumption management by using the power supply apparatus 311.

The mobile phone 300 may further include a camera (a front-facing camera and/or a rear-facing camera), a flash, a micro projection apparatus, a near field communication (NFC) apparatus, and the like, which are not shown in FIG. 3. Details are not described herein.

For example, the memory 303 of the mobile phone 300 may store an Android® operating system. The Android® operating system is a Linux-based mobile device operating system, and implements various functions in combination with the foregoing hardware in the mobile phone 300. The following describes a software architecture of the stored Android® operating system in detail. It should be noted that, in this embodiment of this application, the Android® operating system is merely used as an example to describe a software environment required by an electronic device to implement the technical solution in this embodiment. A person skilled in the art may understand that this embodiment of this application can be implemented by using another operating system.

Figure 4:
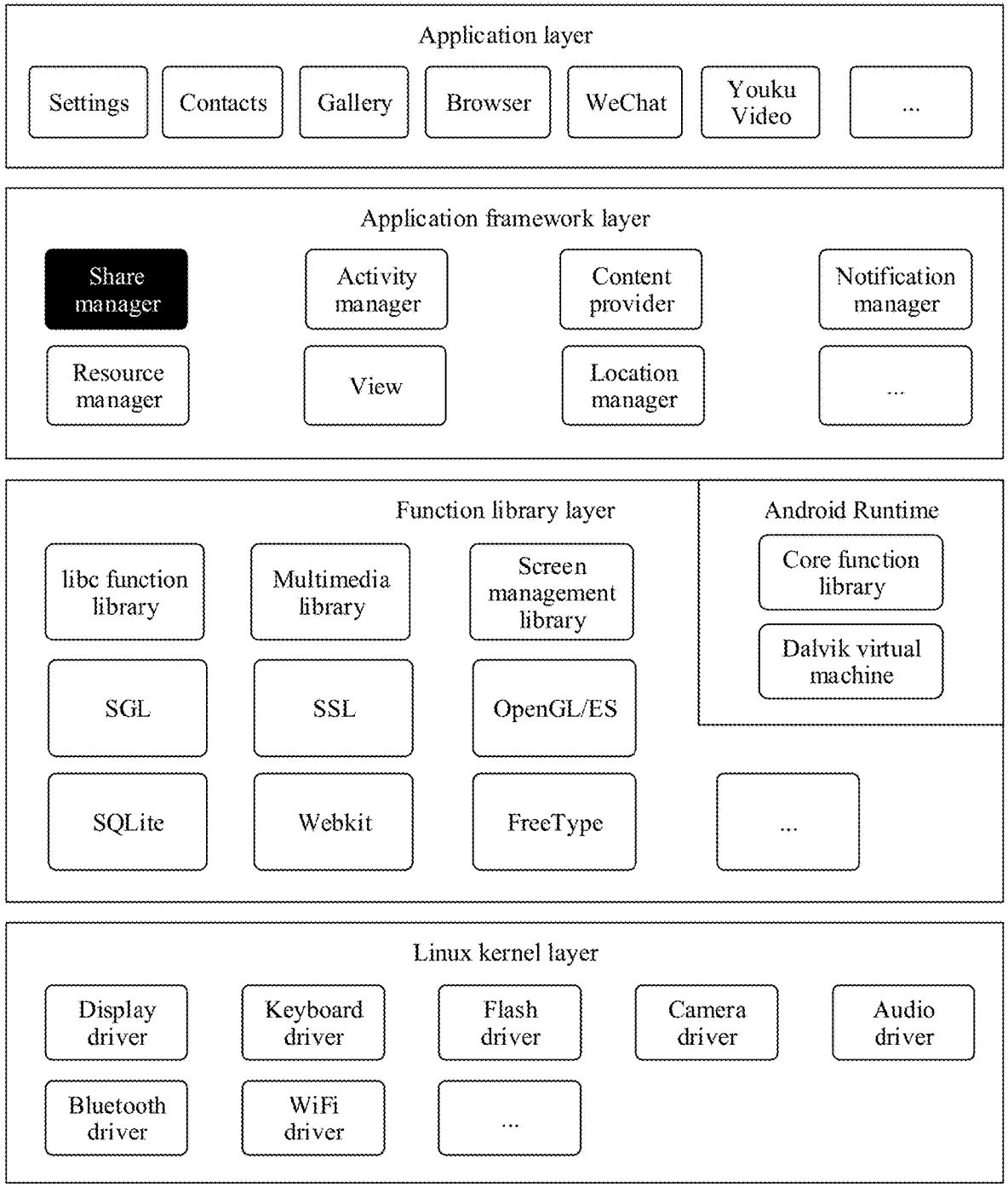
FIG. 4 is a schematic diagram of a software architecture of an Android® operating system that can be run in an electronic device.

For example, FIG. 4 is a schematic diagram of a software architecture of an Android® operating system that can be run in the foregoing electronic device. The software architecture may be divided into four layers: an application layer, an application framework layer, a function library layer, and a Linux kernel layer.

1. Application Layer

The application layer is the top layer of the operating system, and includes native applications of the operating system, for example, Settings, Contacts, Messaging, Calls, Gallery, Calendar, and Browser. Developers can write applications such as WeChat and Youku, and install the applications at this layer. The application may include a plurality of application modules. For example, a plurality of application modules such as a Wi-Fi module and a Bluetooth module may be included in Settings. The application is usually developed in Java language, and is completed by invoking an application programming interface (API) provided by the application framework layer.

2. Application Framework Layer

The application framework layer mainly provides various APIs for developers to access applications. The developers may interact with the bottom layer (for example, the function library layer and the Linux kernel layer) of the operating system by using an application framework, to develop their respective applications. The application framework mainly includes a series of services and management systems of the Android® operating system. The application framework mainly includes the following basic services:

Activity manager: The activity manager is configured to: manage a life cycle of an application, and provide a frequently used navigation back function.

Content provider: The content provider is configured to manage data sharing and access between different applications.

Notification manager: The notification manager is configured to control an application to display prompt information (for example, an alert or a notification) on a status bar, a lock screen, or the like to a user.

Resource manager: The resource manager provides a non-code resource (for example, a character string, a graph, or a layout file) for an application for use.

View: The view has abundant and extensible view sets, may be used to construct an application, and specifically includes a list, a grid, a text box (TextBox), a button, and an embeddable web page browser.

Location manager: The location manager mainly enables an application to access a geographic location of the electronic device.

In an embodiment of this application, the application framework layer may further include a share manager. The share manager is configured to provide a share service and an on share service for an application. After the application registers with the share manager for the on share service, the share manager may provide the on share service for the application by using an on share interface, or the application may invoke a share interface to request the share manager to provide the share service.

3. Function Library Layer

The function library layer is a support of the application framework, and is an important link that connects the application framework layer and the Linux kernel layer. The function library layer includes some function libraries compiled in computer programming language C or C++. These function libraries can be used by different components in the operating system, and provide services for the developers by using the application framework layer. In an embodiment, the function library may include a libc function library, and the libc function library is specially customized for an embedded Linux-based device. The function library may further include a multimedia library (Media Framework), and the library supports playback and recording of audio or videos in a plurality of encoding formats, and also supports a still image file and a common audio or video encoding format. The function library further includes a screen management library (Surface Manager). The screen management library is mainly responsible for managing access to a display system, is specifically responsible for managing interaction between display and access operations when a plurality of applications are performed, and is also responsible for performing display composition on 2D drawing and 3D drawing.

The function library layer may further include other function libraries used to implement functions of a mobile phone, for example, an SGL (Scalable Graphics Library): an XML (Extensible Markup Language) file-based 2D graph and image processing engine; an SSL (Secure Sockets Layer), which is located between a TVP/IP protocol and various application layer protocols, and provides a support for data communication; OpenGL/ES, which supports a 3D effect; SQLite: a relational database engine; Webkit: a web browser engine; and FreeType, which supports a bitmap and a vector font.

Android Runtime is a running environment in the Android® operating system, and is a new virtual machine used in the Android® operating system. An AOT (Ahead-Of-Time) technology is used in Android Runtime. When an application is installed for the first time, a bytecode of the application is precompiled into a machine code, so that the application becomes a real local application. Then, a compilation step is omitted when the application is run again, so that both starting and execution become faster.

In some other embodiments of this application, Android Runtime may alternatively be replaced with a core function library and a Dalvik virtual machine. The core function library provides most functions of an API in the Java language, and mainly provides, for the application framework layer by using a Java native interface (JNI), an interface for invoking a bottom-layer program library. In addition, the core function library further includes some core APIs of the operating system, for example, android.os, android.net, and android.media. The Dalvik virtual machine uses a JIT (Just-in-Time) compilation mechanism. Each time a process is started, the virtual machine needs to recompile the bytecode in the background. This affects a startup speed. Each application is run in one Dalvik virtual machine instance, and each Dalvik virtual machine instance is independent process space. The Dalvik virtual machine is designed to enable a plurality of virtual machines to run in one device efficiently. The Dalvik virtual machine may execute a file format .dex. The dex format is a compression format specially designed for Dalvik, and is suitable for a system having limited memory and a limited processor speed. It should be noted that the Dalvik virtual machine depends on the Linux kernel to provide a basic function (thread and bottom-layer memory management). It may be understood that Android Runtime and Dalvik are different types of virtual machines, and a person skilled in the art may select different forms of virtual machines in different cases.

4. Linux Kernel Layer

The Linux kernel layer provides a core system service of the operating system. For example, security, memory management, process management, a network protocol stack, and a driver model are all based on the Linux kernel. The Linux kernel is also used as an abstraction layer between hardware and a software stack. The layer includes many driver programs related to the electronic device, which mainly include a display driver, a Linux-based frame buffer driver, a keyboard driver used as an input device, a flash driver based on a memory technology device, a camera driver, an audio driver, a Bluetooth driver, a Wi-Fi driver, and the like.

For example, all technical solutions in the following embodiments may be implemented in the electronic device having the foregoing hardware architecture and the foregoing software architecture.

The following describes in detail an application function implementation method provided in the embodiments of this application with reference to the accompanying drawings and application scenarios. The application function implementation method provided in the embodiments of this application may be applied to a process of sharing data between electronic devices (for example, a first electronic device and a second electronic device). Before sharing data, the first electronic device may first establish a wireless link to the second electronic device. The sharing of the data may enable the second electronic device to automatically implement a specific function after receiving the data. For example, after receiving a related parameter of a wireless local area network that is shared by the first electronic device, the second electronic device may automatically access the wireless local area network. For another example, after receiving a user name and a password of a specific application that are shared by the first electronic device, the second electronic device may automatically download and install the application, and automatically log in to the application by using the user name and the password. For another example, after receiving a parameter of a Do Not Disturb mode that is shared by the first electronic device, the second electronic device automatically loads the parameter and performs a related operation.

In some embodiments of this application, for example, the first electronic device has successfully accessed a specific wireless local area network, or the first electronic device stores an SSID of a wireless local area network and a password corresponding to the SSID. For example, the SSID of the wireless local area network is "Angel's Wings". A user wants to share the wireless local area network whose SSID is "Angel's Wings" with the second electronic device by using the first electronic device. The first electronic device may share related parameters (for example, the SSID and the password corresponding to the SSID) of the wireless local area network with the second electronic device, so that the second electronic device automatically accesses the wireless local area network by using the related parameters of the wireless local area network that are shared by the first electronic device. In some embodiments of this application, the SSID of the wireless local area network may also be referred to as a name, a network name, a network name, or the like. In addition, the first electronic device may further establish a wireless link to the second electronic device based on a moment share function.

When the first electronic device establishes a wireless link to the second electronic device based on a moment share function, the first electronic device discovers the second electronic device by using a specific wireless communications protocol (for example, a Bluetooth protocol), is matched against the second electronic device, and after successfully matching the second electronic device, establishes the wireless link to the second electronic device by using the wireless communications protocol. Alternatively, the first electronic device first discovers the second electronic device by using a wireless communications protocol (for example, a Bluetooth protocol), is matched against the second electronic device, and after successfully matching the second electronic device, establishes the wireless link to the second electronic device by using another wireless communications protocol (for example, a Wi-Fi protocol).

It may be understood that "moment share" and "Moment Share" are merely terms used in the embodiments of this application, meanings represented by the term has been recorded in the embodiments of this application, and a name of the term cannot constitute any limitation on the embodiments of this application. During specific implementation, "moment share" may be implemented by using various sharing functions provided by an existing mobile phone manufacturer, for example, AirDrop (AirDrop) of Apple or Huawei Share (Huawei Share) of Huawei. In addition, in some other embodiments of this application, "moment share" may also be referred to as another term such as "short-range sharing". Similarly, "Moment Share" mentioned in the embodiments of this application may also be referred to as another term such as "Shoot Share" in some other embodiments.

Figure 5A:
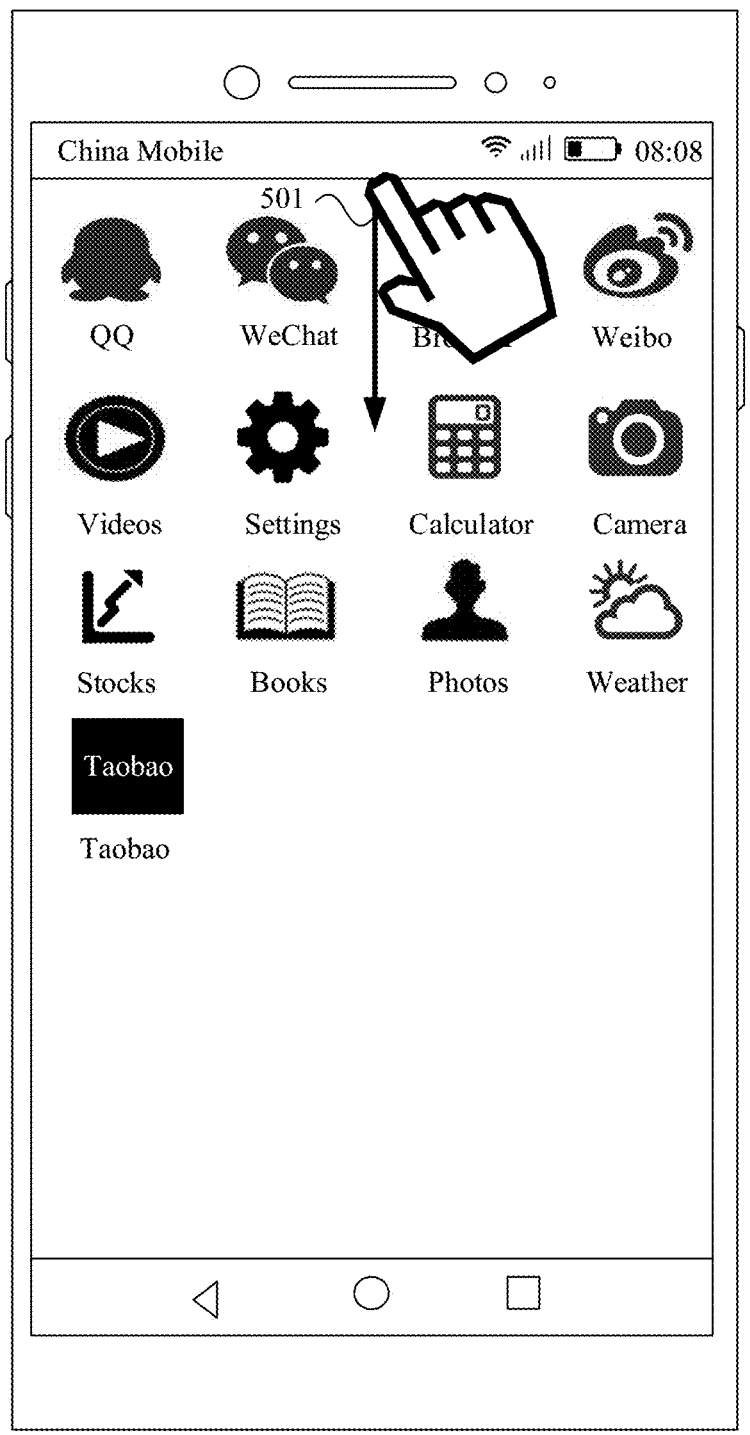
FIG. 5A to FIG. 5C are schematic diagrams of some graphical user interfaces displayed on an electronic device according to an embodiment of this application.
Figure 5B:
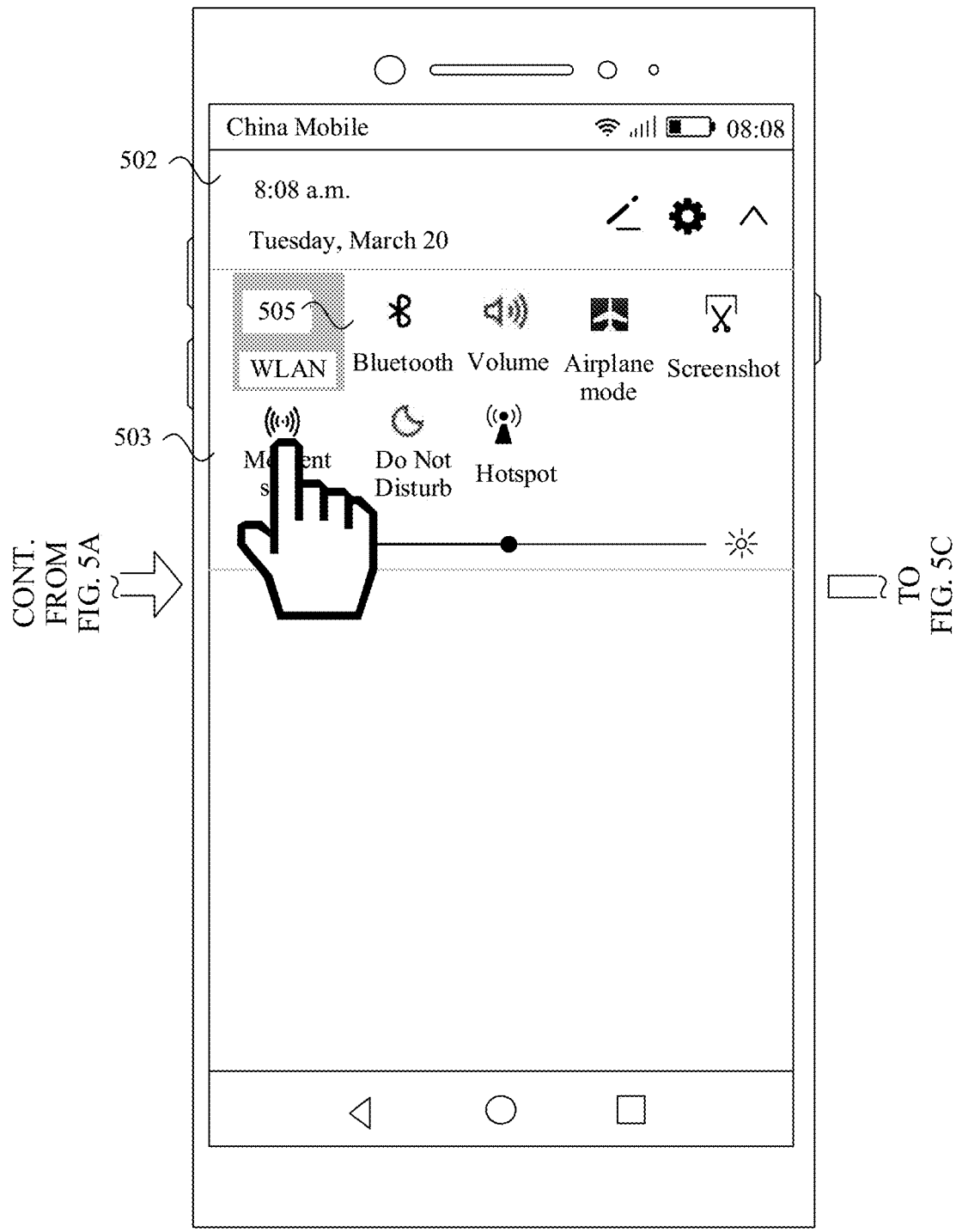
Figure 5C:
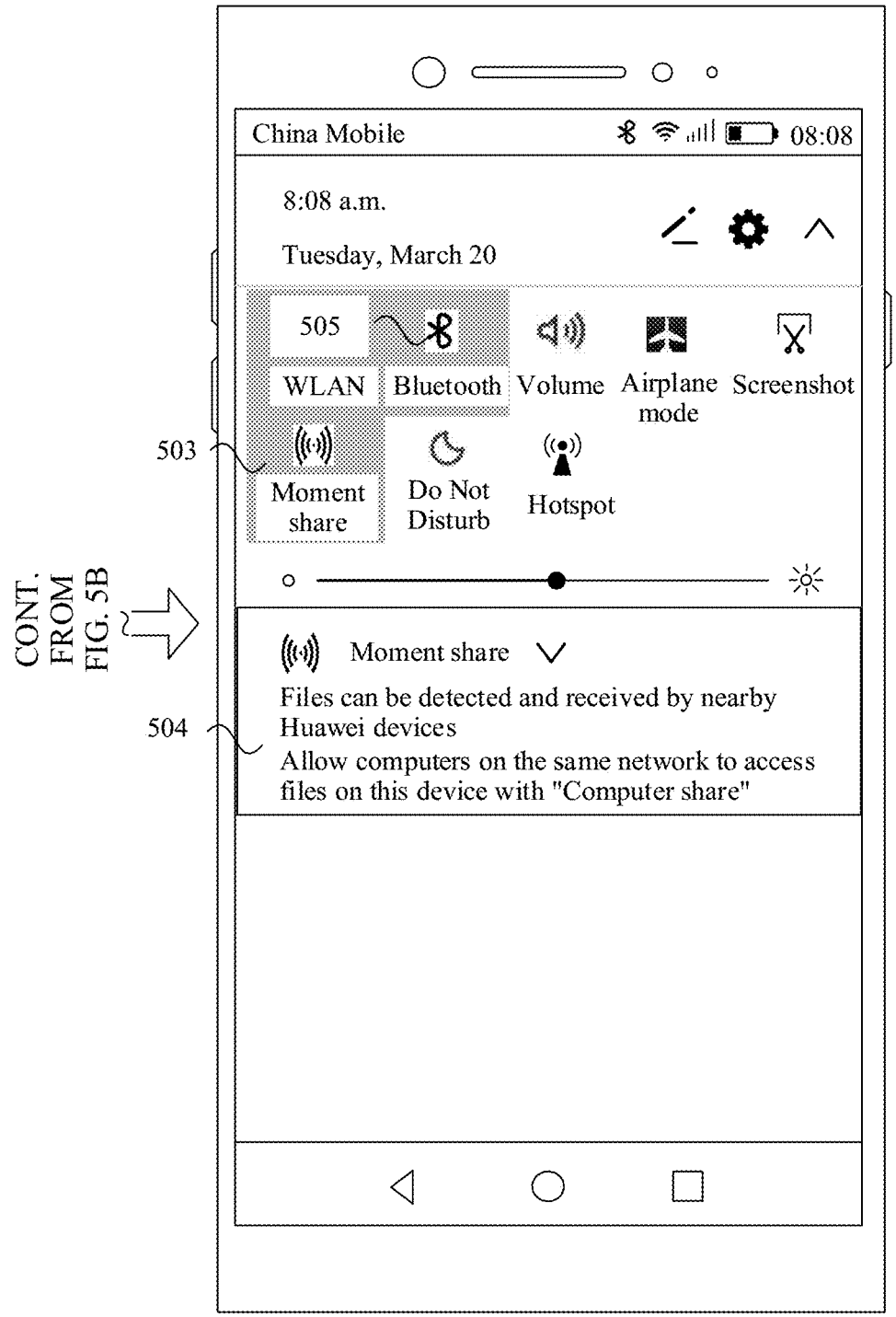

The user may separately enable moment share functions of the first electronic device and the second electronic device. In some embodiments of this application, a switch button used to enable the moment share function may be a virtual switch button displayed on a touchscreen of an electronic device. For example, as shown in FIG. 5A, the user performs a swiping operation on a touchscreen of the second electronic device based on a swiping track 501 shown in FIG. 5A. As shown in FIG. 5B, in response to the swiping operation, a notification bar 502 is displayed on the touchscreen of the second electronic device. The user performs a tap operation on a switch button 503 for the moment share function in the notification bar 502. The second electronic device enables the moment share function in response to the tap operation. In addition, the second electronic device may change a display effect of the switch button 503. For example, the display effect of the switch button 503 is changed from "white" shown in FIG. 5B into "gray" shown in FIG. 5C, where "gray" indicates that the second electronic device enables the moment share function, and "white" indicates that the second electronic device does not enable the moment share function. In some other embodiments of this application, as shown in FIG. 5C, the second electronic device may further display a prompt message 504 in the notification bar 502, to prompt the user that the moment share function has been enabled. In addition, in some embodiments of this application, when a wireless link is established between electronic devices based on the moment share function, a Bluetooth low energy (BLE) link may be established. Therefore, after the user performs a tap operation on the switch button 503 for the moment share function, even if Bluetooth and Wi-Fi of the electronic device are not enabled, the electronic device may still automatically enable a corresponding function. For example, when Wi-Fi of the second electronic device is enabled but Bluetooth of the second electronic device is not enabled, the second electronic device may further enable Bluetooth in response to the tap operation. The second electronic device may also change a display effect of a switch button 505 of Bluetooth. For example, the display effect of the switch button 505 is changed from "white" shown in FIG. 5B into "gray" shown in FIG. 5C, where "gray" indicates that the second electronic device enables Bluetooth, and "white" indicates that the second electronic device does not enable Bluetooth.

In some other embodiments of this application, the switch button used to enable the moment share function may alternatively be a physical button. The physical button may be disposed on a surface of the electronic device (for example, on a side surface of a mobile phone). After a finger of the user presses or dials the physical button, the electronic device may enable the moment share function. After the finger of the user presses or dials the physical button again, the electronic device may disable the moment share function.

In some other embodiments of this application, the moment share function of the electronic device (for example, the first electronic device or the second electronic device) may alternatively be automatically enabled when a specific condition is met, instead of being manually enabled by the user. For example, the first electronic device may automatically enable the moment share function of the first electronic device when receiving a tap operation performed by the user on a related control used to share a wireless local area network. For another example, the second electronic device may automatically enable the moment share function of the second electronic device when detecting that there is an available wireless local area network.

After the moment share functions of the first electronic device and the second electronic device are enabled, the first electronic device serving as a transmitter may discover the second electronic device. The first electronic device may further establish a wireless link to the second electronic device based on the moment share function. The first electronic device may share data with the second electronic device based on the established wireless link.

For example, the user may share, with the second electronic device, a wireless local area network currently accessed by the first electronic device.

Figure 6A:
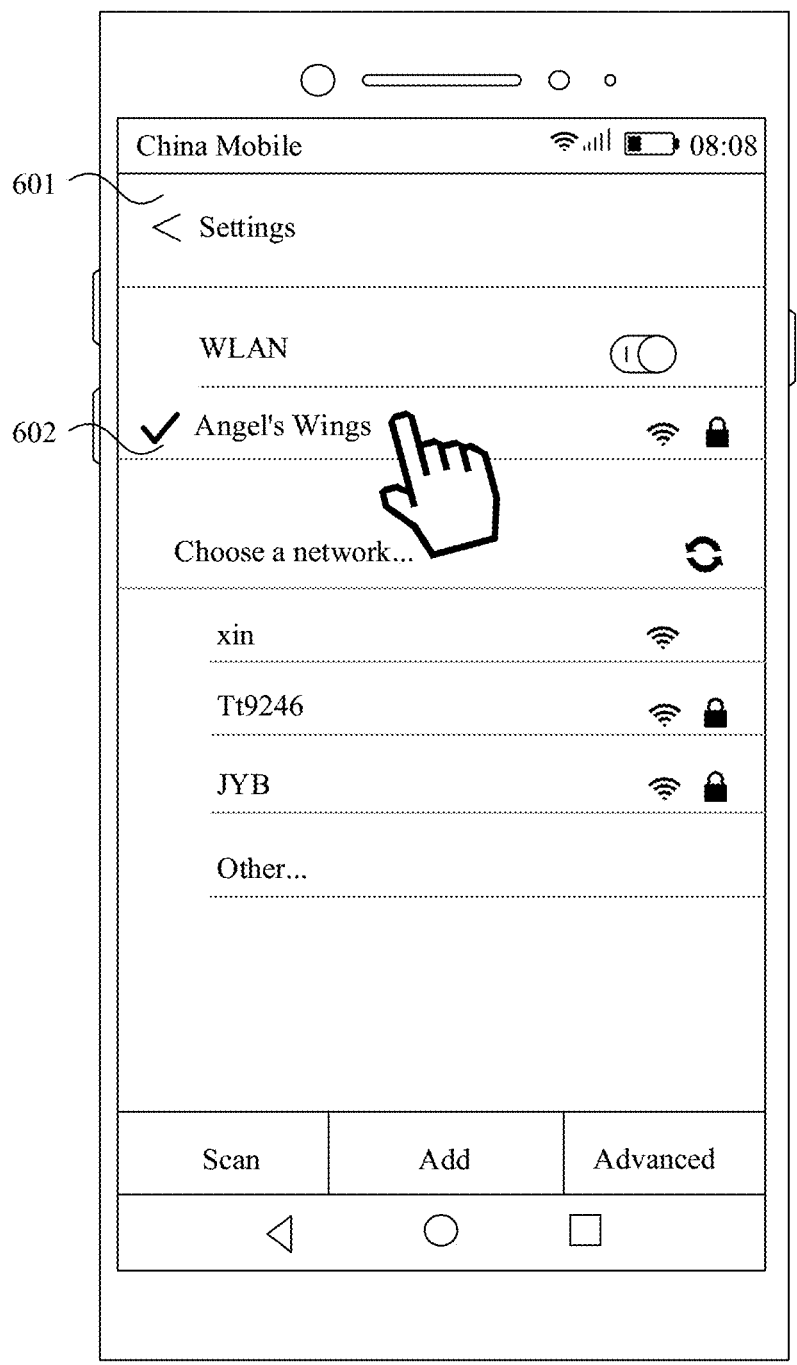
FIG. 6A to FIG. 6D are schematic diagrams of some graphical user interfaces displayed on an electronic device according to some other embodiments of this application.
Figure 6B:
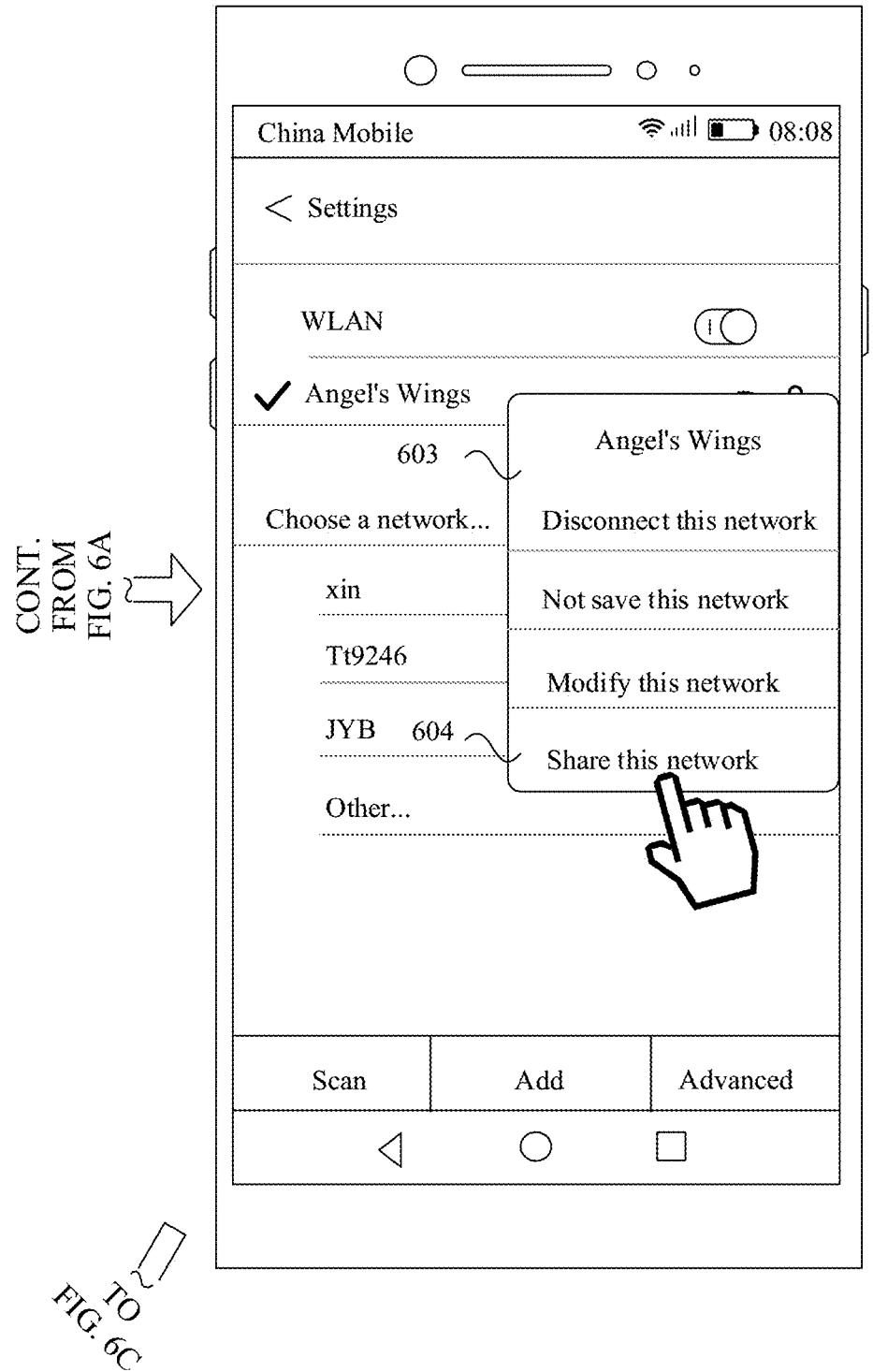

In some embodiments of this application, when the user wants to share a wireless local area network with the second electronic device by using the first electronic device, the user may open a settings screen of the first electronic device, and tap a wireless local area network option on the settings screen. In response to the tap, as shown in FIG. 6A, a first screen is displayed on a touchscreen of the first electronic device, for example, a settings screen 601 of a wireless local area network function. The settings screen 601 includes information about a wireless local area network that has been accessed by the first electronic device, for example, an SSID "Angle's Wings" of the wireless local area network. The user may perform, on the settings screen 601, a first operation (for example, a touch-and-hold operation) on a first control such as a control 602 associated with the SSID "Angle's Wings". In response to the first operation performed by the user on the control 602, as shown in FIG. 6B, a shortcut menu 603 is displayed on the touchscreen of the first electronic device. The shortcut menu 603 includes a second control such as a "share this network" option 604. The user may perform a second operation (for example, a tap operation) on the "share this network" option 604, to share the wireless local area network whose SSID is "Angel's Wings" with another user.

Figure 6C:
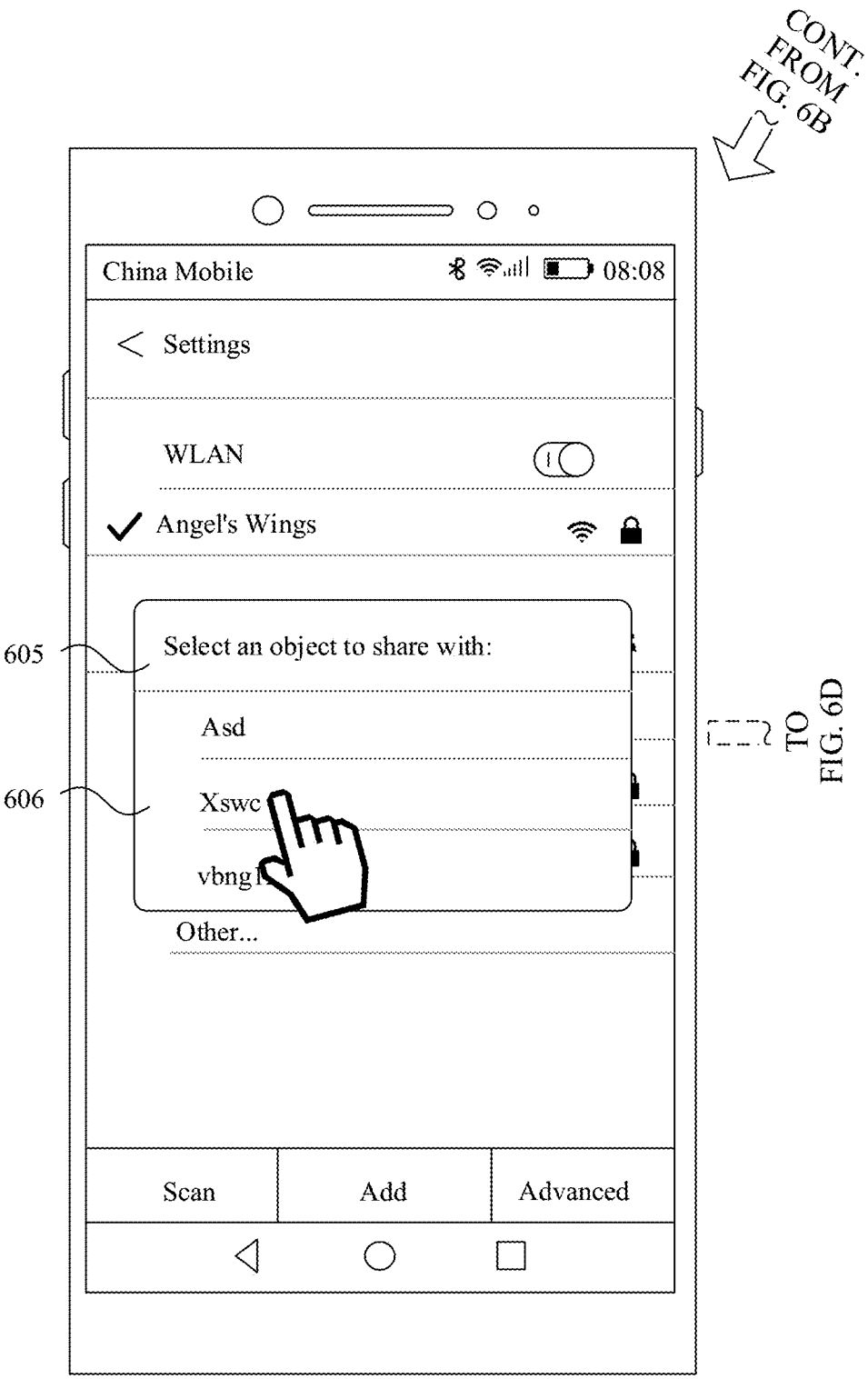
Figure 6D:
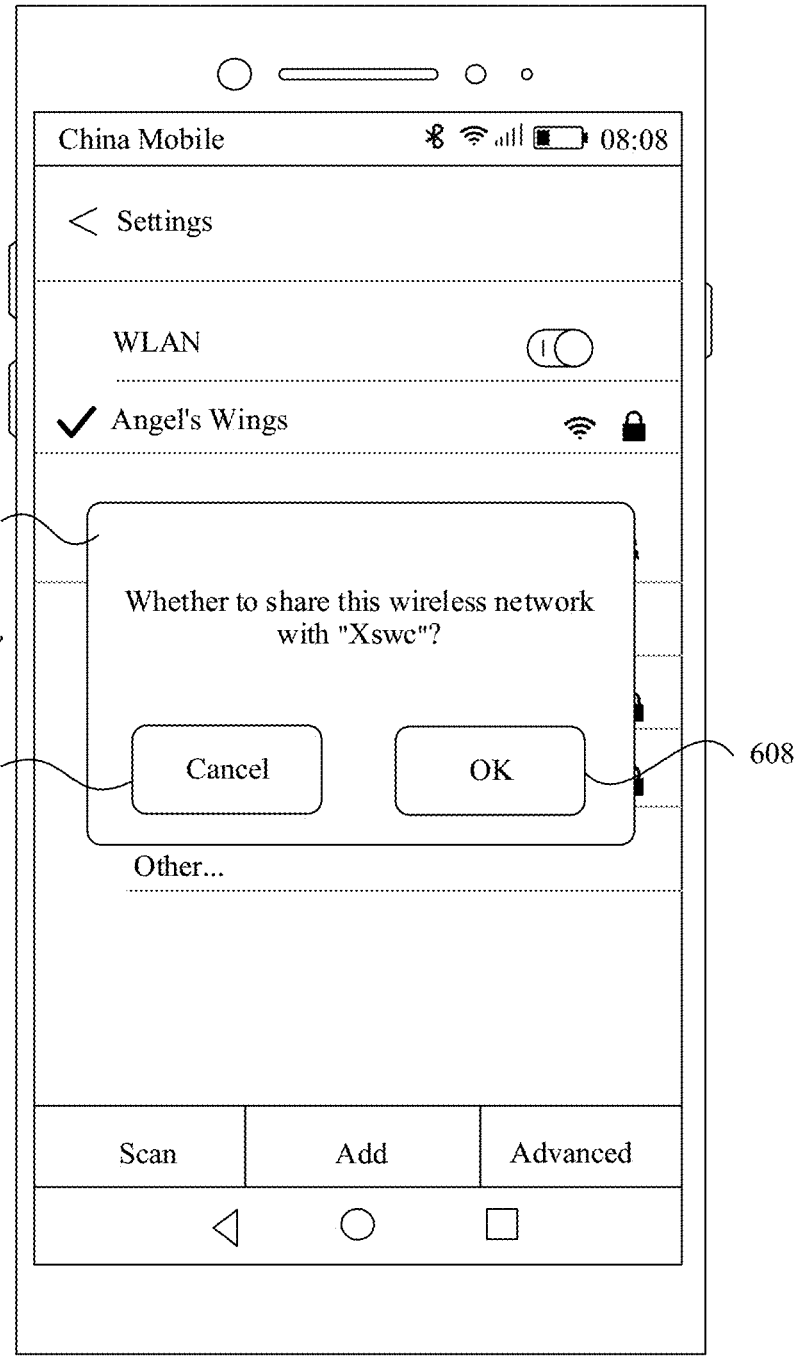
Figure 6E:
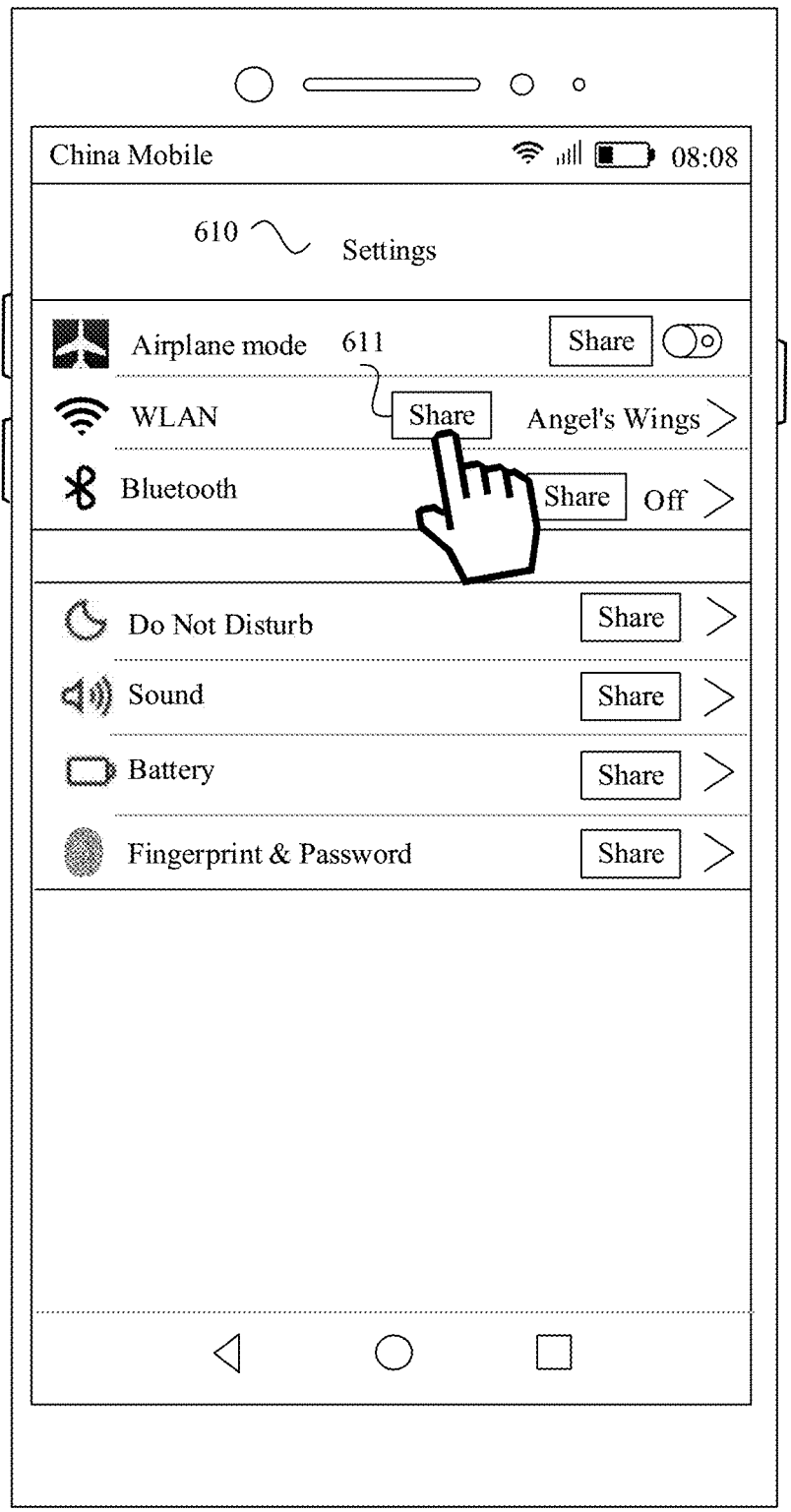
FIG. 6E is a schematic diagram of some graphical user interfaces displayed on an electronic device according to some other embodiments of this application.

In some other embodiments of this application, a share button may be configured for each function included in Settings, and the share button is used to share a related parameter of a corresponding function. For example, as shown in FIG. 6E, when the user wants to share a wireless local area network with the second electronic device by using the first electronic device, the user may open a settings screen 610 of the first electronic device. A share button 611 corresponding to a wireless local area network option is tapped on the settings screen 610, to share, with another electronic device, a related parameter of a wireless local area network whose SSID is "Angel's Wings" and that has been accessed by the first electronic device. As shown in FIG. 6E, another function included in Settings, for example, a Do Not Disturb mode, a virtual private network, a fingerprint, or a password, also has a corresponding share button. The user may also perform an operation on a corresponding share button, to share a related parameter of the corresponding function with another electronic device. In some other embodiments of this application, after receiving a specific operation, the first electronic device may also share a related parameter of a function in Settings (a details screen of the function currently displayed by the first electronic device) with the second electronic device. For example, a settings screen of a wireless local area network function is currently displayed on the touchscreen of the first electronic device, and the user holds the first electronic device to touch the second electronic device. The first electronic device may receive the touch operation (for example, a gyroscope of the first electronic device may detect the touch operation). Then, the first electronic device may share the related parameter of the accessed wireless local area network whose SSID is "Angel's Wings" with the second electronic device.

In some embodiments of this application, after the first electronic device receives the second operation performed by the user on the second control such as the "share this network" option 604, the first electronic device may determine whether the moment share function of the first electronic device is enabled. If the moment share function of the first electronic device has been enabled, the first electronic device may perform BLE scanning, to discover an electronic device with which the first electronic device may share data. A discovery device list 605 shown in FIG. 6C may be further displayed on the touchscreen of the first electronic device.

The discovery device list 605 includes an identifier of the electronic device that is discovered by the first electronic device through scanning and with which the first electronic device may share data, for example, a discovery name of the electronic device. For example, when the moment share function of the second electronic device is enabled, the discovery device list 605 includes a discovery name "Xswc" of the second electronic device.

Figure 7:
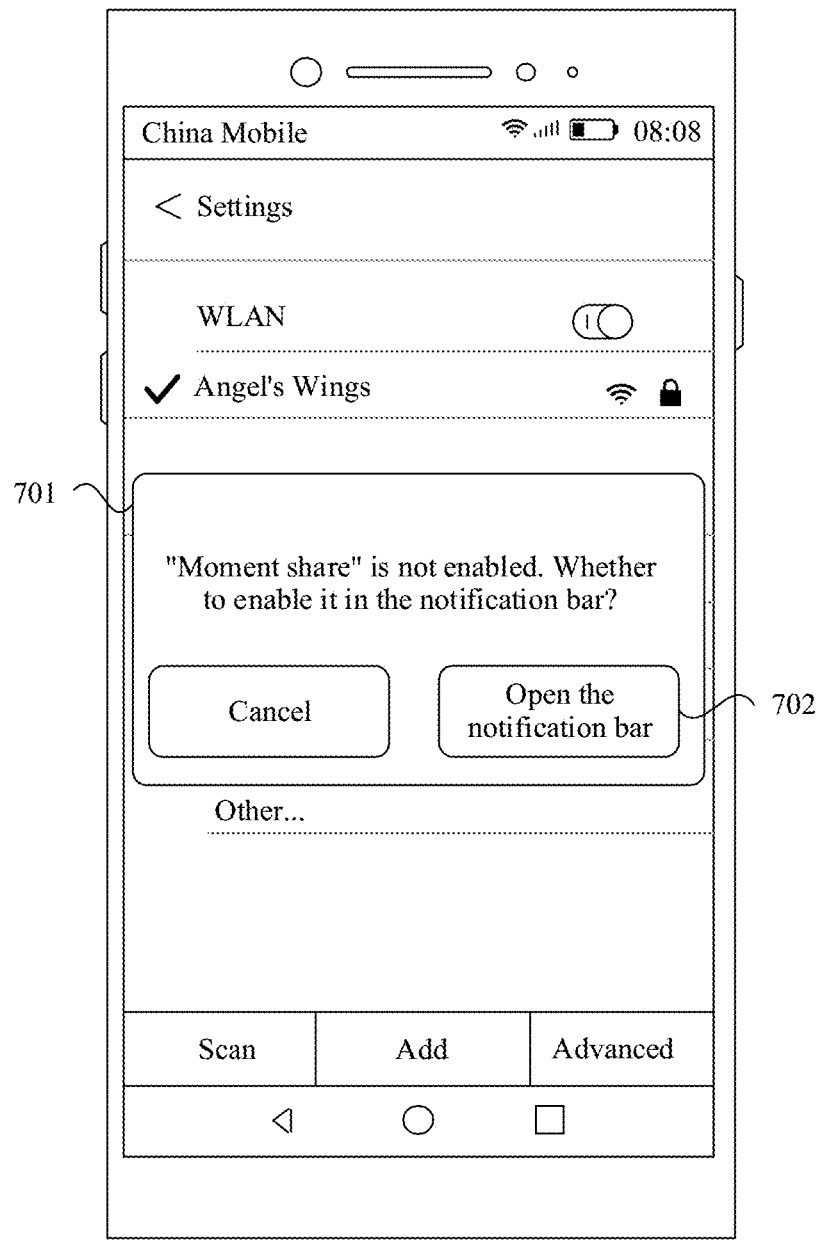
FIG. 7 is a schematic diagram of some other graphical user interfaces displayed on an electronic device according to some other embodiments of this application.
Figure 8:
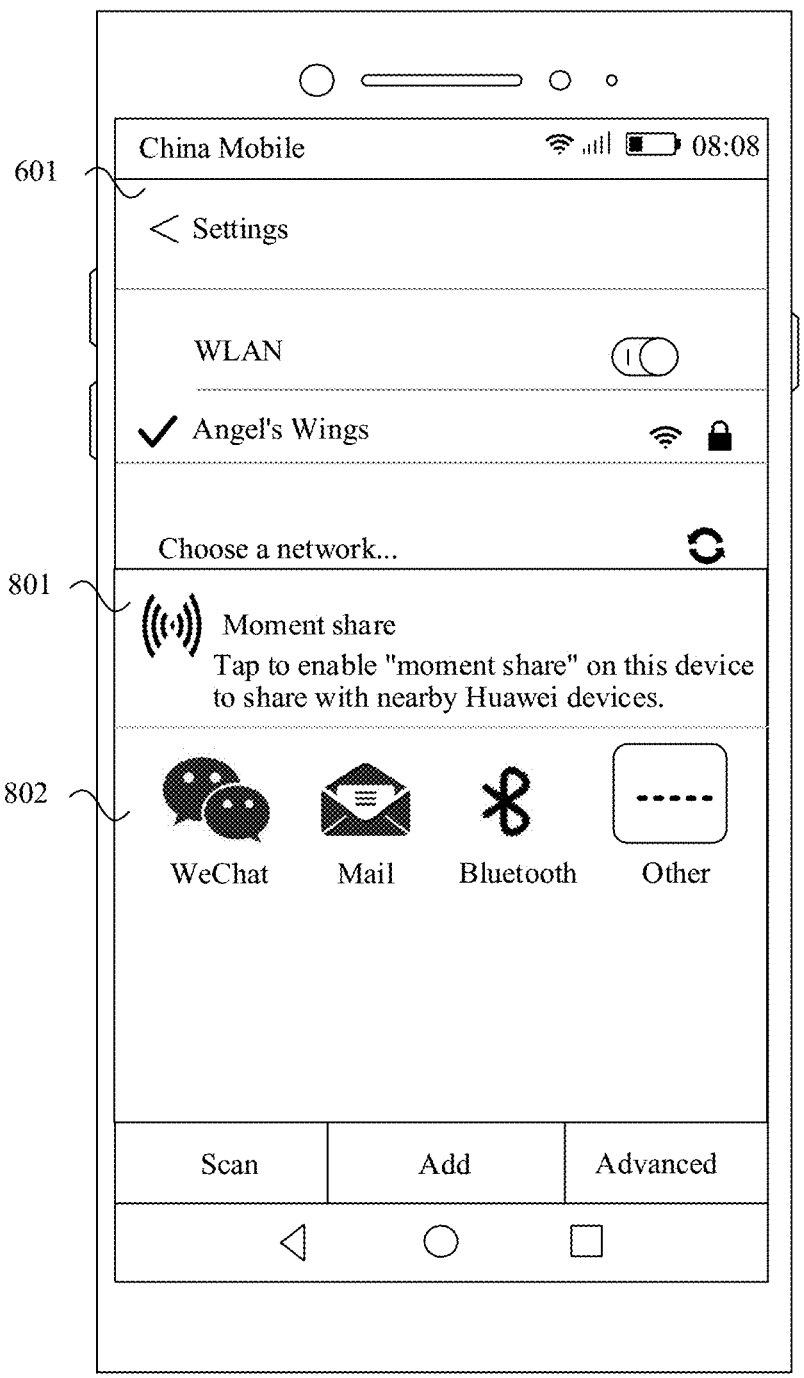
FIG. 8 is a schematic diagram of some other graphical user interfaces displayed on an electronic device according to some other embodiments of this application.

In some other embodiments, if the moment share function of the first electronic device is not enabled, the first electronic device may automatically enable the moment share function of the first electronic device. In some other embodiments, if the moment share function of the first electronic device is not enabled, as shown in FIG. 7, a prompt box 701 may be displayed on the touchscreen of the first electronic device, to prompt the user that the moment share function of the first electronic device is not enabled. The first electronic device may further provide a button 702 used to open a notification bar. The user may perform a tap operation on the button 702. In response to the tap operation, the notification bar 502 shown in FIG. 5B may be displayed on the touchscreen of the first electronic device, so that the user can enable the moment share function of the first electronic device. In some other embodiments, if the moment share function of the first electronic device is not enabled, as shown in FIG. 8, the first electronic device may display a switch button 801 for the moment share function on the settings screen 601. The user may perform a tap operation on the switch button 801 for the moment share function that is displayed on the settings screen 601. The first electronic device may enable the moment share function of the first electronic device in response to the tap operation. After the moment share function of the first electronic device is enabled, the first electronic device may perform BLE scanning, to discover an electronic device with which the first electronic device may share data. As shown in FIG. 6C, the discovery device list 605 may be further displayed on the touchscreen of the first electronic device.

The user may select an object to share with from the discovery device list 605. For example, the user wants to share the wireless local area network whose SSID is "Angel's Wings" with the second electronic device, and an identifier such as a discovery name of the second electronic device is "Xswc". In some embodiments of this application, as shown in FIG. 6C, the user may perform a third operation (for example, a tap operation) on an option 606 that is in the discovery device list 605 and that is associated with the discovery name "Xswc". In response to the third operation, the first electronic device may establish a wireless link to the second electronic device based on the moment share function. The first electronic device may share related parameters (for example, the SSID "Angel's Wings" and a password corresponding to the SSID) of the wireless local area network with the second electronic device based on the established wireless link. In some other embodiments of this application, after the first electronic device receives the third operation performed by the user on the option 606, as shown in FIG. 6D, a prompt box 607 may be displayed on the touchscreen of the first electronic device, to check whether the user determines to share the wireless local area network whose SSID is "Angel's Wings" with the selected object. After the first electronic device receives a tap operation performed by the user on an OK button 608, in response to the tap operation, the first electronic device may establish a wireless link to the second electronic device based on the moment share function. The first electronic device shares related parameters (for example, the SSID "Angel's wings" and a password corresponding to the SSID) of the wireless local area network with the second electronic device based on the established wireless link. If the first electronic device receives a tap operation performed by the user on a cancellation button 609, in response to the tap operation, the first electronic device may return to the display screen shown in FIG. 6C. In this way, when the user selects an incorrect object to share with, the user can easily reselect an object to share with.

Figure 9:
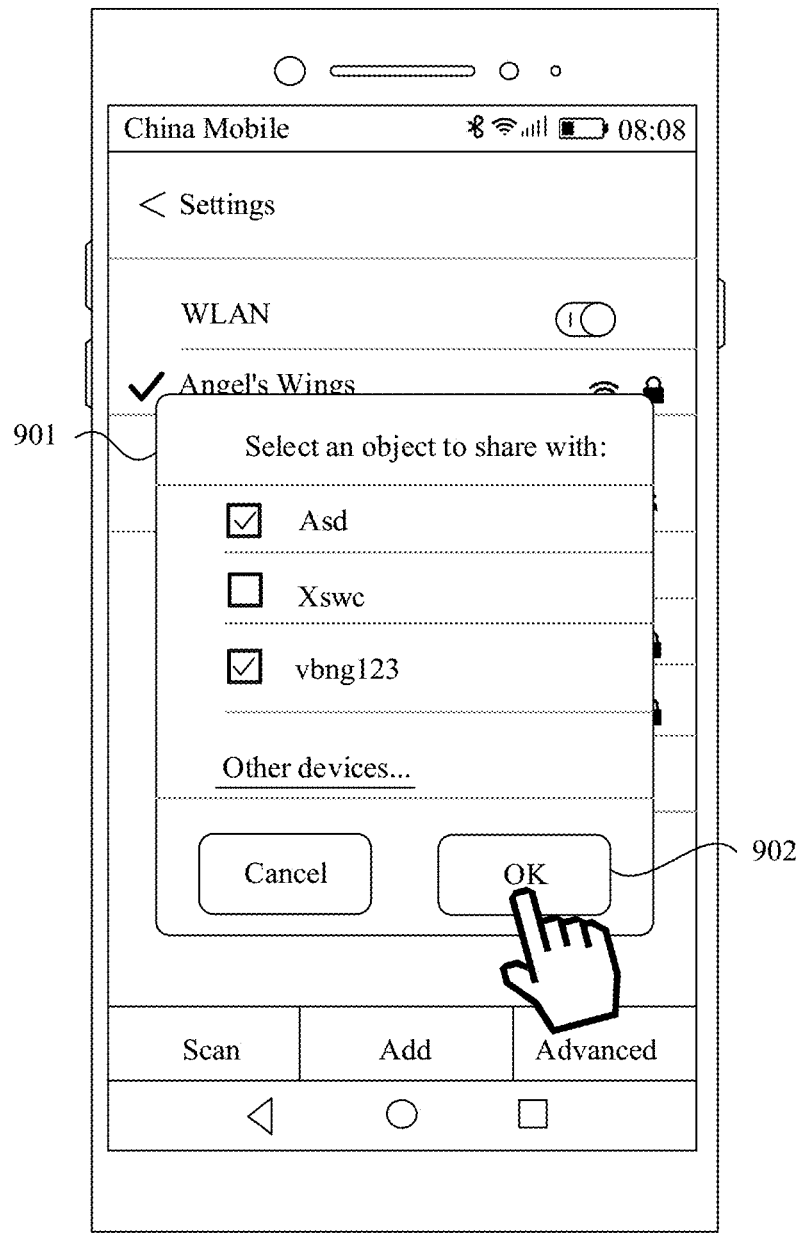
FIG. 9 is a schematic diagram of some other graphical user interfaces displayed on an electronic device according to some other embodiments of this application.

For another example, the user may further share, with a plurality of electronic devices, data that the user wants to share. For example, the user wants to share the wireless local area network whose SSID is "Angel's Wings" with the plurality of electronic devices. When the moment share function of the first electronic device is enabled, if the first electronic device receives the second operation performed by the user on the second control such as the "share this network" option, the first electronic device may perform BLE scanning in response to the second operation, to discover an electronic device with which the first electronic device may share data. As shown in FIG. 9, a discovery device list 901 may be further displayed on the touchscreen of the first electronic device. The discovery device list 901 includes an identifier such as a discovery name of an electronic device that is discovered by the first electronic device through scanning and with which the first electronic device may share data. The user may select a plurality of objects from the discovery device list 901. For example, as shown in FIG. 9, the user selects two objects whose discovery names are "Asd" and "vbng123". After completing the selection, the user may tap an OK button 902. In response to the tap operation, the first electronic device may establish, based on the moment share function, a wireless link to each of the electronic devices whose discovery names are "Asd" and "vbng123". The first electronic device may share, based on the established wireless link, related parameters (for example, the SSID "Angel's Wings" and a password corresponding to the SSID) of the wireless local area network with each of the electronic devices whose discovery names are "Asd" and "vbng123". In addition, the user may alternatively select one object from the discovery device list 901 to share data. In some other embodiments of this application, after the first electronic device receives the tap operation performed by the user on the OK button 902, a prompt box may also be displayed on the touchscreen of the first electronic device, to check whether the user determines to share the wireless local area network whose SSID is "Angel's Wings" with the selected objects. Details are not described in the embodiments of this application.

In some embodiments of this application, if the first electronic device has established a first wireless link by using a first wireless communications protocol, for example, the first electronic device has accessed a wireless local area network by using a Wi-Fi protocol, before the first electronic device establishes a wireless link to the second electronic device, the first electronic device may establish a second wireless link (for example, a Bluetooth link) to the second electronic device by using a second wireless communications protocol (for example, a Bluetooth protocol), to share data with the second electronic device through the second wireless link (for example, the Bluetooth link). In this way, the first electronic device may send related data through the second wireless link without disconnecting the first wireless link, so as to improve use efficiency of the first electronic device.

Figure 10:
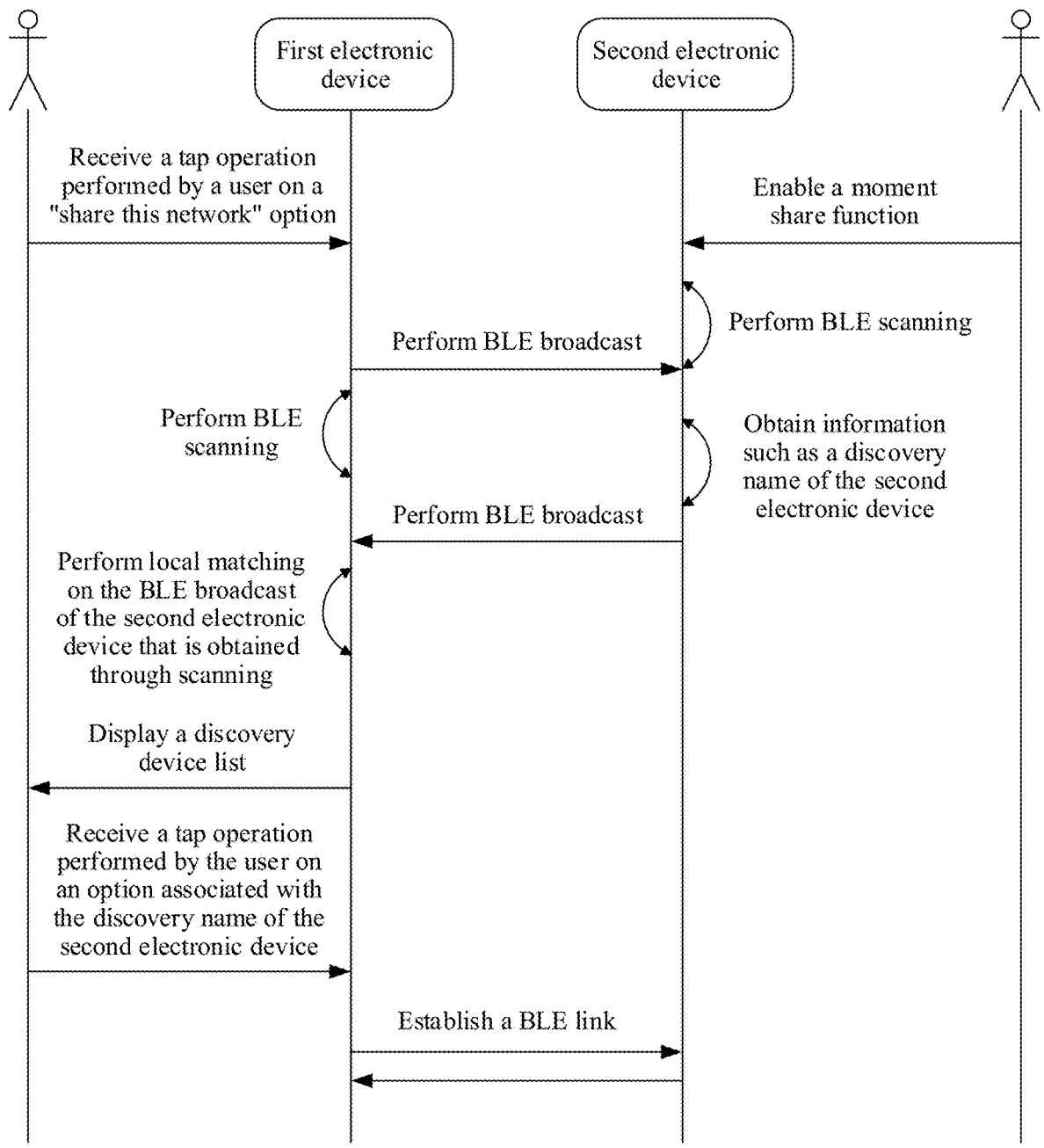
FIG. 10 is a schematic flowchart of establishing a link between electronic devices according to an embodiment of this application.

In some embodiments of this application, as shown in FIG. 10, when the first electronic device receives the second operation such as the tap operation performed by the user on the second control such as the "share this network" option, and the moment share function of the second electronic device has been enabled, a specific process in which the first electronic device discovers an electronic device with which the first electronic device may share data, and establishes a wireless link to the discovered electronic device such as the second electronic device may include: After the moment share function of the second electronic device is enabled, the second electronic device may perform BLE scanning. After the first electronic device receives the tap operation performed by the user on the "share this network" option, the first electronic device may perform BLE broadcast. The first electronic device may further perform BLE scanning. After the second electronic device obtains the BLE broadcast of the first electronic device through scanning, the second electronic device obtains information about the second electronic device, for example, a discovery name. The second electronic device performs BLE broadcast. The broadcast may include the information about the second electronic device, for example, the discovery name of the second electronic device. The first electronic device obtains the BLE broadcast of the second electronic device through scanning, and the first electronic device performs local matching on the BLE broadcast of the second electronic device that is discovered through scanning. When the matching succeeds, the first electronic device discovers an electronic device with which the first electronic device may share data, that is, the second electronic device. The first electronic device displays a discovery device list. The discovery device list includes the information about the second electronic device, for example, the discovery name of the second electronic device. The first electronic device receives a tap operation performed by the user on an option associated with the discovery name of the second electronic device. The first electronic device establishes a BLE link to the second electronic device.

In some other embodiments of this application, after the first electronic device receives the second operation performed by the user on the second control, for example, the tap operation performed on the "share this network" option 604, as shown in FIG. 8, an optional transmission mode list

802 may also be displayed on the touchscreen of the first electronic device. The optional transmission mode list 802 includes a transmission mode that can be selected by the user. When the user selects a specific transmission mode from the optional transmission mode list 802, the first electronic device may share data with the second electronic device in the transmission mode selected by the user. For example, if the user selects WeChat in the optional transmission mode list 802, the first electronic device may share data with a contact of WeChat. For example, the first electronic device shares related parameters (for example, an SSID and a password corresponding to the SSID) of a wireless local area network with the contact of WeChat by using a wireless cellular network. In this way, after receiving the related parameters, an electronic device used by the contact of WeChat may automatically access the wireless local area network by using the related parameters.

In some embodiments of this application, a specific process in which the first electronic device shares related parameters (for example, an SSID and a password corresponding to the SSID) of a wireless local area network with the second electronic device may be as follows: A Wi-Fi module included in Settings (Settings) of the first electronic device assembles the shared related parameters (for example, the SSID and the password corresponding to the SSID) of the wireless local area network to obtain to-be-shared data. The Wi-Fi module may be a software function module in Settings, and is mainly configured to: manage (for example, store or delete) a related parameter of a Wi-Fi connection, receive an input of the user, and access a Wi-Fi hotspot. The Wi-Fi module invokes a share interface to request a share service provided by a share manager. The share manager encapsulates the to-be-shared data, a class name of the Wi-Fi module, a specified Android package (APK) name, and an operation code to obtain to-be-sent data. The to-be-sent data may be the first information in the embodiments of this application. The first electronic device sends the data to the second electronic device through the established BLE link. The operation code may be used to indicate an enabling manner of the to-be-shared data. For example, the operation code is used to indicate to automatically access the wireless local area network by using the related parameters (for example, the SSID and the password corresponding to the SSID). In addition, when the foregoing enabling manner is unique, the operation code may not need to be sent to the second electronic device.

The second electronic device receives the data shared by the first electronic device, for example, the related parameters (for example, the SSID and the password corresponding to the SSID) of the wireless local area network. The second electronic device automatically enables the shared data. For example, the second electronic device may automatically access the wireless local area network by using the related parameters (for example, the SSID and the password corresponding to the SSID) of the wireless local area network that are shared by the first electronic device.

That the related parameters of the wireless local area network are the SSID and the password corresponding to the SSID is used as an example. A specific process in which the second electronic device automatically accesses the wireless local area network by using the related parameters of the wireless local area network that are shared by the first electronic device may be as follows: The second electronic device may receive, through the established BLE link, the first information such as the foregoing data sent by the first electronic device. After the second electronic device receives the data, the share manager of the second electronic device parses the data. The share manager of the second electronic device determines, based on the class name and the package name that are included in the data, that an application module executing the to-be-shared data is the Wi-Fi module in Settings. The share manager may provide an on share service for the Wi-Fi module in Settings by using the on share interface, so that the Wi-Fi module in Settings automatically accesses, based on the received operation code and the to-be-shared data, the wireless local area network shared by the first electronic device, in other words, the second electronic device automatically accesses the wireless local area network by using the shared SSID and the shared password corresponding to the SSID.

It should be noted that, in the embodiments of this application, specific implementations of sharing the data by the first electronic device and automatically enabling the shared data by the second electronic device are merely examples, and implementations of sharing data and automatically enabling the shared data are not specifically limited in the embodiments of this application. For example, data can also be shared and the shared data can also be automatically enabled in a broadcast or registration callback manner.

Figure 11A:
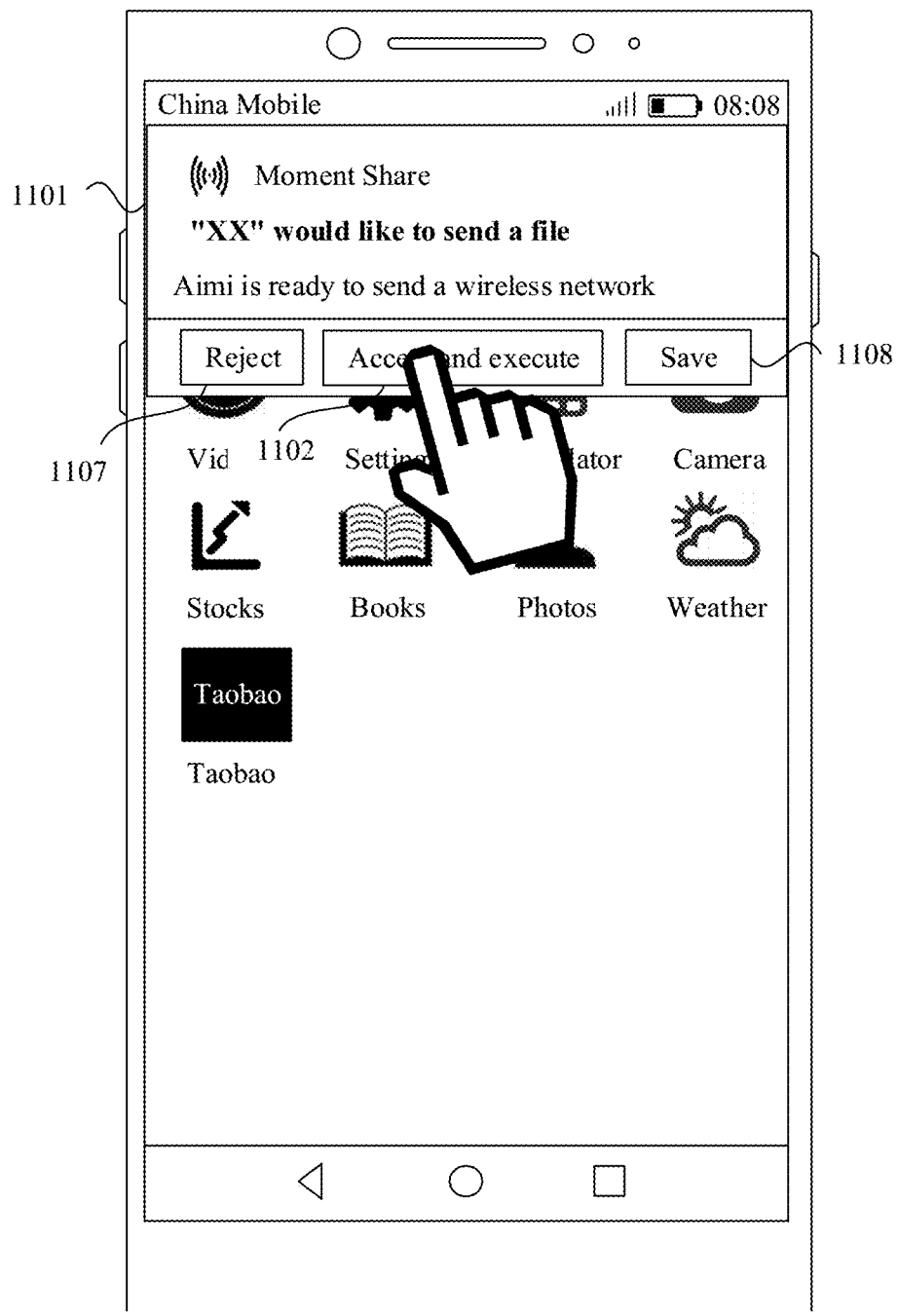
FIG. 11A to FIG. 11C are schematic diagrams of some other graphical user interfaces displayed on an electronic device according to some other embodiments of this application.
Figure 11B:
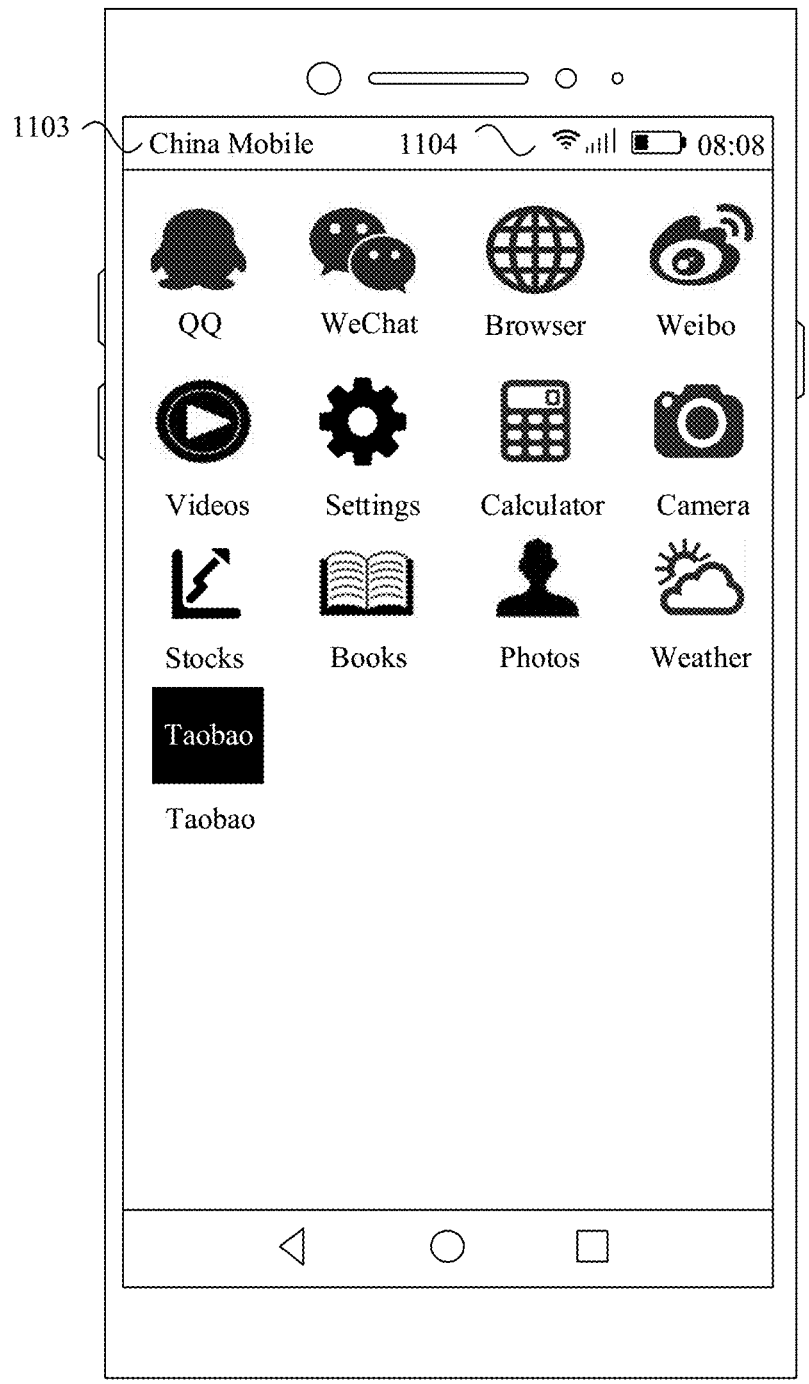
Figure 11C:
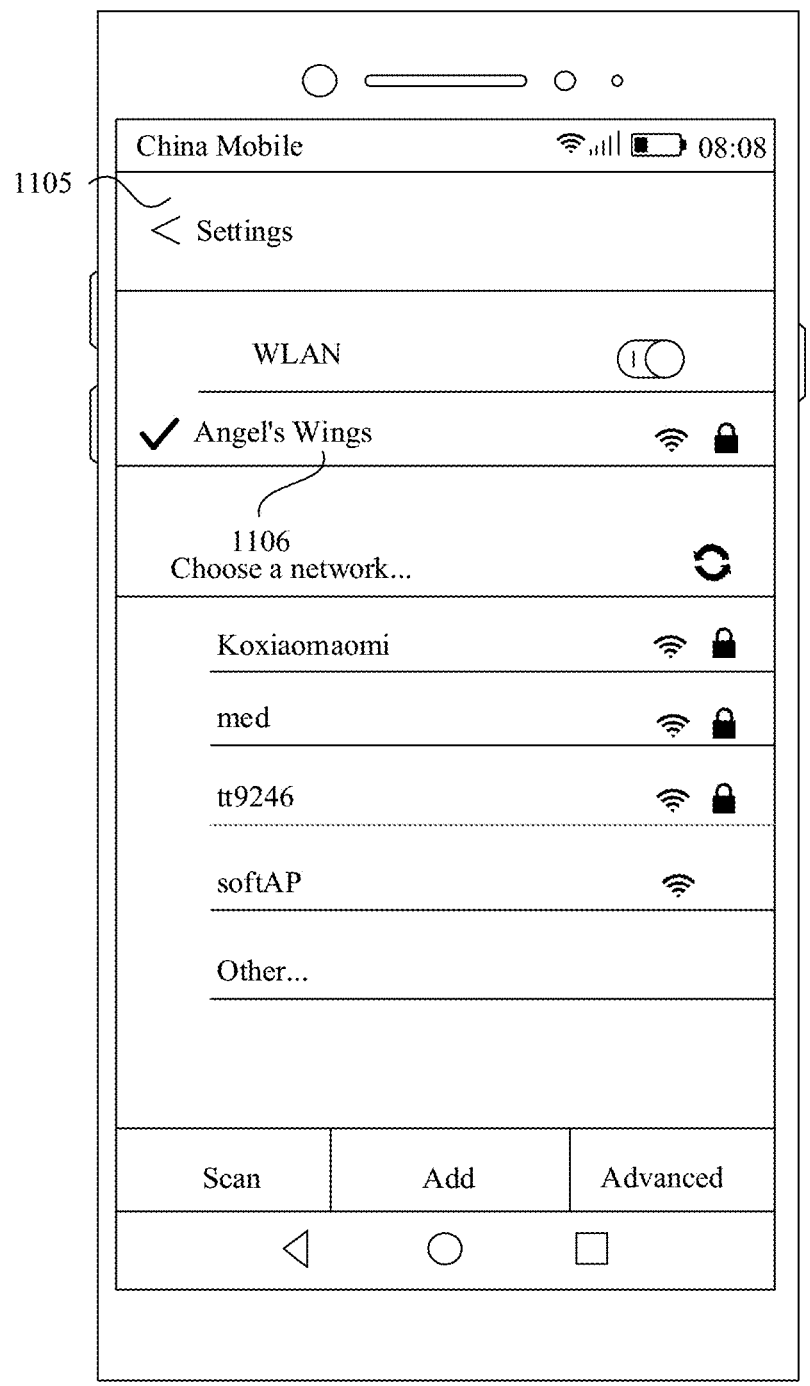

In some embodiments of this application, as shown in FIG. 11A, after the second electronic device receives the related parameters (for example, the SSID and the password corresponding to the SSID) of the wireless local area network that are shared by the first electronic device, a second screen may be displayed on a touchscreen of the second electronic device. The second screen may include a prompt box 1101, to prompt the user that the first electronic device shares the wireless local area network with the second electronic device. In some embodiments, when the user wants to access the wireless local area network, the user may perform a fourth operation (for example, a tap operation) on a third control such as an accept and execute button 1102 in the prompt box 1101. In response to the fourth operation, the second electronic device may automatically access the wireless local area network shared by the first electronic device. After the second electronic device successfully accesses the wireless local area network, as shown in FIG. 11B, the second electronic device may further display a Wi-Fi icon 1104 in a status bar 1103, to prompt the user that the second electronic device has successfully accessed the wireless local area network. As shown in FIG. 11C, the second electronic device may further display, on a settings screen 1105 of a wireless local area network function, information about the accessed wireless local area network, for example, the SSID "Angel's Wings" 1106 of the wireless local area network. In some other embodiments of this application, after receiving the related parameters (for example, the SSID and the password corresponding to the SSID) of the wireless local area network that are shared by the first electronic device, the second electronic device may alternatively not display the prompt box 1101, but automatically accesses the wireless local area network directly.

After the second electronic device receives the related parameters (for example, the SSID and the password corresponding to the SSID) of the wireless local area network that are shared by the first electronic device, in some other embodiments, if the user does not want to access the wireless local area network, the user may perform a tap operation on a reject button 1107 in the prompt box 1101. The second electronic device may return a rejection message to the first electronic device in response to the tap operation, to notify the second electronic device that the first electronic device rejects receiving of the shared data.

After the second electronic device receives the related parameters (for example, the SSID and the password corresponding to the SSID) of the wireless local area network that are shared by the first electronic device, in some other embodiments, if the user wants to store the related parameters of the wireless local area network that are shared by the first electronic device, the user may perform a tap operation on a store button 1108 in the prompt box 1101. In response to the tap operation, the second electronic device may store the received related parameters (for example, the SSID and the password corresponding to the SSID) of the wireless local area network that are shared by the first electronic device. When the user wants to access the wireless local area network, the user may perform, on the settings screen of the wireless local area network function of the second electronic device, a tap operation on a control associated with the SSID "Angel's Wings". In response to the tap operation, the second electronic device may automatically access the wireless local area network by using the stored related data, and the user does not need to enter the password.

In some other embodiments of this application, when sharing the data with the second electronic device, the first electronic device may further configure attribute information for the to-be-shared data. For example, the first electronic device may configure the attribute information for the to-be-shared data based on a type or a privacy level of the to-be-shared data or selection of the user. The attribute information may include at least one of the following: whether storing may be performed, whether printing may be performed, whether re-sharing is allowed, and whether burning is performed immediately after reading. For example, the first electronic device shares the related parameters of the wireless local area network, for example, the SSID and the password corresponding to the SSID of the wireless local area network, and if privacy levels of the SSID and the password corresponding to the SSID of the wireless local area network are relatively high, the first electronic device may configure attribute information of the shared related parameters of the wireless local area network, so that the attribute information cannot be stored or re-shared. In this way, after receiving the SSID and the password corresponding to the SSID of the wireless local area network that are shared by the first electronic device, the second electronic device may automatically access the wireless local area network, but the second electronic device cannot store the SSID or the password corresponding to the SSID of the wireless local area network, and the user cannot share the SSID or the password corresponding to the SSID of the wireless local area network with another user by using the second electronic device.

In some other embodiments of this application, for example, the user has successfully logged in to WeChat on the first electronic device. For example, a user name and a password used for logging in to WeChat are respectively Amay and 123456. The user may also share, by using the foregoing method, the user name "Amay" and the password "123456" with the second electronic device by using the first electronic device. In this way, the user can successfully log in to WeChat on the second electronic device without entering the user name and the password.

In some other embodiments of this application, for example, the user is watching a video "Moana", and wants to share the video "Moana" with the second electronic device by using the first electronic device. In addition, the first electronic device may further establish the wireless link to the second electronic device in a Wi-Fi P2P manner.

Figure 12A:
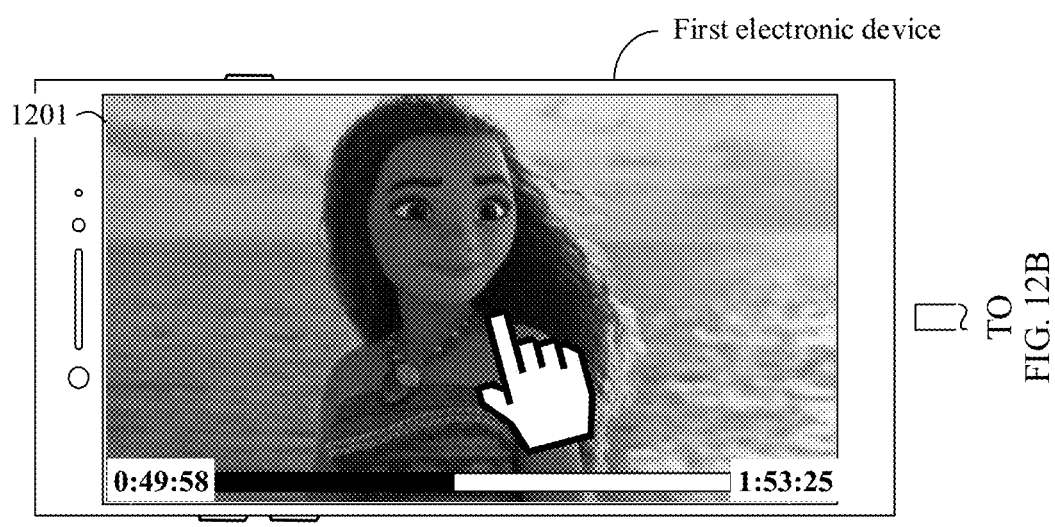
FIG. 12A to FIG. 12C are schematic diagrams of some other graphical user interfaces displayed on an electronic device according to some other embodiments of this application.
Figure 12B:
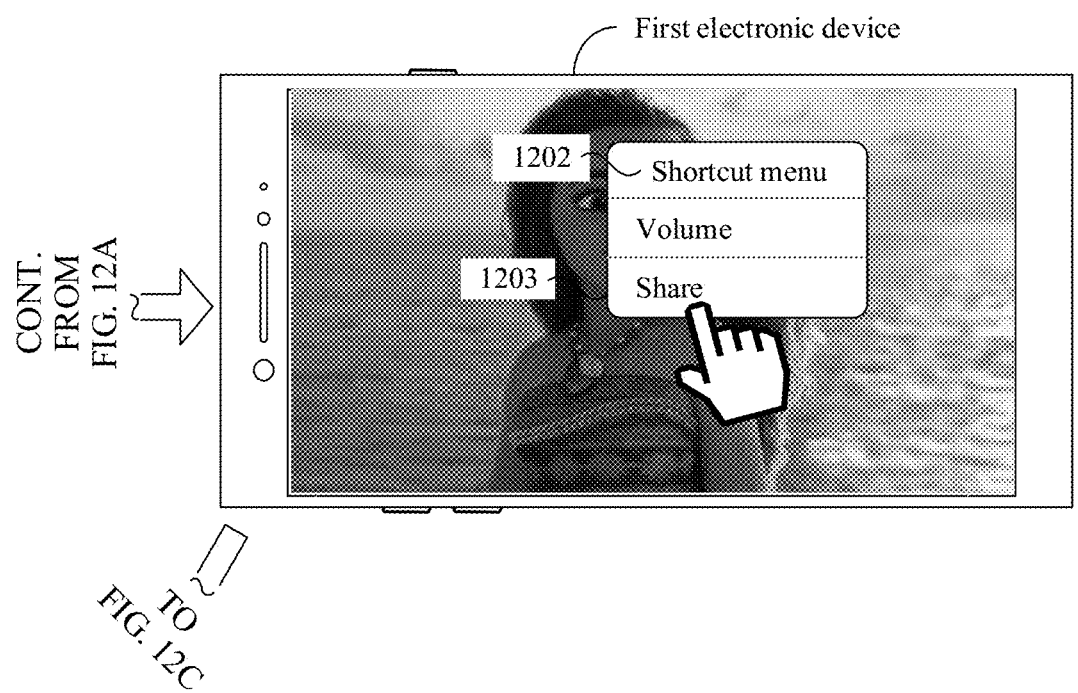

For example, the user is watching the video "Moana" by using Youku. The user wants to share the video "Moana" with the second electronic device. As shown in FIG. 12A, the first electronic device displays a first screen. For example, the first screen is a playback screen 1201 of the current video. The user may perform a first operation (for example, a double-tap operation) on the playback screen 1201 of the current video. In response to the first operation, as shown in FIG. 12B, a shortcut menu 1202 is displayed on the touchscreen of the first electronic device. The shortcut menu includes a second control such as a "share this video" option 1203. The user may perform a second operation (for example, a tap operation) on the "share this video" option 1203, to share the video "Moana" with another user.

Figure 12C:
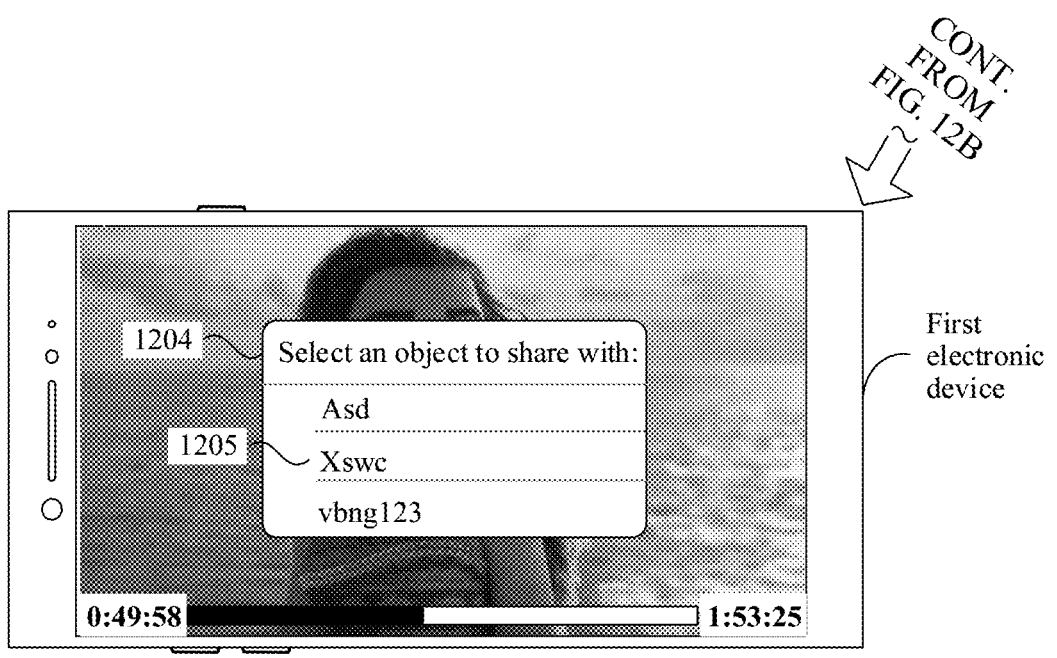

In an example, Wi-Fi networks of the first electronic device and the second electronic device are enabled. After the first electronic device receives the second operation performed by the user on the second control, for example, the tap operation performed on the "share this video" option 1203, the first electronic device may perform scanning in response to the second operation, to discover an electronic device with which the first electronic device may share data. As shown in FIG. 12C, a discovery device list 1204 may be further displayed on the touchscreen of the first electronic device. The discovery device list 1204 includes an identifier of the electronic device that is discovered by the first electronic device through scanning and with which the first electronic device may share data, for example, a discovery name of the electronic device. For example, the discovery device list 1204 includes a discovery name "Xswc" of the second electronic device. In this case, the user may select, from the discovery device list 1204, an object that the user wants to share with. As shown in FIG. 12C, the user performs a third operation (for example, a tap operation) on an option 1205 that is in the discovery device list 1204 and that is associated with the discovery name "Xswc". The first electronic device may establish a Wi-Fi P2P direct channel to the second electronic device in response to the third operation. The first electronic device may share the video "Moana" with the second electronic device based on the established Wi-Fi P2P direct channel.

In some embodiments of this application, a specific process in which the first electronic device shares the data such as the video "Moana" with the second electronic device may be as follows: Youku of the first electronic device encapsulates content of the shared video "Moana" to obtain to-be-shared data. Youku invokes a share interface to request a share service provided by a share manager. The share manager encapsulates the to-be-shared data, an APK name of Youku, and an operation code to obtain to-be-sent data. The to-be-sent data may be the first information in the embodiments of this application. The operation code may be used to indicate an enabling manner of the to-be-shared data. For example, the operation code is used to indicate to automatically play the to-be-shared data. In addition, when the foregoing enabling manner is unique, the operation code may not need to be sent to the second electronic device. The first electronic device sends the data to the second electronic device through the established Wi-Fi P2P direct channel. In some other embodiments, the APK name of Youku that is included in the foregoing data may be an APK name of another video application.

The second electronic device receives the data shared by the first electronic device, for example, the content of the video "Moana". The second electronic device may automatically enable the shared data. For example, the second electronic device automatically plays the video "Moana".

For example, a specific process in which the second electronic device automatically plays the video "Moana" may be as follows: The second electronic device may receive, through the established Wi-Fi P2P direct channel, the first information such as the foregoing data sent by the first electronic device. After the second electronic device receives the data, the share manager of the second electronic device parses the data. The share manager of the second electronic device determines, based on the APK name included in the data, that an application module executing the to-be-shared data is Youku. The share manager may provide an on share service for Youku by using the on share interface, so that Youku automatically plays the video "Moana" based on the received operation code and the to-be-shared data. In some other embodiments of this application, the first electronic device may alternatively encapsulate information about a time point at which the video "Moana" is currently played into the to-be-shared data. In this way, when receiving the video shared by the first electronic device, the second electronic device may implement synchronous playback with the first electronic device based on the received information about the time point at which the video is currently played.

Figure 13A:
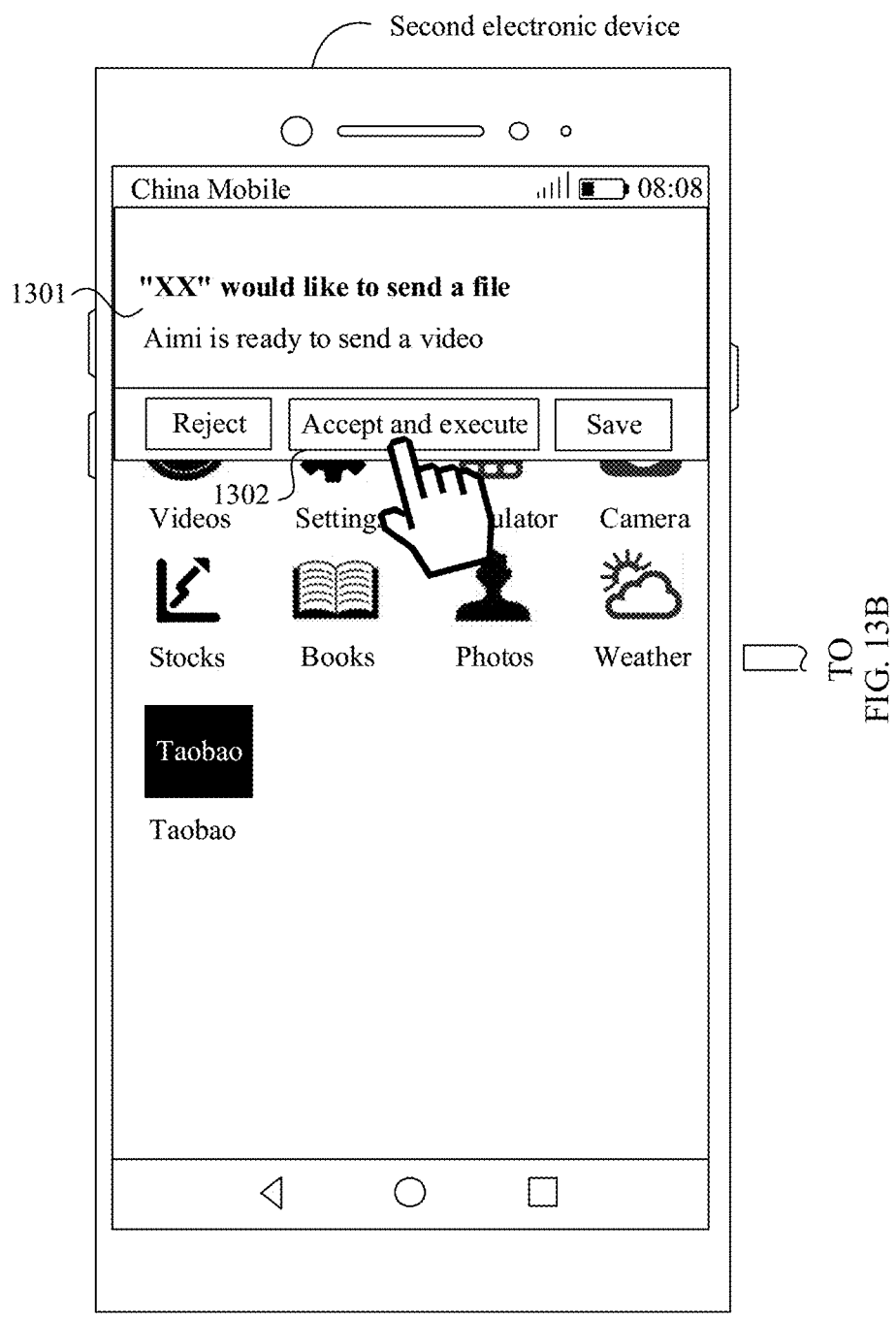
FIG. 13A and FIG. 13B are schematic diagrams of some other graphical user interfaces displayed on an electronic device according to some other embodiments of this application.
Figure 13B:
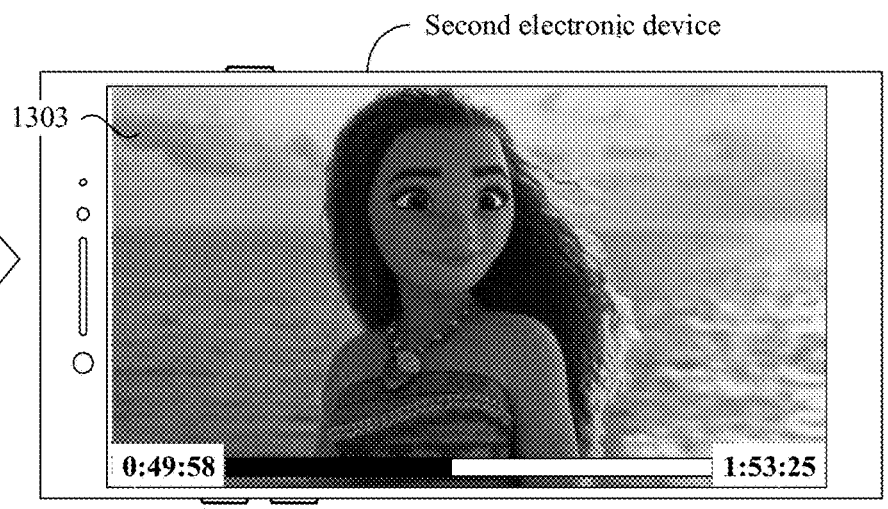

In some embodiments of this application, as shown in FIG. 13A, after receiving the video shared by the first electronic device, the second electronic device may further display a second screen on the touchscreen of the second electronic device. The second screen may include a prompt box 1301, to prompt the user that the first electronic device shares the video with the second electronic device. When the user wants to watch the video, the user may perform a fourth operation (for example, a tap operation) on a third control such as an accept and execute button 1302 in the prompt box 1301. In response to the fourth operation, as shown in FIG. 11B, the second electronic device may automatically play the video "Moana". In some other embodiments of this application, after receiving the video shared by the first electronic device, the second electronic device may alternatively not display the prompt box 1301, but automatically plays the received video directly.

Figure 14:
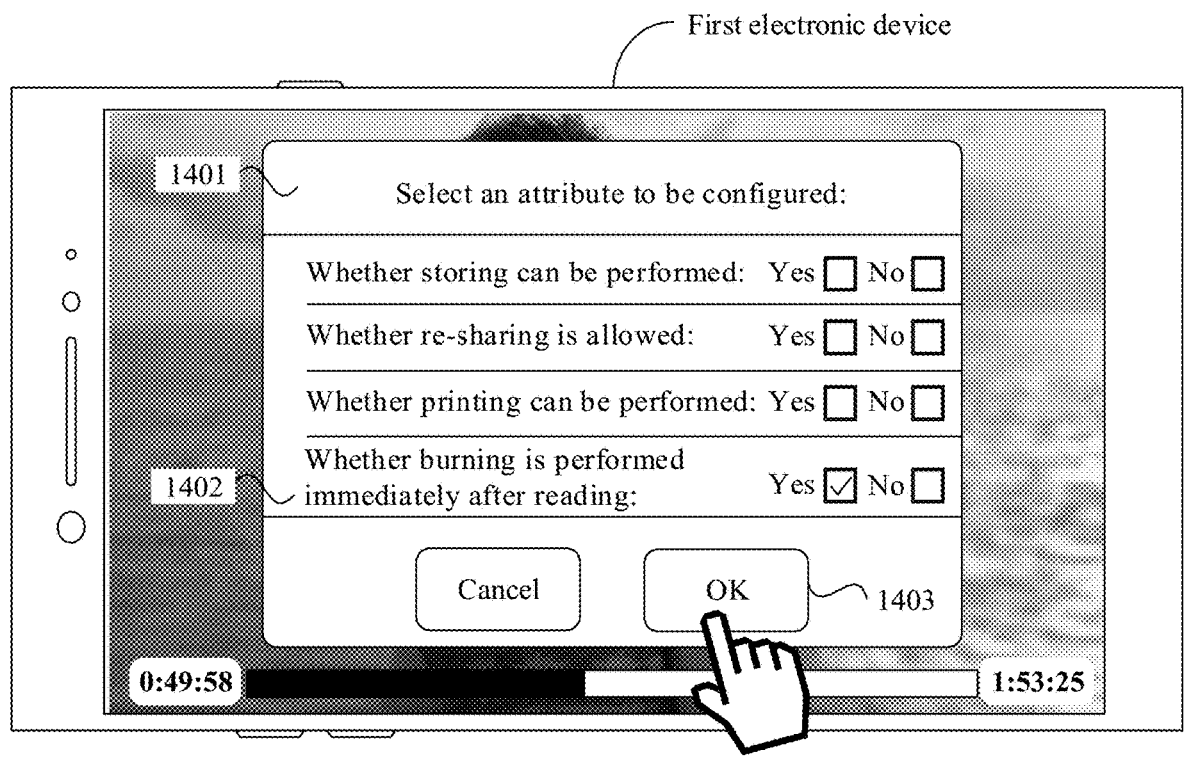
FIG. 14 is a schematic diagram of some other graphical user interfaces displayed on an electronic device according to some other embodiments of this application.

In some other embodiments of this application, when sharing the video with the second electronic device, the first electronic device may further configure attribute information for the shared video. For example, the first electronic device may configure the attribute information for the to-be-shared data based on a type or a privacy level of the to-be-shared data or selection of the user. The attribute information may include at least one of the following: whether storing may be performed, whether printing may be performed, whether re-sharing is allowed, and whether burning is performed immediately after reading. For example, the first electronic device shares the video. After receiving the tap operation performed by the user on the option 1205, as shown in FIG. 14, the first electronic device may display an attribute information configuration window 1401 on the touchscreen of the first electronic device. The user may select, based on a requirement of the user, an attribute that needs to be configured for the shared video. For example, the user selects an option 1402 of performing burning immediately after reading. After completing the selection, the user may tap a determining option button 1403 in the attribute information configuration window 1401. The first electronic device may configure the attribute information of the shared video as "burning is performed immediately after reading" based on the selection of the user. In this way, after receiving the video shared by the first electronic device, the second electronic device may temporarily store the video in a memory for reading, and delete the video immediately after completing the reading, so as to achieve an effect of performing burning immediately after reading.

In some other embodiments of this application, for example, the user is viewing a picture, and wants to share the picture that the user is viewing with the second electronic device by using the first electronic device. In addition, the first electronic device may establish the wireless link to the second electronic device in a Bluetooth manner.

Figure 15A:
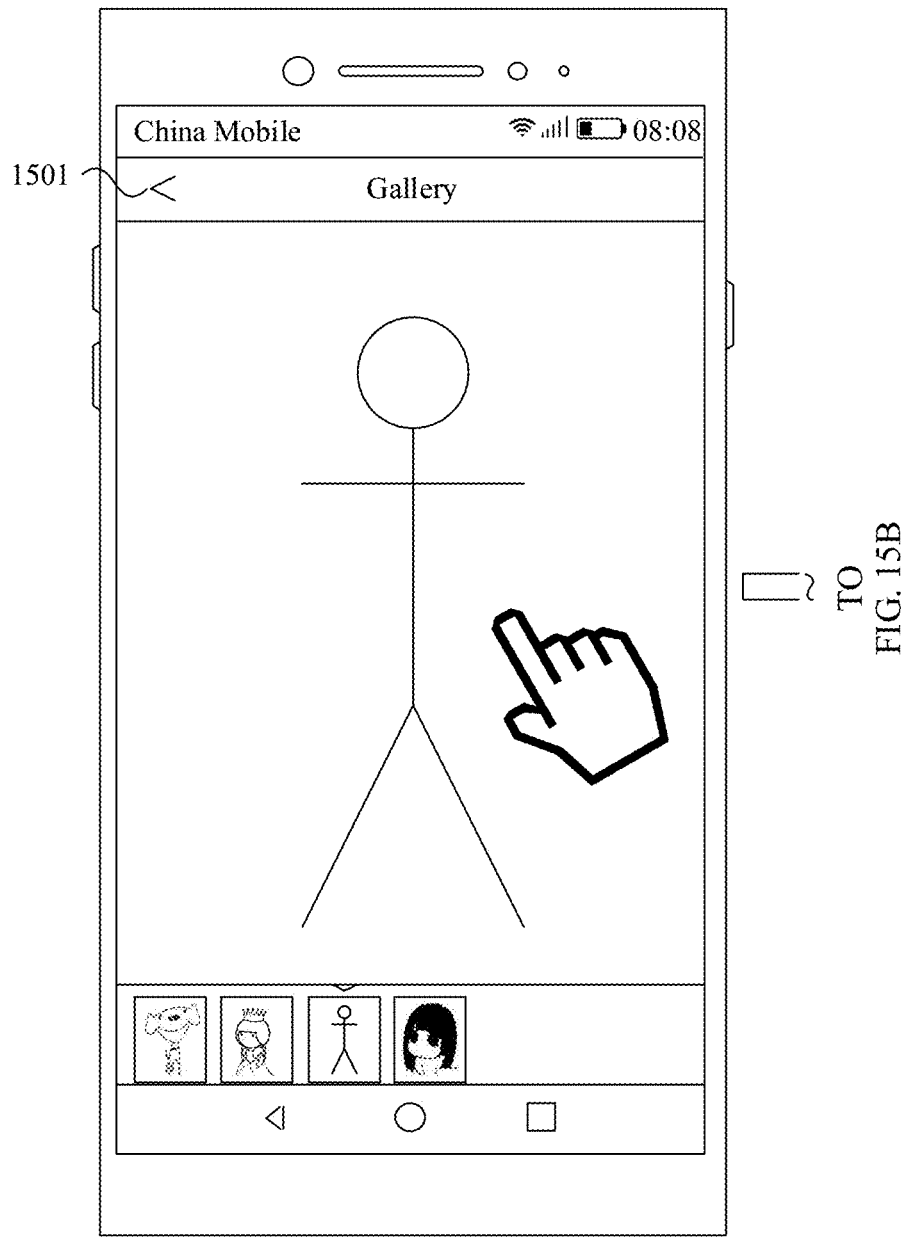
FIG. 15A to FIG. 15D are schematic diagrams of some other graphical user interfaces displayed on an electronic device according to some other embodiments of this application.
Figure 15B:
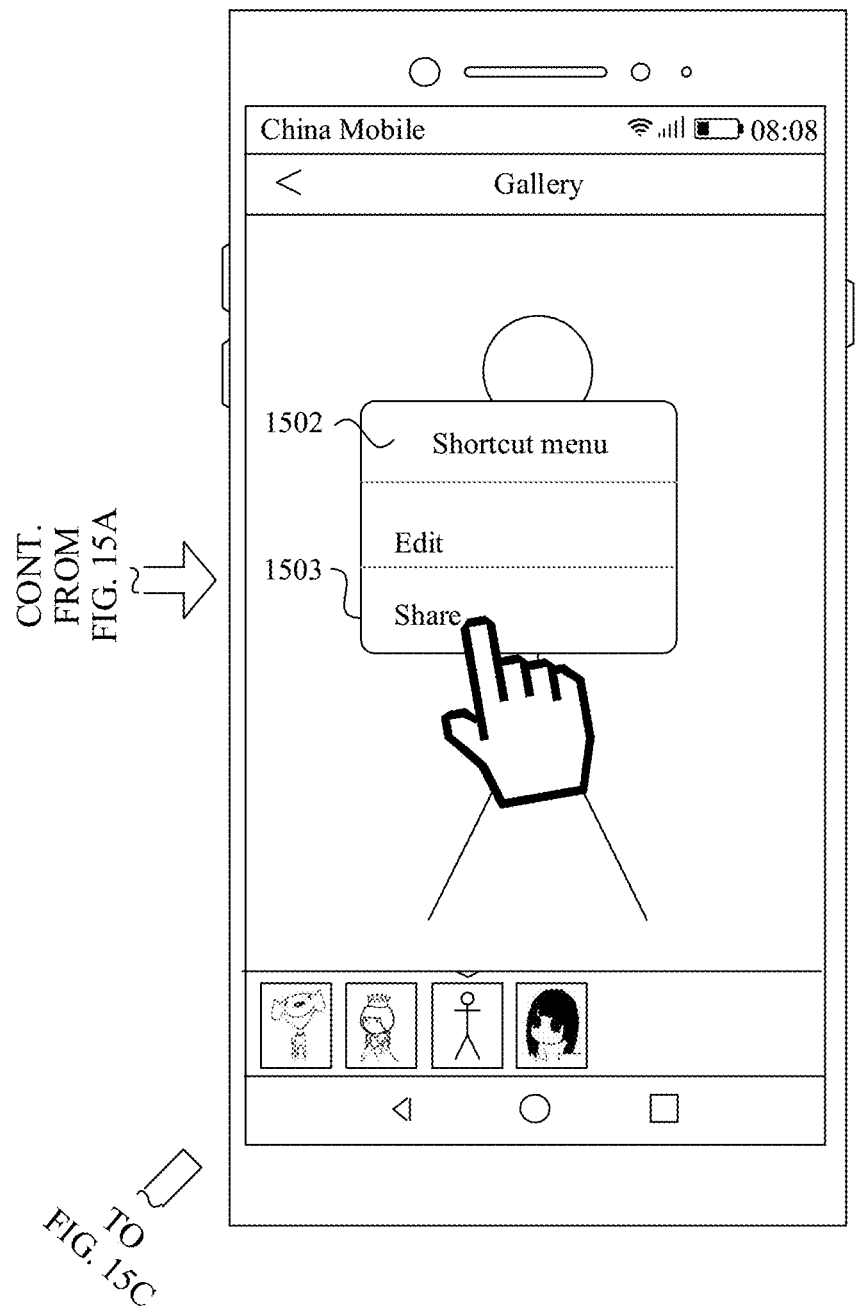

For example, the user is viewing a picture in Gallery. The user wants to share the picture with the second electronic device. As shown in FIG. 15A, the first electronic device displays a first screen. For example, the first screen is a viewing screen 1501 of the current picture. The user may perform a first operation (for example, a touch-and-hold operation) on the viewing screen 1501 of the current picture. In response to the first operation, as shown in FIG. 15B, a shortcut menu 1502 is displayed on the touchscreen of the first electronic device. The shortcut menu includes a second control such as a "share this picture" option 1503. The user may perform a second operation (for example, a tap operation) on the "share this picture" option 1503, to share the currently viewed picture with another user.

Figure 15C:
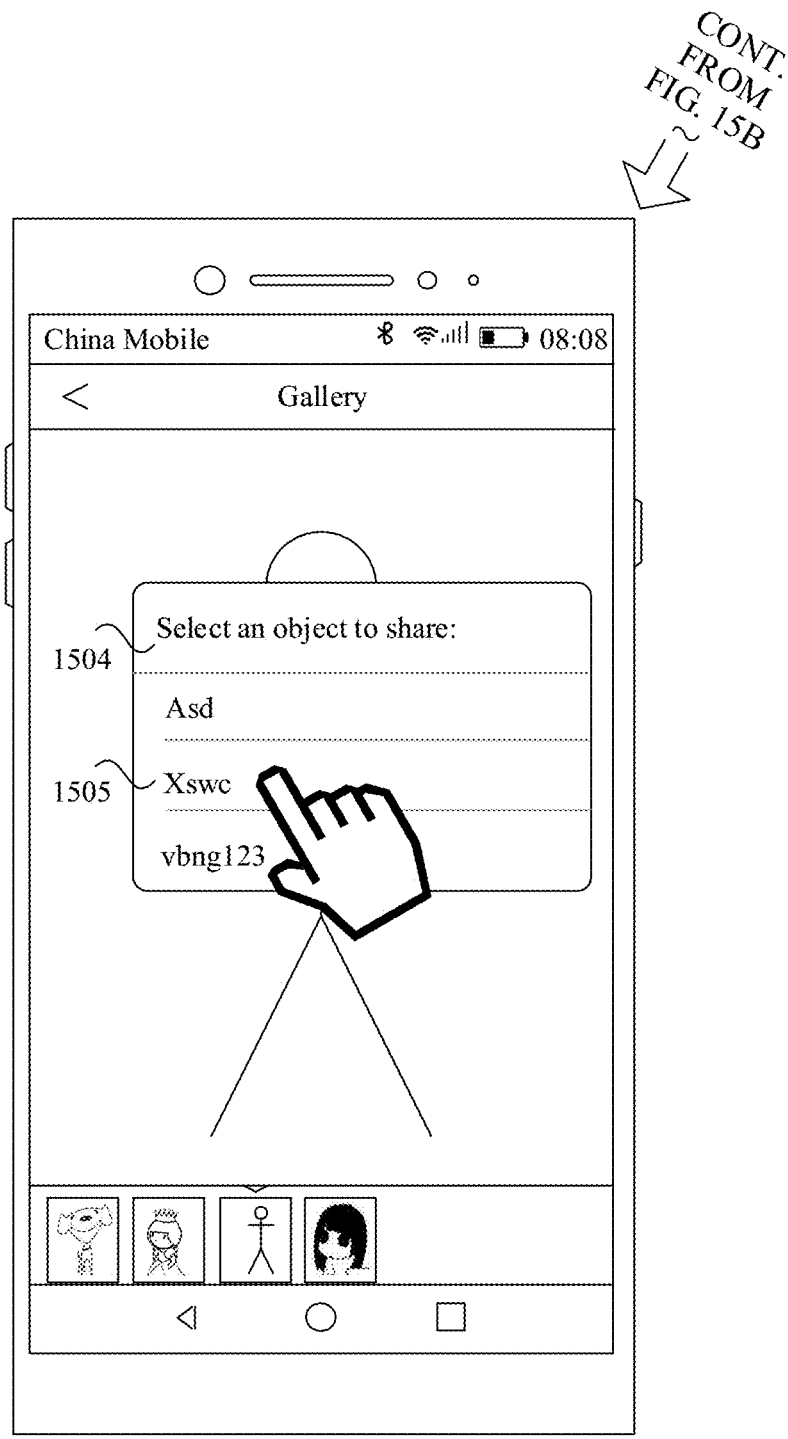

In an example, Bluetooth of the first electronic device and Bluetooth of the second electronic device are enabled. After the first electronic device receives the second operation performed by the user on the second control, for example, the tap operation performed on the "share this picture" option 1503, the first electronic device may perform scanning in response to the second operation, to discover an electronic device with which the first electronic device may share data. As shown in FIG. 15C, a discovery device list 1504 may be further displayed on the touchscreen of the first electronic device. The discovery device list 1504 includes an identifier of the electronic device that is discovered by the first electronic device through scanning and with which the first electronic device may share data, for example, a discovery name of the electronic device. For example, the discovery device list 1504 includes a discovery name "Xswc" of the second electronic device. In this case, the user may select, from the discovery device list 1504, an object that the user wants to share with. As shown in FIG. 15C, the user performs a third operation (for example, a tap operation) on an option 1505 that is in the discovered device list 1504 and that is associated with the discovery name "Xswc". The first electronic device may establish a Bluetooth link to the second electronic device in response to the third operation. The first electronic device may share the picture with the second electronic device based on the established Bluetooth link.

In some embodiments of this application, a specific process in which the first electronic device shares the data such as the picture with the second electronic device may be as follows: Gallery of the first electronic device encapsulates content of the shared picture to obtain to-be-shared data. Gallery invokes a share interface to request a share service provided by a share manager. The share manager encapsulates the to-be-shared data, an APK name of Gallery, and an operation code to obtain to-be-sent data. The to-be-sent data may be the first information in the embodiments of this application. The first electronic device sends the data to the second electronic device through the established Bluetooth link. The operation code may be used to indicate an enabling manner of the to-be-shared data. For example, the operation code is used to indicate to automatically display the to-beshared data. In addition, when the foregoing enabling manner is unique, the operation code may not need to be sent to the second electronic device.

The second electronic device receives the data shared by the first electronic device, for example, the content of the picture. The second electronic device automatically enables the shared data. For example, the second electronic device automatically displays the received picture.

Figure 15D:
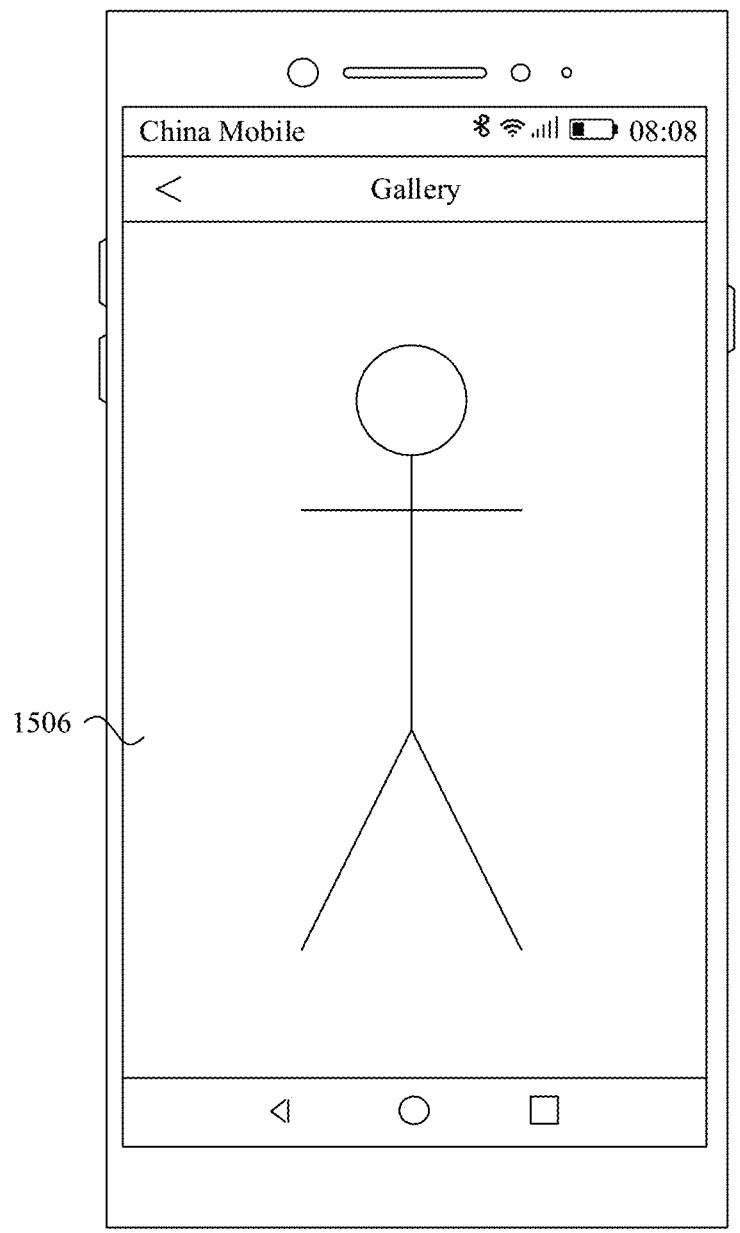

For example, a specific process in which the second electronic device automatically displays the picture may be as follows: The second electronic device may receive, through the established Bluetooth link, the first information such as the foregoing data sent by the first electronic device. After the second electronic device receives the data, the share manager of the second electronic device parses the data. The share manager of the second electronic device determines, based on the APK name included in the data, that an application module executing the to-be-shared data is Gallery. The share manager may provide an on share service for Gallery by using the on share interface, so that Gallery automatically displays the received picture based on the received operation code and the to-be-shared data. As shown in FIG. 15D, after receiving the picture shared by the first electronic device, the second electronic device may automatically display a picture 1506 on the touchscreen of the second electronic device. In some embodiments of this application, after receiving the shared picture, the second electronic device may also display a second screen on the touchscreen of the second electronic device. The second screen may include a prompt box, to prompt the user that the first electronic device shares the picture with the second electronic device. When the user wants to view the picture, the user may perform a fourth operation (for example, a tap operation) on a third control such as an accept and execute button in the prompt box. The second electronic device automatically displays the received picture in response to the fourth operation.

In some other embodiments of this application, the user may share, by using the first electronic device, a web page that the user is viewing with the second electronic device. Details are not described in the embodiments of this application. A specific process of sharing the web page may be as follows: Browser of the first electronic device encapsulates content of the shared web page to obtain to-be-shared data. Browser invokes a share interface to request a share service provided by a share manager. The share manager encapsulates the to-be-shared data, an APK name of Browser, and an operation code to obtain to-be-sent data. The first electronic device sends the data to the second electronic device through the established wireless link. After the second electronic device receives, through the established wireless link, the data sent by the first electronic device, the share manager of the second electronic device parses the data. The share manager of the second electronic device determines, based on the APK name included in the data, that an application module executing the to-be-shared data is Browser. The share manager may provide an on share service for Browser by using the on share interface, so that Browser automatically displays the web page based on the received operation code and the to-be-shared data.

In some other embodiments of this application, for example, the user wants to share a folder with the second electronic device by using the first electronic device. In addition, the first electronic device and the second electronic device access a same local area network.

Figure 16A:
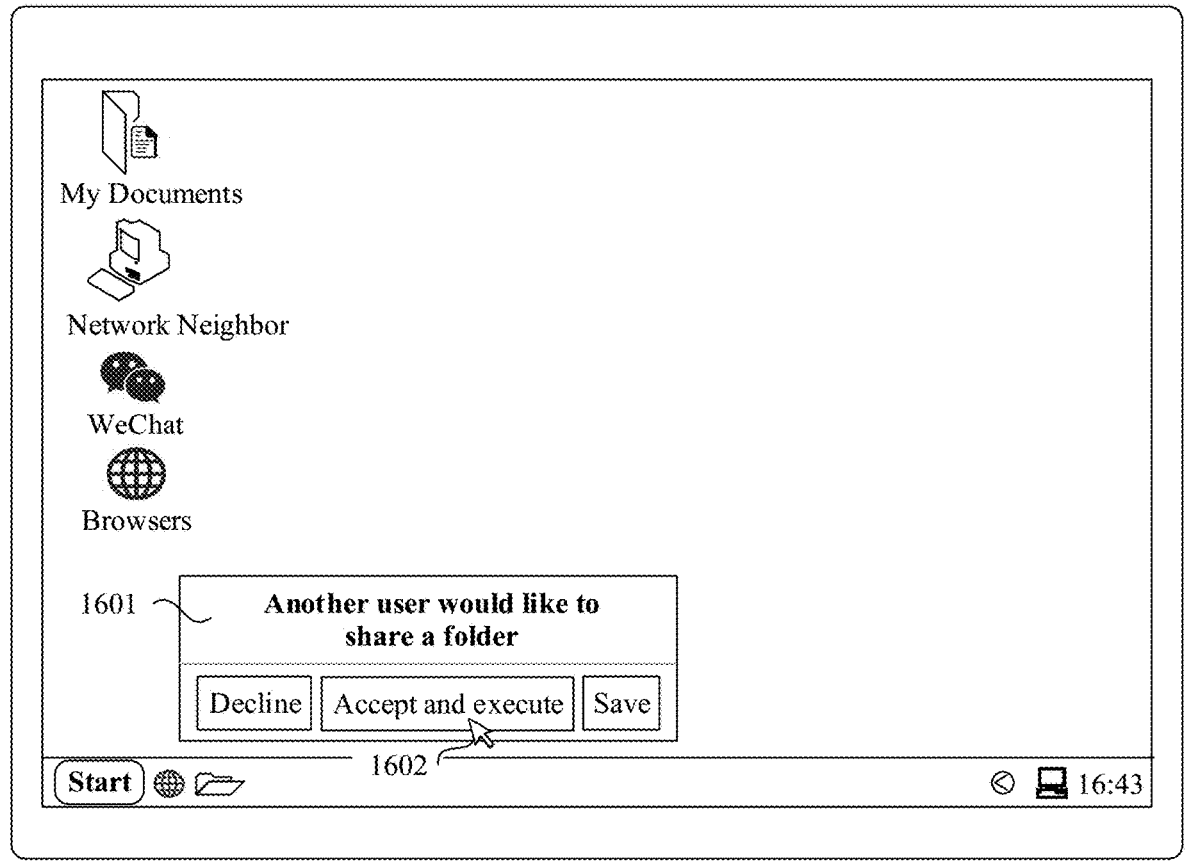
FIG. 16A and FIG. 16B are schematic diagrams of some other graphical user interfaces displayed on an electronic device according to some other embodiments of this application.
Figures 16A, 16B:
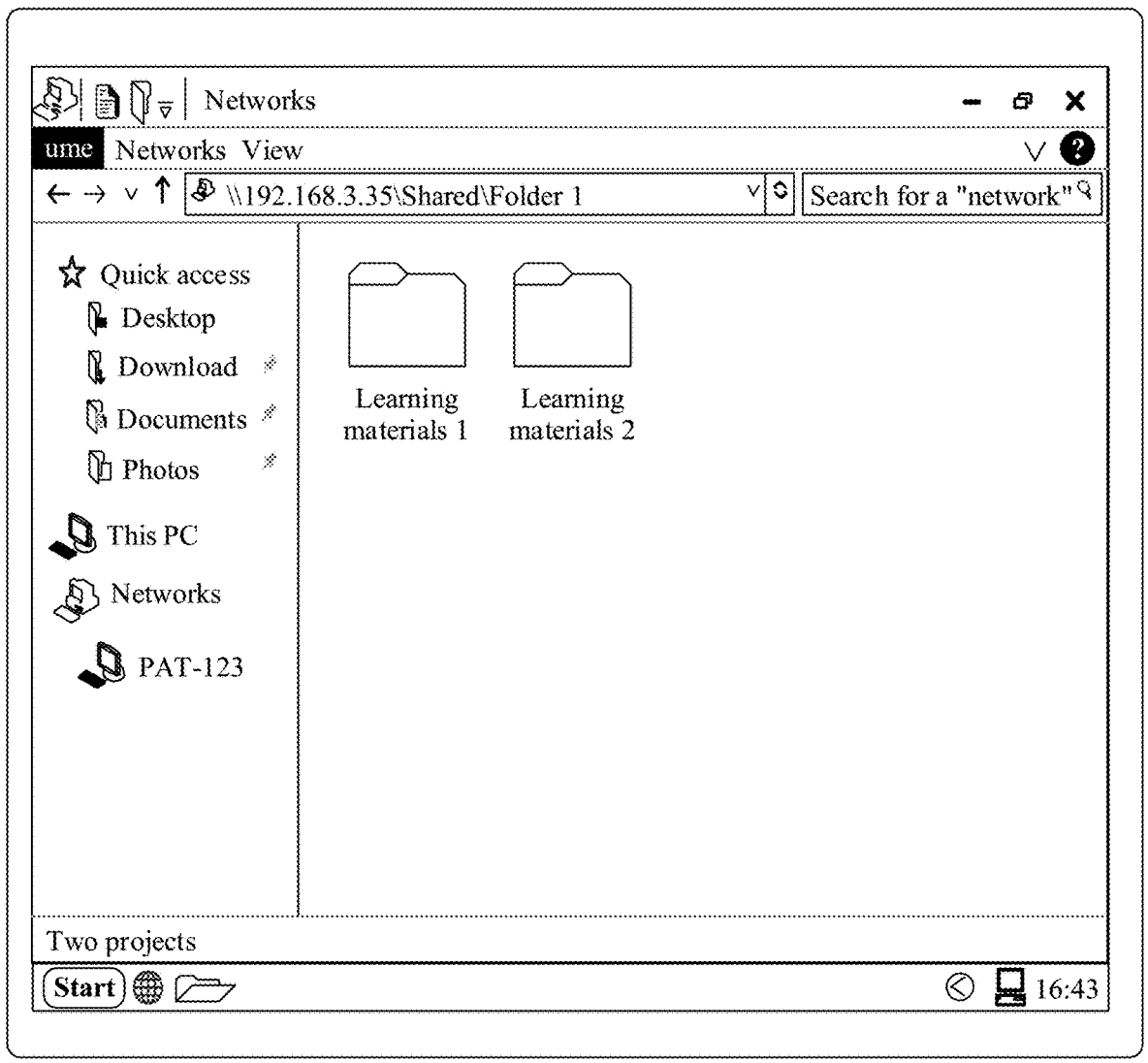

For example, the user sets a folder 1 in the first electronic device as a shared folder. For example, the folder 1 includes two sub-folders: a folder "learning materials 1" and a folder "learning materials 2". In some embodiments of this application, after the user sets the folder 1 as the shared folder, the first electronic device may invoke a share interface to access a share service provided by a share manager, and encapsulate a uniform resource identifier (Uniform Resource Identifier, URI) of the folder 1 to obtain to-be-sent data. For example, the URI of the folder 1 is \\192.168.3.35\shared\folder 1. The first electronic device sends the data to the second electronic device accessing the same local area network as the first electronic device. After the second electronic device receives the data from the first electronic device, as shown in FIG. 16A, the second electronic device may display a prompt box 1601, to prompt the user that the first electronic device sets the folder 1 as the shared folder. When the user wants to view the folder 1, the user may perform a tap operation on an accept and execute button 1602 in the prompt box 1601. In response to the tap operation, as shown in FIG. 16B, the second electronic device may open, based on the URI included in the data, the folder 1 shared by the first electronic device. In this way, the user can open the folder 1 shared by the first electronic device, without first enabling "network neighbor" of the second electronic device and then performing a level-by-level search in folders of "network neighbor".

It should be understood that descriptions of technical features, technical solutions, beneficial effects, or similar terms in this application do not imply that all features and advantages can be implemented in any individual embodiment. The technical features and technical solutions described in the embodiments may also be combined in any proper manner.

Figure 17:
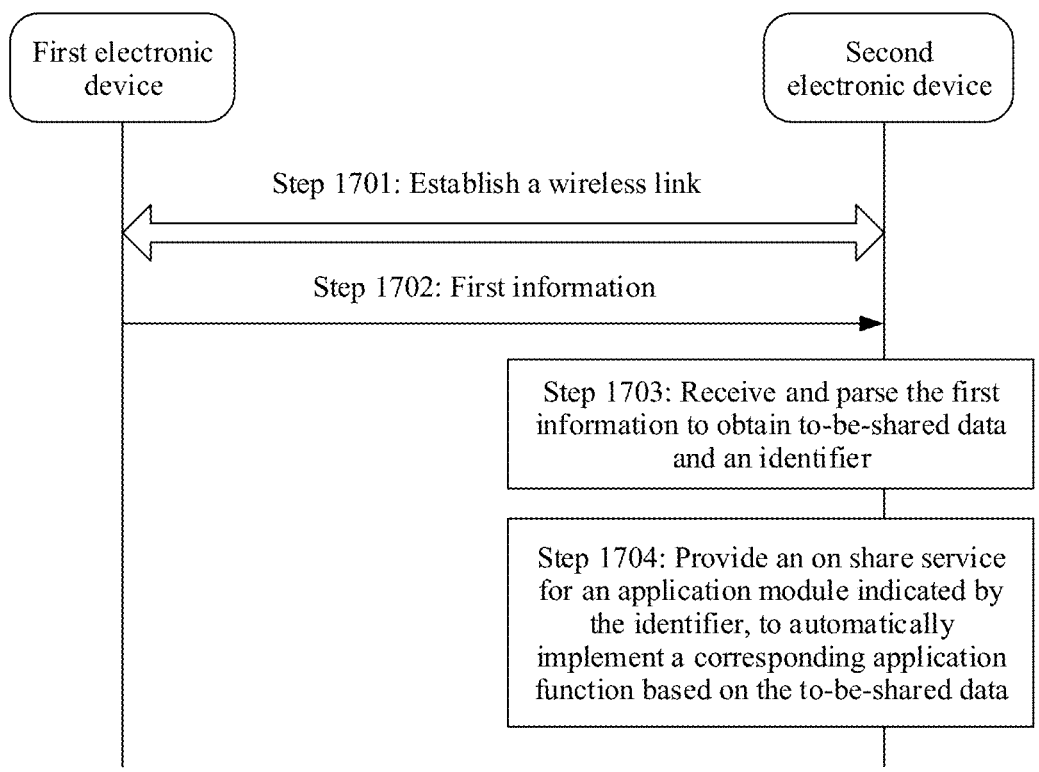
FIG. 17 is a schematic flowchart of an application function implementation method according to an embodiment of this application.

With reference to the foregoing embodiments and corresponding accompanying drawings, an embodiment of this application provides an application function implementation method. The method may be implemented in an electronic device (for example, a first electronic device and a second electronic device) having the hardware structure shown in FIG. 3/the software architecture shown in FIG. 4. As shown in FIG. 17, the method may include the following operations.

Operation 1701: The first electronic device establishes a wireless link to the second electronic device.

For example, the first electronic device may establish the wireless link to the second electronic device by using a short-range communications technology. For example, the first electronic device establishes a Bluetooth link to the second electronic device by using a Bluetooth technology. For another example, the first electronic device may establish a Wi-Fi link to the second electronic device by using a Wi-Fi technology.

In some embodiments of this application, the first electronic device may first discover the second electronic device by using a Bluetooth technology, and is matched against the second electronic device. Then, the first electronic device may establish a Wi-Fi direct wireless link to the second electronic device by using a Wi-Fi protocol. In this way, the first electronic device and the second electronic device can perform high-rate data transmission with each other by using the Wi-Fi direct wireless link.

Operation 1702: The first electronic device sends first information to the second electronic device by using the wireless link.

The first information may include to-be-shared data and an identifier, and the identifier is used to indicate an application module.

In some other embodiments of this application, the first information may further include an operation code, and the operation code is used to indicate an enabling manner of the to-be-shared data.

For example, the to-be-shared data may include related parameters (for example, an SSID and a password corresponding to the SSID) of a wireless local area network, the identifier is an APK name in Settings and a class name of a Wi-Fi module, the application module indicated by the identifier is the Wi-Fi module in Settings, and the operation code is used to indicate to automatically access the wireless local area network by using the related parameters (for example, the SSID and the password corresponding to the SSID) of the wireless local area network. For another example, the to-be-shared data may be content of a video, the identifier is an APK name of a video application, the application module indicated by the identifier is the video application, and the operation code is used to indicate to automatically play the video. For another example, the to-be-shared data is content of a picture, the identifier is an APK name of Gallery, the application module indicated by the identifier is Gallery, and the operation code is used to indicate to automatically display the picture. For another example, the to-be-shared data is a related parameter of a Do Not Disturb mode (for example, a time or a location for enabling the Do Not Disturb mode) in the first electronic device, the identifier is an APK name in Settings (Settings) and a class name of a Do Not Disturb mode module, the application module indicated by the identifier is the Do Not Disturb mode module in Settings, and the operation code is used to indicate to automatically load the related parameter of the Do Not Disturb mode to automatically enable the Do Not Disturb mode. For another example, the to-be-shared data is a configuration parameter (for example, a description, a server, a remote ID, or a user name) of a VPN in the first electronic device, the identifier is an APK name in Settings (Settings) and a class name of a VPN module, the application module indicated by the identifier is the VPN module in Settings, and the operation code is used to indicate to automatically load the configuration parameter of the VPN to automatically add a VPN configuration.

In addition, the to-be-shared data may be further provided with attribute information. The attribute information may include at least one of the following: whether storing is allowed, whether printing is allowed, whether re-sharing is allowed, whether burning is performed immediately after reading, and the like.

Operation 1703: The second electronic device receives and parses the first information to obtain the to-be-shared data and the identifier.

Operation 1704: The second electronic device provides (for example, by using an on share interface) an on share service for the application module indicated by the identifier, and automatically implements a corresponding application function based on the to-be-shared data.

After receiving the first information, the second electronic device may parse the first information to obtain the to-be-shared data and the identifier that are carried in the first information. The second electronic device may provide, by using the on share interface, the on share service for the application module indicated by the identifier included in the first information, and may automatically implement the corresponding application function based on the application module indicated by the identifier and the to-be-shared data. For example, the second electronic device may provide, by using the on share interface, an on share service for a Wi-Fi module in Settings that is indicated by the identifier, so that the Wi-Fi module in Settings automatically accesses a wireless local area network by using related parameters (for example, an SSID and a password corresponding to the SSID) of the wireless local area network that are shared by the first electronic device. For another example, the second electronic device may provide, by using the on share interface, an on share service for a video application indicated by the identifier, so that the video application automatically plays a video shared by the first electronic device. For another example, the second electronic device may provide, by using the on share interface, an on share service for a Do Not Disturb mode module in Settings that is indicated by the identifier, so that the Do Not Disturb mode module in Settings automatically loads a related parameter (for example, a time or a location for enabling a Do Not Disturb mode) of the Do Not Disturb mode that is shared by the first electronic device, to automatically enable the Do Not Disturb mode. For another example, the second electronic device may provide, by using the on share interface, an on share service for a virtual private network (Virtual Private Network, VPN) module in Settings that is indicated by the identifier, so that the VPN module in Settings automatically loads a configuration parameter (for example, a description, a server, a remote ID, or a user name) of a VPN that is shared by the first electronic device, to automatically add a VPN configuration.

Figure 18:
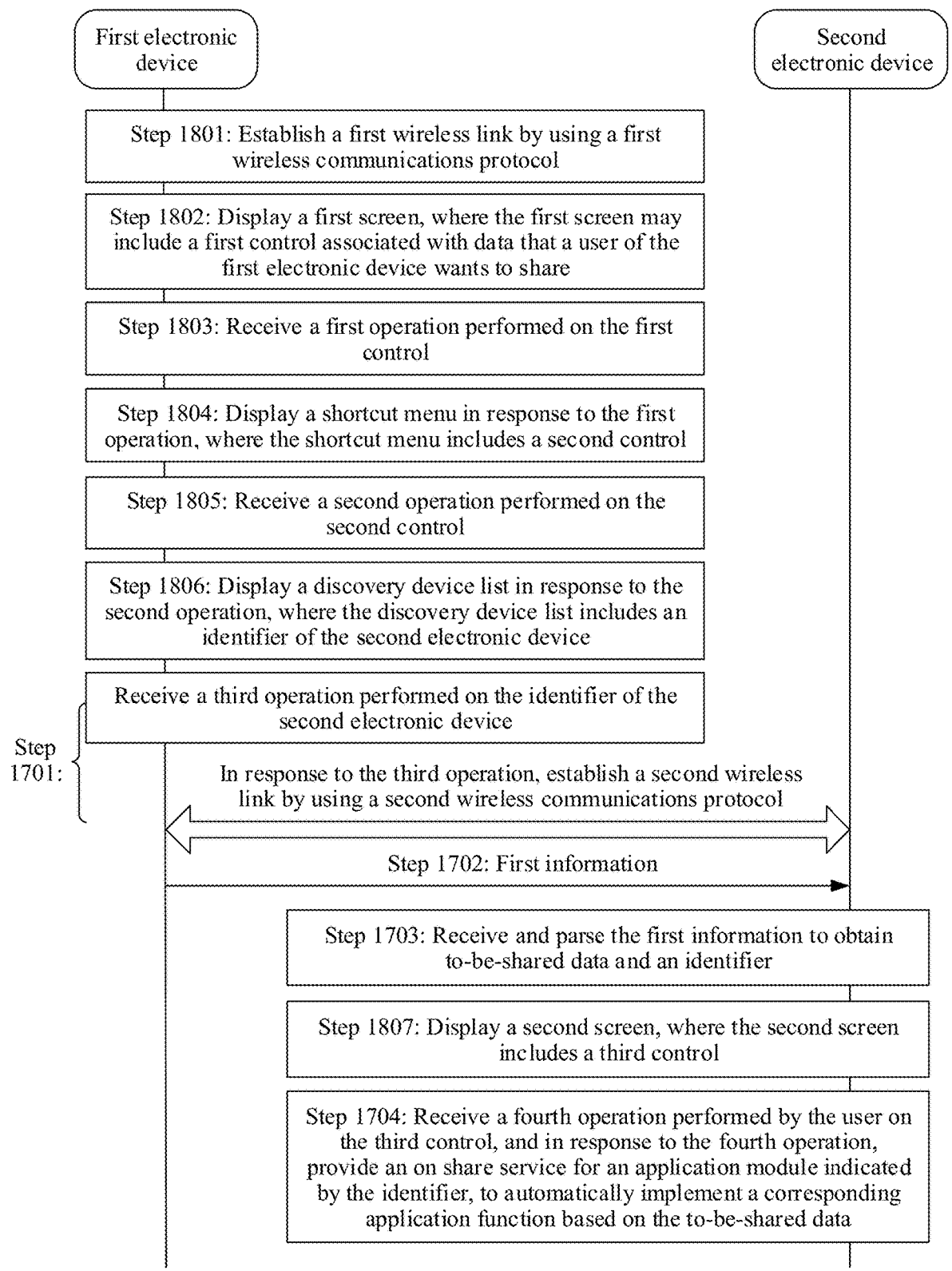
FIG. 18 is a schematic flowchart of another application function implementation method according to an embodiment of this application.

In some other embodiments of this application, as shown in FIG. 18, before operation 1701, the application function implementation may further include the following operation: Operation 1801: The first electronic device establishes a first wireless link by using a first wireless communications protocol. The first wireless communications protocol may include any one of the following: a Wi-Fi protocol, a Bluetooth protocol, a ZigBee protocol, an NFC protocol, a protocol used in a 4G technology, and a protocol used in a 5G technology. For example, the first electronic device may access a wireless local area network by using the Wi-Fi protocol.

In some embodiments of this application, further, as shown in FIG. 18, before operation 1701, the application function implementation may further include the following operations.

Operation 1802: The first electronic device displays a first screen, where the first screen may include a first control associated with data that a user of the first electronic device wants to share.

For example, the first screen may be the settings screen 601 of the wireless local area network function that is shown in FIG. 6A, and the first control may be the control 602 that is shown in FIG. 6A and that is associated with the SSID "Angel's Wings". For another example, the first screen may be the playback screen 1201 of the current video that is shown in FIG. 12A. For another example, the first screen may be the viewing screen 1501 of the current picture that is shown in FIG. 15A.

Operation 1803: The first electronic device receives a first operation such as a touch-and-hold operation or a double-tap operation performed on the first control.

Operation 1804: The first electronic device displays a shortcut menu in response to the first operation, where the shortcut menu includes a second control.

For example, the shortcut menu may be the shortcut menu 603 shown in FIG. 6B, and the second control may be the "share this network" option 604 shown in FIG. 6B. For another example, the shortcut menu may be the shortcut menu 1203 shown in FIG. 12B, and the second control may be the "share this video" option 1203 shown in FIG. 12B.

For another example, the shortcut menu may be the shortcut menu 1503 shown in FIG. 15B, and the second control may be the "share this picture" option 1503 shown in FIG. 15B.

Operation 1805: The first electronic device receives a second operation such as a tap operation performed on the second control.

Operation 1806: The first electronic device displays a discovery device list in response to the second operation, where the discovery device list includes an identifier of the second electronic device.

The identifier of the second electronic device may be a discovery name. For example, the discovery device list may be the discovery device list 605 shown in FIG. 6C or the discovery device list 901 shown in FIG. 9. For another example, the discovery device list may be the discovery device list 1204 shown in FIG. 12C. For another example, the discovery device list may be the discovery device list 1504 shown in FIG. 15C.

In some embodiments of this application, in operation 1701, the first electronic device receives a third operation performed on the identifier of the second electronic device. In response to the third operation, the first electronic device establishes a second wireless link to the second electronic device by using a second wireless communications protocol. The second wireless communications protocol is different from the first wireless communications protocol. The second wireless communications protocol may include any one of the following: a Wi-Fi protocol, a Bluetooth protocol, a ZigBee protocol, an NFC protocol, a protocol used in a 4G technology, and a protocol used in a 5G technology. For example, the second electronic device may establish a Bluetooth link to the second electronic device by using the Bluetooth protocol.

In some embodiments of this application, the first electronic device and the second electronic device may be associated with each other. For example, the first electronic device and the second electronic device are logged in to with a same account. Alternatively, an account with which the second electronic device is logged in to is a contact of the first electronic device. The foregoing account may be an account provided by a cloud service provider for a user, for example, a Xiaomi ID, a Huawei ID, or an Apple ID (Apple ID), or may be an account used to log in to an application, for example, a WeChat account or a Google mailbox account.

In some other embodiments of this application, before operation 1704, the application function implementation method may further include the following operation:

Operation 1807: The second electronic device displays a second screen, where the second screen includes a third control.

For example, the second screen may include the prompt box 1101 shown in FIG. 11A, and the prompt box 1101 includes the third control such as the accept and execute button 1102 shown in FIG. 11A. For another example, the second screen may include the prompt box 1301 shown in FIG. 13A, and the prompt box 1301 includes the third control such as the accept and execute button 1302 shown in FIG. 13A.

In some other embodiments of this application, in operation 1704, the second electronic device receives a fourth operation (for example, a tap operation) performed by the user on the third control. In response to the fourth operation, the second electronic device provides (for example, by using the on share interface) the on share service for the application module indicated by the identifier, and automatically implements the corresponding application function based on the to-be-shared data.

According to the application function implementation method provided in this embodiment of this application, after the first electronic device establishes the wireless link to the second electronic device, the first electronic device sends, to the second electronic device through the established wireless link, the information that includes the to-be-shared data and the identifier used to indicate the application module, so that after receiving the information, the second electronic device can provide the on share service for the application module indicated by the identifier, and automatically implement the corresponding application function based on the to-be-shared data. In this way, complexity of user operations is reduced, use efficiency of an electronic device is improved, and efficient interaction between the electronic device and the user is implemented.

Figure 19:
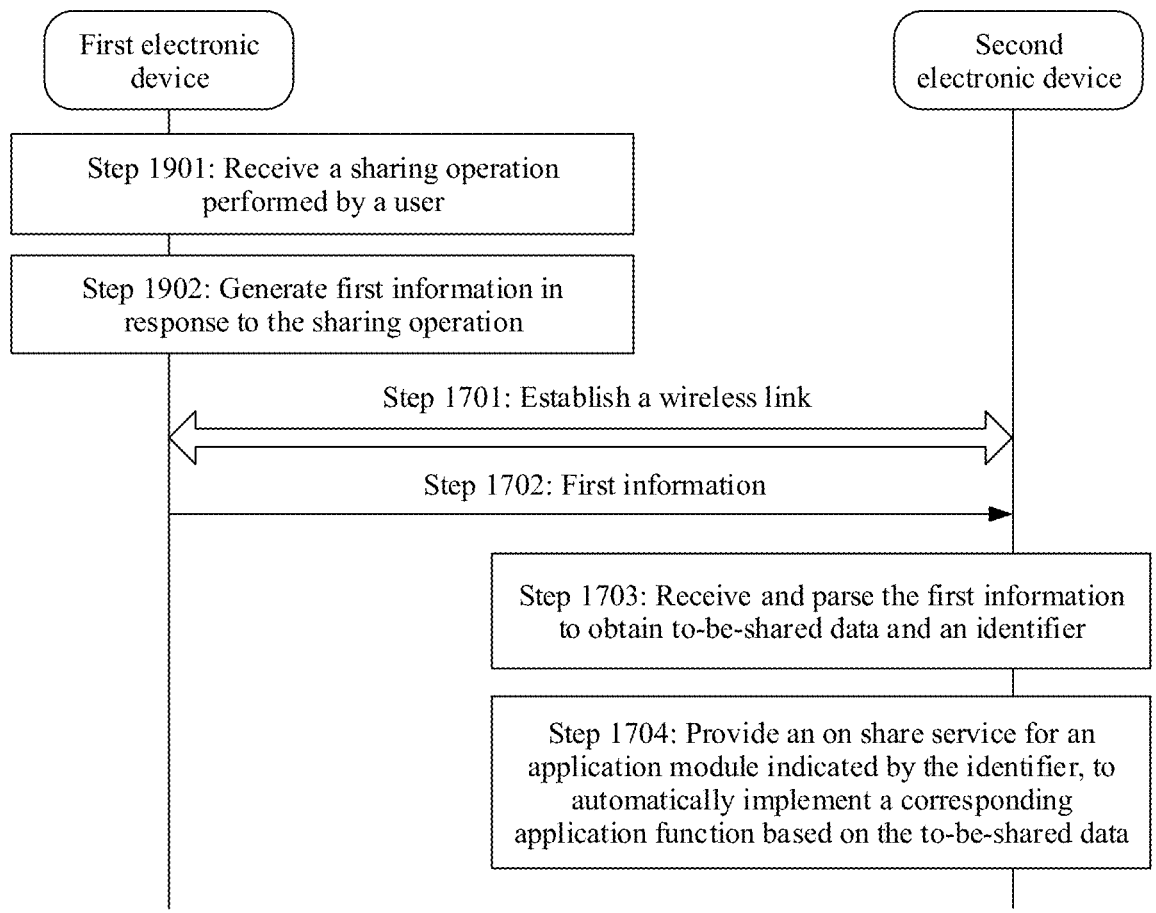
FIG. 19 is a schematic flowchart of still another application function implementation method according to an embodiment of this application.

In some other embodiments of this application, before operation 1701, as shown in FIG. 19, the method may further include the following operations:

Operation 1901: The first electronic device receives a sharing operation performed by a user.

For example, the sharing operation may be a sharing operation performed by the user on a specific function (for example, a wireless local area network function or a Do Not Disturb mode function) in Settings (Settings).

Operation 1902: The first electronic device generates first information in response to the sharing operation.

For example, that the user shares a related parameter of a specific function in Settings is used as an example for description. In response to the sharing operation performed by the user on the specific function in Settings, the first electronic device and a function module corresponding to the function encapsulate related data of the function, to obtain to-be-shared data. The function module corresponding to the function in Settings of an application layer of the first electronic device invokes a share interface to request a share manager at an application framework layer to perform further encapsulation on the to-be-shared data, to obtain first information. The first information includes the to-be-shared data, a specified package name, a class name of the function module, and an operation code. The operation code may be used to indicate an enabling manner of the to-be-shared data. For example, that the user shares a related parameter of a wireless local area network in Settings is used as an example. In response to the sharing operation performed by the user on a wireless local area network function in Settings, the first electronic device and a Wi-Fi module corresponding to the wireless local area network function in Settings encapsulate related data (for example, an SSID and a password corresponding to the SSID) of the wireless local area network, to obtain to-be-shared data. The Wi-Fi module in Settings of an application layer of the first electronic device invokes a share interface to request a share manager at the application framework layer to perform further encapsulation on the to-be-shared data, to obtain first information. The first information includes the to-be-shared data, a specified package name, a class name of the Wi-Fi module, and an operation code. The operation code may be used to indicate to automatically access the wireless local area network by using the related parameter (for example, the SSID and the password corresponding to the SSID) of the wireless local area network. For another example, that the user shares a related parameter of a Do Not Disturb mode in Settings is used as an example. In response to the sharing operation performed by the user on a Do Not Disturb mode function in Settings, the first electronic device and a Do Not Disturb mode module corresponding to the Do Not Disturb mode function in Settings encapsulate a related parameter (for example, a time and a location for enabling the Do Not Disturb mode) of the Do Not Disturb mode, to obtain to-be-shared data. The Do Not Disturb mode module in Settings of an application layer of the first electronic device invokes a share interface to request a share manager at the application framework layer to perform further encapsulation on the to-be-shared data, to obtain first information. The first information includes the to-be-shared data, a specified package name, a class name of the Do Not Disturb mode module, and an operation code. The operation code may be used to automatically load the related parameter (for example, the time and the location for enabling the Do Not Disturb mode) of the Do Not Disturb mode that is shared by the first electronic device, to automatically enable the Do Not Disturb mode. For another example, that the user shares a configuration parameter of a VPN in Settings is used as an example. In response to the sharing operation performed by the user on the VPN in Settings, the first electronic device and a VPN module corresponding to the VPN in Settings encapsulate a configuration parameter (for example, a description, a server, a remote ID, or a user name) of the VPN, to obtain to-be-shared data. The VPN module in Settings of an application layer of the first electronic device invokes a share interface to request a share manager at the application framework layer to perform further encapsulation on the to-be-shared data, to obtain first information. The first information includes the to-be-shared data, a specified package name, a class name of the VPN module, and an operation code. The operation code may be used to automatically load the configuration parameter (for example, the description, the server, the remote ID, or the user name) of the VPN that is shared by the first electronic device, to automatically add a VPN configuration.

In some embodiments of this application, for example, that a user of the first electronic device shares a related parameter of a specific function in Settings (Settings) is used as an example for description. Operation 1703 and operation 1704 may specifically include: An application framework layer of the second electronic device receives first information, and a share manager at the application framework layer of the second electronic device parses the first information to obtain to-be-shared data, a specified package name, a class name of a function module, and an operation code that are included in the first information. The share manager at the application framework layer of the second electronic device provides an on share service for a corresponding function module in Settings based on the specified package name and the class name of the function module by using an on share interface, so that the corresponding function module in Settings automatically implements a corresponding function based on the to-be-shared data and the operation code. For example, that a user of the first electronic device shares a related parameter of a wireless local area network in Settings is used as an example. An application framework layer of the second electronic device receives first information, and a share manager at the application framework layer of the second electronic device parses the first information to obtain to-be-shared data (for example, the related parameter of the wireless local area network), a specified package name, a class name of a Wi-Fi module, and an operation code that are included in the first information. The share manager at the application framework layer of the second electronic device provides an on share service for the Wi-Fi module in Settings based on the specified package name and the class name of the Wi-Fi module by using an on share interface, and the Wi-Fi module in Settings automatically accesses the wireless local area network based on the related parameter (for example, an SSID and a password corresponding to the SSID) of the wireless local area network and the operation code. For another example, that a user of the first electronic device shares a related parameter of a Do Not Disturb mode in Settings is used as an example. An application framework layer of the second electronic device receives first information, and a share manager at the application framework layer of the second electronic device parses the first information to obtain to-be-shared data (for example, the related parameter of the Do Not Disturb mode), a specified package name, a class name of a Do Not Disturb mode module, and an operation code that are included in the first information. The share manager at the application framework layer of the second electronic device provides an on share service for the Do Not Disturb mode module in Settings based on the specified package name and the class name of the Do Not Disturb mode module by using an on share interface, and the Do Not Disturb mode module in Settings automatically loads, based on the related parameter (for example, a time or a location for enabling the Do Not Disturb mode) of the Do Not Disturb mode and the operation code, the related parameter of the Do Not Disturb mode that is shared by the first electronic device, to automatically enable the Do Not Disturb mode. For another example, that a user of the first electronic device shares a configuration parameter of a VPN in Settings is used as an example. An application framework layer of the second electronic device receives first information, and a share manager at the application framework layer of the second electronic device parses the first information to obtain to-be-shared data (for example, the configuration parameter of the VPN), a specified package name, a class name of a VPN module, and an operation code that are included in the first information. The share manager at the application framework layer of the second electronic device provides an on share service for the VPN module in Settings based on the specified package name and the class name of the VPN module by using an on share interface. The VPN module in Settings automatically loads, based on the configuration parameter (for example, a description, a server, a remote ID, or a user name) of the VPN and the operation code, the configuration parameter of the VPN that is shared by the first electronic device, to automatically add a VPN configuration.

Figure 20:
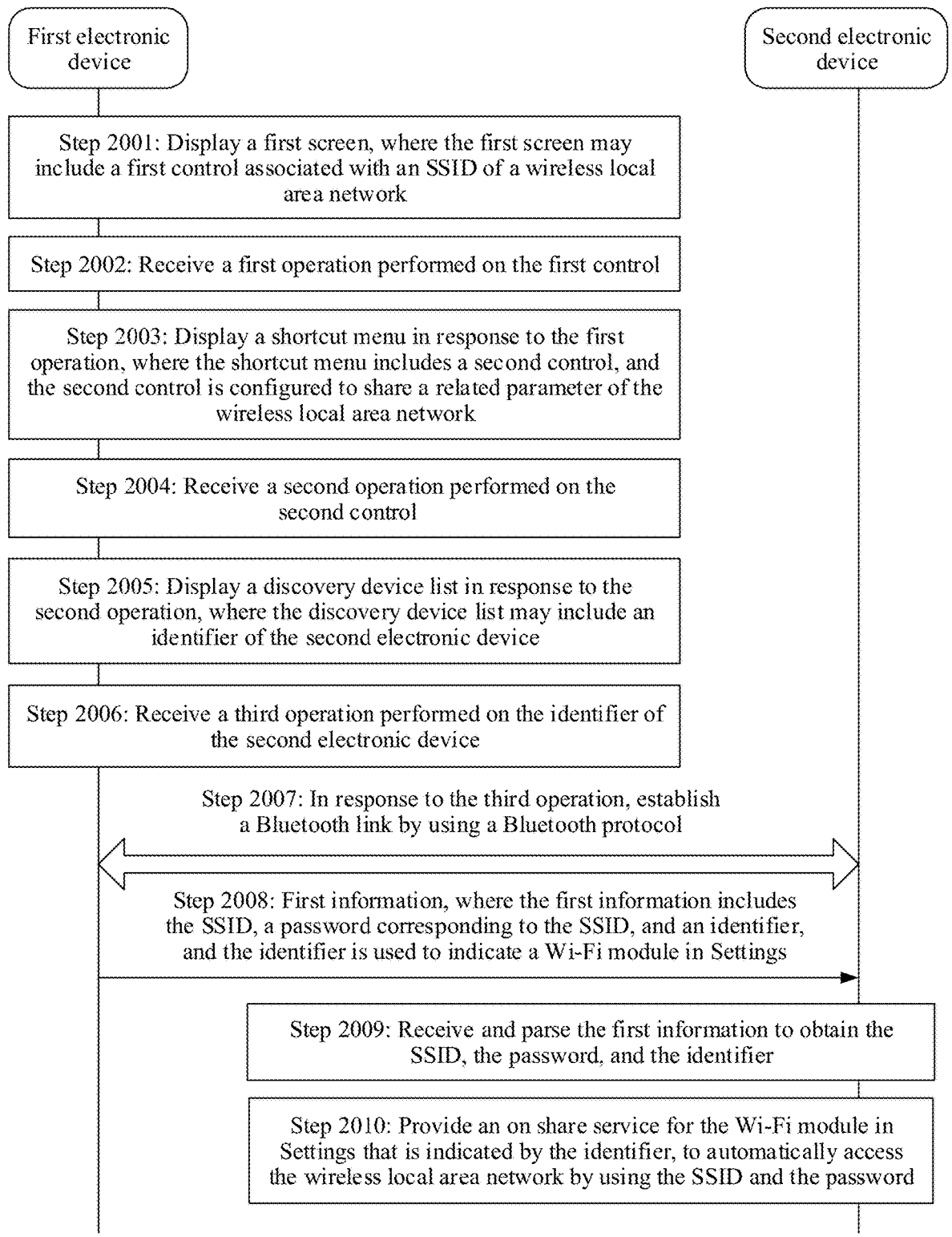
FIG. 20 is a schematic flowchart of an application function implementation method according to another embodiment of this application.

With reference to the foregoing embodiments and corresponding accompanying drawings, another embodiment of this application provides an application function implementation method. The method may be implemented in an electronic device (for example, a first electronic device and a second electronic device) having the hardware structure shown in FIG. 3/the software architecture shown in FIG. 4. As shown in FIG. 20, the method may include the following operations.

Operation 2001: The first electronic device displays a first screen, where the first screen may include a first control associated with an SSID of a wireless local area network.

For example, the first screen may be the settings screen 601 of the wireless local area network function that is shown in FIG. 6A, and the first control may be the control 602 that is shown in FIG. 6A and that is associated with the SSID "Angel's Wings".

Operation 2002: The first electronic device receives a first operation such as a touch-and-hold operation or a double-tap operation performed on the first control.

Operation 2003: The first electronic device displays a shortcut menu in response to the first operation, where the shortcut menu includes a second control, and the second control is configured to share a related parameter (for example, the SSID and a password corresponding to the SSID) of the wireless local area network.

For example, the shortcut menu may be the shortcut menu 603 shown in FIG. 6B, and the second control may be the "share this network" option 604 shown in FIG. 6B.

Operation 2004: The first electronic device receives a second operation such as a tap operation performed on the second control.

Operation 2005: The first electronic device displays a discovery device list in response to the second operation, where the discovery device list may include an identifier of the second electronic device.

The identifier of the second electronic device may be a discovery name. For example, the discovery device list may be the discovery device list 605 shown in FIG. 6C or the discovery device list 901 shown in FIG. 9.

Operation 2006: The first electronic device receives a third operation performed on the identifier of the second electronic device.

Operation 2007: In response to the third operation, the first electronic device establishes a Bluetooth link to the second electronic device by using a Bluetooth protocol.

Operation 2008: The first electronic device sends first information to the second electronic device by using the Bluetooth link, where the first information includes the SSID, the password corresponding to the SSID, and an identifier, and the identifier is used to indicate a Wi-Fi module in Settings (Settings).

Operation 2009: The second electronic device receives and parses the first information to obtain the SSID, the password, and the identifier.

Operation 2010: The second electronic device provides (for example, by using an on share interface) an on share service for the Wi-Fi module in Settings that is indicated by the identifier, and automatically accesses the wireless local area network by using the SSID and the password.

According to the application function implementation method provided in this embodiment of this application, after a user of the first electronic device performs an operation on a control related to network sharing, the first electronic device can send, to the second electronic device by using the wireless link established by the first electronic device to the second electronic device, the information that includes the SSID and the password corresponding to the S SID of the wireless local area network, and the identifier used to indicate the Wi-Fi module in Settings, so that after receiving the information, the second electronic device can provide the on share service for the Wi-Fi module in Settings that is indicated by the identifier, and automatically access the wireless local area network by using the SSID and the password. In this way, the user can successfully access the wireless local area network without performing a series of operations on an electronic device, so as to reduce complexity of user operations, improve use efficiency of the electronic device, and implement efficient interaction between the electronic device and the user.

It can be understood that, to implement the foregoing functions, the first electronic device and the second electronic device each includes a corresponding hardware structure and/or software module for performing each of the functions. A person of ordinary skill in the art should easily be aware that, in combination with the examples described in the embodiments disclosed in this specification, units, algorithms, and operations may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

An embodiment of this application further provides an electronic device for implementing the foregoing method embodiments, for example, a first electronic device or a second electronic device. Specifically, the electronic device may be divided into function modules. For example, function modules corresponding to various functions may be obtained through division, or two or more functions may be integrated into one processing module. The integrated module may be implemented in a form of hardware, or may be implemented in a form of a software function module. It should be noted that, in this embodiment of this application, module division is an example, and is merely a logical function division. In actual implementation, another division manner may be used.

Figure 21:
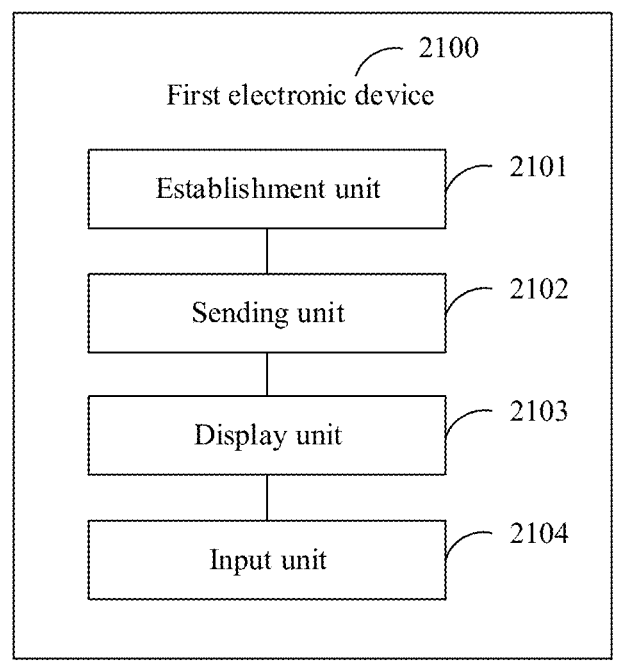
FIG. 21 is a schematic structural diagram of a first electronic device according to an embodiment of this application.

When each function module is obtained through division based on each corresponding function, FIG. 21 is a possible schematic structural diagram of a first electronic device 2100 used in the foregoing embodiments. The first electronic device 2100 may include an establishment unit 2101 and a sending unit 2102.

The establishment unit 2101 is configured to support the first electronic device in performing operation 1701, operation 1801, and operation 2007 in the foregoing method embodiments, and/or is configured to perform another process of the technology described in this specification.

The sending unit 2102 is configured to support the first electronic device in performing operation 1702 and operation 2008 in the foregoing method embodiments, and/or is configured to perform another process of the technology described in this specification.

In this embodiment of this application, further, as shown in FIG. 21, the first electronic device 2100 may further include a display unit 2103 and an input unit 2104.

The display unit 2103 is configured to support the first electronic device in performing operation 1802, operation 1804, operation 1806, operation 2001, operation 2003, and operation 2005 in the foregoing method embodiments, and/or is configured to perform another process of the technology described in this specification. The input unit may be a touchscreen, another hardware, or a combination of hardware and software.

The input unit 2104 is configured to receive an input of a user on a display screen of the first electronic device, for example, a touch input, a voice input, a gesture input, or a floating operation. The input unit 2104 is configured to support the first electronic device in performing operation 1803, operation 1805, operation 1901, receiving a third operation performed on the identifier of the second electronic device, operation 2002, operation 2004, and operation 2006 in the foregoing method embodiments, and/or is configured to perform another process of the technology described in this specification. The input unit may be a touchscreen, another hardware, or a combination of hardware and software. The input unit may be a touchscreen, another hardware, or a combination of hardware and software.

All related content of the operations in the foregoing method embodiments may be cited in function descriptions of corresponding function modules. Details are not described herein again.

Certainly, the first electronic device 2100 includes but is not limited to the unit modules listed above. For example, the first electronic device 2100 may further include a receiving unit configured to receive data or a signal sent by another device, a generation unit configured to generate first information, and the like. In addition, functions that can be specifically implemented by the function units include but are not limited to functions corresponding to the method operations in the foregoing embodiments. For detailed descriptions of other units of the first electronic device 2100, refer to detailed descriptions of method operations corresponding to the units. Details are not described again in this embodiment of this application.

Figure 22:
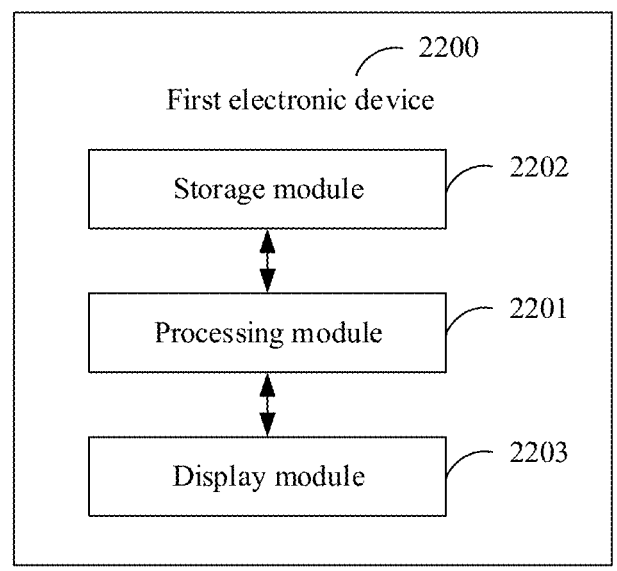
FIG. 22 is a schematic structural diagram of a first electronic device according to another embodiment of this application.

When an integrated unit is used, FIG. 22 is a possible schematic structural diagram of a first electronic device 2200 used in the foregoing embodiments. The first electronic device 2200 may include a processing module 2201, a storage module 2202, and a display module 2203. The processing module 2201 is configured to control and manage actions of the first electronic device 2200. The display module 2203 is configured to display content according to an instruction of the processing module 2201. The storage module 2202 is configured to store program code and data of the first electronic device 2200. Further, the first electronic device 2200 may further include an input module and a communications module. The communications module is configured to support the first electronic device 2200 in communicating with another network entity, to implement functions such as conversation, data exchange, and internet access of the electronic device.

The processing module 2201 may be a processor or a controller. The communications module may be a transceiver, an RF circuit, a communications interface, or the like. The storage module 2202 may be a memory. The display module may be a screen or a display. The input module may be a touchscreen, a voice input apparatus, a fingerprint sensor, or the like.

When the processing module 2201 is the processor, the communications module is the RF circuit, the storage module 2202 is the memory, and the display module 2203 is the touchscreen, the first electronic device 2200 provided in this embodiment of this application may be the mobile phone shown in FIG. 3. The communications module may include both the RF circuit, and a Wi-Fi module, an NFC module, and a Bluetooth module. Communications modules such as the RF circuit, the NFC module, the Wi-Fi module, and the Bluetooth module may be collectively referred to as a communications interface. The processor, the RF circuit, the touchscreen, and the memory may be coupled together by using a bus.

Figure 23:
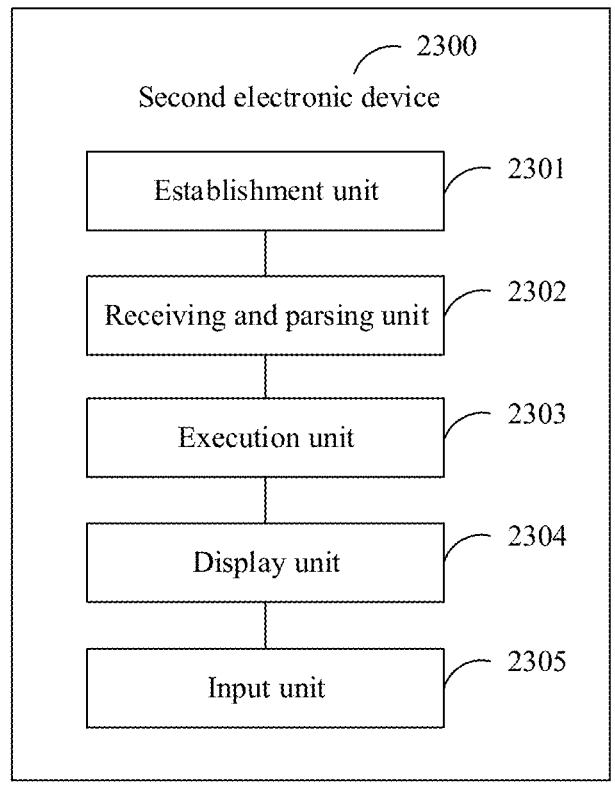
FIG. 23 is a schematic structural diagram of a second electronic device according to an embodiment of this application.

When each function module is obtained through division based on each corresponding function, FIG. 23 is a possible schematic structural diagram of a second electronic device 2300 used in the foregoing embodiments. The second electronic device 2300 may include an establishment unit 2301, a receiving and parsing unit 2302, and an execution unit 2303.

The establishment unit 2301 is configured to support the second electronic device in establishing a wireless link to a first electronic device, and/or is configured to perform another process of the technology described in this specification.

The receiving and parsing unit 2302 is configured to support the second electronic device in performing operation 1703 and operation 2009 in the foregoing method embodiments, and/or is configured to perform another process of the technology described in this specification.

The execution unit 2303 is configured to support the second electronic device in performing operation 1704 and operation 2010 in the foregoing method embodiments, and/or is configured to perform another process of the technology described in this specification.

In this embodiment of this application, further, as shown in FIG. 23, the second electronic device 2300 may further include a display unit 2304 and an input unit 2305.

The display unit 2304 is configured to support the second electronic device in performing operation 1807 in the foregoing method embodiment, and/or is configured to perform another process of the technology described in this specification. The input unit may be a touchscreen, another hardware, or a combination of hardware and software.

The input unit 2305 is configured to receive an input of a user on a display screen of the second electronic device, for example, a touch input, a voice input, a gesture input, or a floating operation. The input unit 2305 is configured to support the second electronic device in performing operation 1704 of receiving a fourth operation performed by the user on the third control in the foregoing method embodiment, and/or is configured to perform another process of the technology described in this specification. The input unit may be a touchscreen, another hardware, or a combination of hardware and software. The input unit may be a touchscreen, another hardware, or a combination of hardware and software.

All related content of the operations in the foregoing method embodiments may be cited in function descriptions of corresponding function modules. Details are not described herein again.

Certainly, the second electronic device 2300 includes but is not limited to the unit modules listed above. In addition, functions that can be specifically implemented by the function units include but are not limited to functions corresponding to the method operations in the foregoing embodiments. For detailed descriptions of other units of the second electronic device 2300, refer to detailed descriptions of method operations corresponding to the units. Details are not described again in this embodiment of this application.

Figure 24:
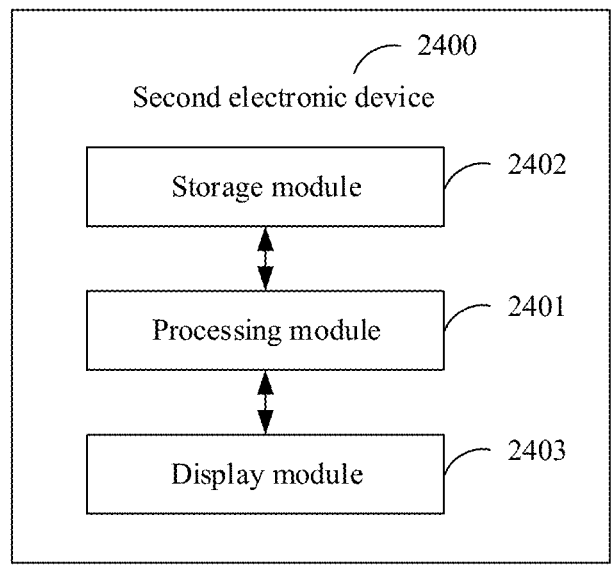
FIG. 24 is a schematic structural diagram of a second electronic device according to another embodiment of this application.

When an integrated unit is used, FIG. 24 is a possible schematic structural diagram of a second electronic device 2400 used in the foregoing embodiments. The second electronic device 2400 may include a processing module 2401, a storage module 2402, and a display module 2403. The processing module 2401 is configured to control and manage actions of the second electronic device 2400. The display module 2403 is configured to display content according to an instruction of the processing module 2401. The storage module 2402 is configured to store program code and data of the second electronic device 2400. Further, the second electronic device 2400 may further include an input module and a communications module. The communications module is configured to support the second electronic device 2400 in communicating with another network entity, to implement functions such as conversation, data exchange, and internet access of the electronic device.

The processing module 2401 may be a processor or a controller. The communications module may be a transceiver, an RF circuit, a communications interface, or the like. The storage module 2402 may be a memory. The display module may be a screen or a display. The input module may be a touchscreen, a voice input apparatus, a fingerprint sensor, or the like.

When the processing module 2401 is the processor, the communications module is the RF circuit, the storage module 2402 is the memory, and the display module 2403 is the touchscreen, the second electronic device 2400 provided in this embodiment of this application may be the mobile phone shown in FIG. 3. The communications module may include both the RF circuit, and a Wi-Fi module, an NFC module, and a Bluetooth module. Communications modules such as the RF circuit, the NFC module, the Wi-Fi module, and the Bluetooth module may be collectively referred to as a communications interface. The processor, the RF circuit, the touchscreen, and the memory may be coupled together by using a bus.

Figure 25:
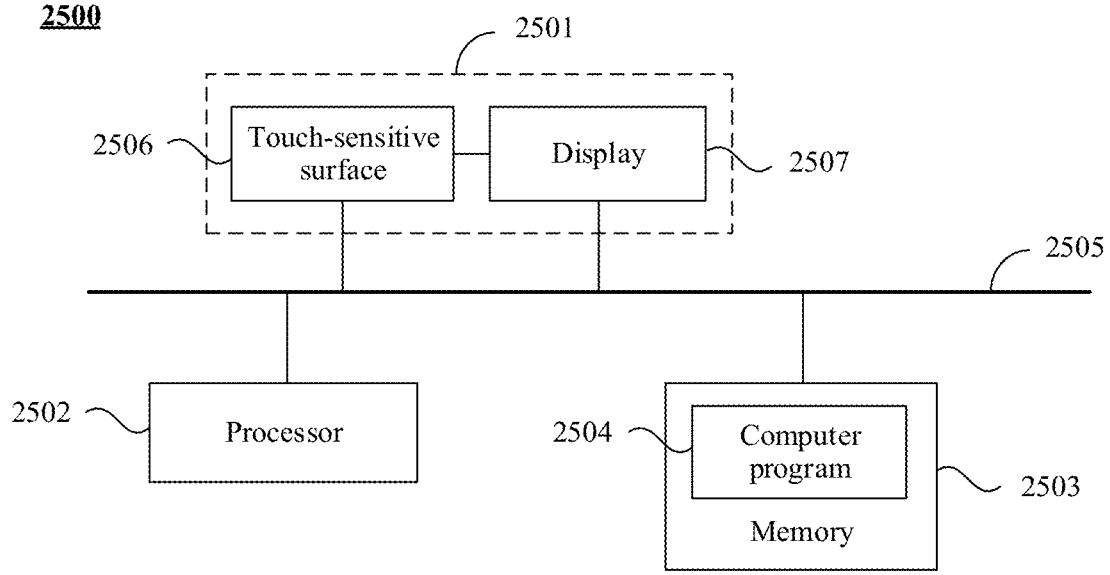
FIG. 25 is a schematic structural diagram of a first electronic device according to another embodiment of this application.

As shown in FIG. 25, some other embodiments of this application further provide a first electronic device 2500. The first electronic device 2500 may include a touchscreen 2501, where the touchscreen 2501 may include a touch-sensitive surface 2506 and a display 2507, one or more processors 2502, a memory 2503, and one or more computer programs 2504. The foregoing components may be connected by using one or more communications buses 2505. The one or more computer programs 2504 are stored in the memory 2503, and are executed by the one or more processors 2502. The one or more computer programs 2504 include an instruction. In some embodiments of this application, the instruction may be used to perform operations performed by the first electronic device in FIG. 17 and the corresponding embodiment. In some other embodiments of this application, the instruction may be further used to perform operations performed by the first electronic device in FIG. 18 and the corresponding embodiment. In some other embodiments of this application, the instruction may be further used to perform operations performed by the first electronic device in FIG. 19 and the corresponding embodiment. In some other embodiments of this application, the instruction may be further used to perform operations performed by the first electronic device in FIG. 20 and the corresponding embodiment. Certainly, the first electronic device 2500 includes but is not limited to the components listed above. For example, the first electronic device 2500 may further include a radio frequency circuit, a positioning apparatus, a sensor, and the like. When the first electronic device 2500 includes another component, the first electronic device 2500 may be the mobile phone shown in FIG. 3.

Figure 26:
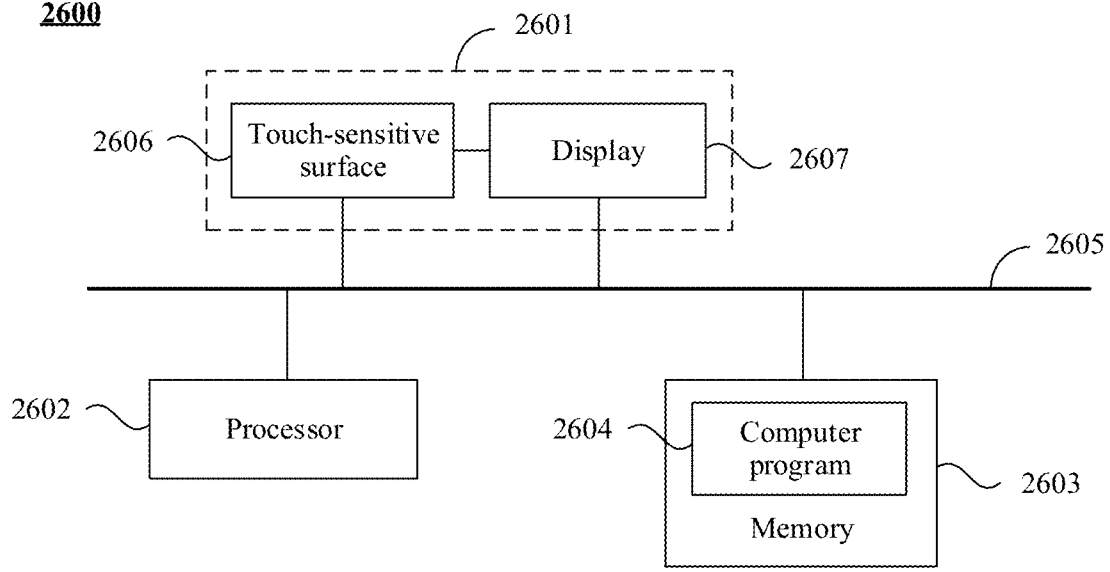
FIG. 26 is a schematic structural diagram of a first electronic device according to another embodiment of this application.

As shown in FIG. 26, some other embodiments of this application further provide a second electronic device 2600. The second electronic device 2600 may include a touchscreen 2601, where the touchscreen 2601 may include a touch-sensitive surface 2606 and a display 2607, one or more processors 2602, a memory 2603, and one or more computer programs 2604. The foregoing components may be connected by using one or more communications buses 2605. The one or more computer programs 2604 are stored in the memory 2603, and are executed by the one or more processors 2602. The one or more computer programs 2604 include an instruction. In some embodiments of this application, the instruction may be used to perform operations performed by the second electronic device in FIG. 17 and the corresponding embodiment. In some other embodiments of this application, the instruction may be further used to perform operations performed by the second electronic device in FIG. 18 and the corresponding embodiment. In some other embodiments of this application, the instruction may be further used to perform operations performed by the second electronic device in FIG. 19 and the corresponding embodiment. In some other embodiments of this application, the instruction may be further used to perform operations performed by the second electronic device in FIG. 20 and the corresponding embodiment. Certainly, the second electronic device 2600 includes but is not limited to the components listed above. For example, the second electronic device 2600 may further include a radio frequency circuit, a positioning apparatus, a sensor, and the like. When the second electronic device 2600 includes another component, the second electronic device 2600 may be the mobile phone shown in FIG. 3.

Some other embodiments of this application further provide an application function implementation system. The system may include a first electronic device and a second electronic device. The first electronic device may establish a wireless link to the second electronic device. The first electronic device may send first information to the second electronic device by using the wireless link, where the first information includes to-be-shared data and an identifier, and the identifier is used to indicate an application module. The second electronic device receives and parses the first information to obtain the to-be-shared data and the identifier. The second electronic device provides an on share service for the application module indicated by the identifier, and automatically implements a corresponding application function based on the to-be-shared data.

Some other embodiments of this application further provide a computer-readable storage medium. The computer-readable storage medium includes an instruction. When the instruction is run on a first electronic device, the first electronic device is enabled to perform related method operations in any one of FIG. 17, FIG. 18, FIG. 19, and FIG. 20, for example, operation 1701, operation 1702, operation 1801, operation 1802, operation 1803, operation 1804, operation 1805, operation 1806, operation 1901, operation 1902, operation 2001, operation 2002, operation 2003, operation 2004, operation 2005, operation 2006, operation 2007, and operation 2008, to implement the application function implementation method in the foregoing embodiments.

Some other embodiments of this application further provide a computer-readable storage medium. The computer-readable storage medium includes an instruction. When the instruction is performed on a second electronic device, the second electronic device is enabled to perform related method operations in any one of FIG. 17, FIG. 18, FIG. 19, and FIG. 20, for example, operation 1701, operation 1703, operation 1704, operation 1807, operation 2007, operation 2009, and operation 2010, to implement the application function implementation method in the foregoing embodiments.

Some other embodiments of this application further provide a computer program product including an instruction. When the computer program product is run on a first electronic device, the first electronic device is enabled to perform related method operations in any one of FIG. 17, FIG. 18, FIG. 19, and FIG. 20, for example, operation 1701, operation 1702, operation 1801, operation 1802, operation 1803, operation 1804, operation 1805, operation 1806, operation 1901, operation 1902, operation 2001, operation 2002, operation 2003, operation 2004, operation 2005, operation 2006, operation 2007, and operation 2008, to implement the application function implementation method in the foregoing embodiments.

Some other embodiments of this application further provide a computer program product including an instruction. When the computer program product runs on a second electronic device, the second electronic device is enabled to perform related method operations in any one of FIG. 17, FIG. 18, FIG. 19, and FIG. 20, for example, operation 1701, operation 1703, operation 1704, operation 1807, operation 2007, operation 2009, and operation 2010, to implement the application function implementation method in the foregoing embodiments.

Some other embodiments of this application further provide a control device. The control device includes a processor and a memory. The memory is configured to store computer program code, and the computer program code includes a computer instruction. When the processor executes the computer instruction, the control device performs related method operations in any one of FIG. 17, FIG. 18, FIG. 19, and FIG. 20, to implement the application function implementation method in the foregoing embodiments. The control device may be an integrated circuit (IC), or may be a system on chip (SOC). The integrated circuit may be a universal integrated circuit, or may be a field programmable gate array (FPGA), or may be an application-specific integrated circuit (ASIC).

Some other embodiments of this application further provide an application function implementation apparatus. The apparatus has functions of implementing behavior of the first electronic device or the second electronic device in the foregoing method. The functions may be implemented by hardware, or may be implemented by hardware by executing corresponding software. The hardware or software includes one or more modules corresponding to the foregoing functions.

The first electronic device, the second electronic device, the computer storage medium, the computer program product, and the control device that are provided in the embodiments of this application are all configured to perform corresponding methods described above. Therefore, for beneficial effects that can be achieved by the first electronic device, the second electronic device, the computer storage medium, the computer program product, and the control device, refer to beneficial effects of the corresponding methods described above. Details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. An application function implementation method, wherein the method comprises:
    establishing, by a first electronic device, a first wireless link through a first wireless communications protocol;
    displaying, by the first electronic device, a first screen, wherein the first screen comprises a first control associated with data that a user of the first electronic device wants to share;
    receiving, by the first electronic device, a first operation performed on the first control;
    displaying, by the first electronic device, a shortcut menu in response to the first operation, wherein the shortcut menu comprises a second control;
    receiving, by the first electronic device, a second operation performed on the second control;
    performing, by the first electronic device, a first broadcast communication through a second wireless communications protocol in response to the second operation;
    displaying, by the first electronic device, a discovery device list in response to the first broadcast communication, wherein the discovery device list comprises an identifier of a second electronic device that is received by the first electronic device from a second broadcast communication by the second electronic device;

receiving, by the first electronic device, a third operation performed on the identifier of the second electronic device;

in response to the third operation, establishing, by the first electronic device, a second wireless link to the second electronic device through the second wireless communications protocol, wherein the first electronic device and the second electronic device are associated with each other;

sending, by the first electronic device, first information to the second electronic device through the second wireless link, wherein the first information comprises to-be-shared data and an identifier, and the identifier identifies an application module of a plurality of application modules of the second electronic device that is to execute the to-be-shared data;

receiving and parsing, by the second electronic device, the first information to obtain the to-be-shared data and the identifier; and providing, by the second electronic device, an on share service for the application module identified by the identifier, and automatically implementing a corresponding application function based on the to-be-shared data.

2. The application function implementation method according to claim 1, wherein the to-be-shared data comprises a service set identifier (SSID) and a password of a wireless local area network; and the providing, by the second electronic device, an on share service for the application module identified by the identifier, and automatically implementing a corresponding application function based on the to-be-shared data specifically comprises:

providing, by the second electronic device, an on share service for a wireless fidelity (Wi-Fi) module in Settings that is identified by the identifier, and automatically accessing the wireless local area network through the SSID and the password.

3. The application function implementation method according to claim 1, wherein the method further comprises:

displaying, by the second electronic device, a second screen, wherein the second screen comprises a third control; and the providing, by the second electronic device, an on share service for the application module identified by the identifier, and automatically implementing a corresponding application function based on the to-be-shared data specifically comprises:

receiving, by the second electronic device, a fourth operation performed on the third control; and in response to the fourth operation, providing, by the second electronic device, the on share service for the application module identified by the identifier, and automatically implementing the corresponding application function based on the to-be-shared data.

4. The application function implementation method according to claim 1, wherein the to-be-shared data comprises an SSID and a password of a wireless local area network.

5. The application function implementation method according to claim 1, wherein the application module identified by the identifier is a Wi-Fi module in Settings, and the first screen is a settings screen of a wireless local area network function in Settings.

6. The application function implementation method according to claim 4, wherein the first information further comprises an operation code, and the operation code is used to indicate to automatically access the wireless local area network through the SSID and the password.

7. The application function implementation method according to claim 1, wherein the to-be-shared data is provided with attribute information, and the attribute information comprises at least one of the following: whether storing is allowed, whether printing is allowed, whether re-sharing is allowed, or whether deleting is performed immediately after reading.

8. The application function implementation method according to claim 1, wherein the to-be-shared data comprises a parameter of a Do Not Disturb mode in the first electronic device; and the application module identified by the identifier is a Do Not Disturb mode module in Settings, and the first screen is a settings screen of a Do Not Disturb mode in Settings.

9. The application function implementation method according to claim 1, wherein the to-be-shared data comprises a configuration parameter of a virtual private network VPN in the first electronic device; and the application module identified by the identifier is a VPN module in Settings, and the first screen is a configuration screen of a VPN in Settings.

10. The application function implementation method according to claim 1, wherein the first electronic device and the second electronic device are associated with each other specifically comprises: the first electronic device and the second electronic device are logged in to with a same account, or an account with which the second electronic device is logged in to is a contact of the first electronic device.

11. An application function implementation method, wherein the method comprises:

displaying, by a first electronic device, a first screen, wherein the first screen comprises a first control associated with a SSID of a wireless local area network;

receiving, by the first electronic device, a first operation performed on the first control;

displaying, by the first electronic device, a shortcut menu in response to the first operation, wherein the shortcut menu comprises a second control, and the second control is configured to share the SSID and a password of the wireless local area network;

receiving, by the first electronic device, a second operation performed on the second control;

performing, by the first electronic device, a first broadcast communication through a Bluetooth protocol in response to the second operation;

displaying, by the first electronic device, a discovery device list in response to the first broadcast communication, wherein the discovery device list comprises an identifier of a second electronic device that is received by the first electronic device from a second broadcast communication by the second electronic device;

receiving, by the first electronic device, a third operation performed on the identifier of the second electronic device;

in response to the third operation, establishing, by the first electronic device, a Bluetooth link to the second electronic device through the Bluetooth protocol;

sending, by the first electronic device, first information to the second electronic device through the Bluetooth link, wherein the first information comprises the SSID, the password, and an identifier, and the identifier identifies a Wi-Fi module in Settings;

receiving and parsing, by the second electronic device, the first information to obtain the SSID, the password, and the identifier; and providing, by the second electronic device, an on share service for the Wi-Fi module in Settings that is identified by the identifier, and automatically accessing the wireless local area network through the SSID and the password.

12. An application function implementation system, wherein the system comprises a first electronic device and a second electronic device, wherein the first electronic device establishes a first wireless link through a first wireless communications protocol;

the first electronic device displays a first screen, wherein the first screen comprises a first control associated with data that a user of the first electronic device wants to share;

the first electronic device receives a first operation performed on the first control;

the first electronic device displays a shortcut menu in response to the first operation, wherein the shortcut menu comprises a second control;

the first electronic device receives a second operation performed on the second control;

the first electronic device performs a first broadcast communication through a second wireless communications protocol in response to the second operation;

the first electronic device displays a discovery device list in response to the first broadcast communication, wherein the discovery device list comprises an identifier of the second electronic device that is received by the first electronic device from a second broadcast communication by the second electronic device;

the first electronic device receives a third operation performed on the identifier of the second electronic device;

in response to the third operation, the first electronic device establishes a second wireless link to the second electronic device through the second wireless communications protocol, wherein the first electronic device and the second electronic device are associated with each other;

the first electronic device sends first information to the second electronic device through the second wireless link, wherein the first information comprises to-be-shared data and an identifier, and the identifier identifies an application module of a plurality of application modules of the second electronic device that is to execute the to-be-shared data;

the second electronic device receives and parses the first information to obtain the to-be-shared data and the identifier; and the second electronic device provides an on share service for the application module identified by the identifier, and automatically implements a corresponding application function based on the to-be-shared data.

13. The application function implementation system according to claim 12, wherein the to-be-shared data comprises a SSID and a password of a wireless local area network; and that the second electronic device provides an on share service for the application module identified by the identifier, and automatically implements a corresponding application function based on the to-be-shared data specifically comprises: the second electronic device provides an on share service for a Wi-Fi module in Settings that is identified by the identifier, and automatically accesses the wireless local area network through the SSID and the password.

14. The application function implementation system according to claim 12, wherein the second electronic device displays a second screen, wherein the second screen comprises a third control; and that the second electronic device provides an on share service for the application module identified by the identifier, and automatically implements a corresponding application function based on the to-be-shared data specifically comprises: the second electronic device receives a fourth operation performed on the third control; and in response to the fourth operation, the second electronic device provides the on share service for the application module identified by the identifier, and automatically implements the corresponding application function based on the to-be-shared data.

15. The application function implementation system according to claim 12, wherein the to-be-shared data comprises an SSID and a password of a wireless local area network.

16. The application function implementation system according to claim 12, wherein the application module identified by the identifier is a Wi-Fi module in Settings, and the first screen is a settings screen of a wireless local area network function in Settings.

17. The application function implementation system according to claim 15, wherein the first information further comprises an operation code, and the operation code is used to indicate to automatically access the wireless local area network through the SSID and the password.

18. The application function implementation system according to claim 12, wherein the to-be-shared data is provided with attribute information, and the attribute information comprises at least one of the following: whether storing is allowed, whether printing is allowed, whether re-sharing is allowed, and whether deleting is performed immediately after reading.

19. The application function implementation system according to claim 12, wherein the to-be-shared data comprises a parameter of a Do Not Disturb mode in the first electronic device; and the application module identified by the identifier is a Do Not Disturb mode module in Settings, and the first screen is a settings screen of a Do Not Disturb mode in Settings.

20. The application function implementation system according to claim 12, wherein the to-be-shared data comprises a configuration parameter of a virtual private network VPN in the first electronic device; and the application module identified by the identifier is a VPN module in Settings, and the first screen is a configuration screen of a VPN in Settings.

* * * * *